(12) United States Patent
Sasaki et al.

(10) Patent No.: US 12,404,898 B2
(45) Date of Patent: Sep. 2, 2025

(54) SEALED BEARING

(71) Applicant: NTN CORPORATION, Osaka (JP)

(72) Inventors: Katsuaki Sasaki, Shizuoka (JP); Susumu Miyairi, Shizuoka (JP); Masato Akahori, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 18/712,961

(22) PCT Filed: Nov. 21, 2022

(86) PCT No.: PCT/JP2022/042979
§ 371 (c)(1),
(2) Date: May 23, 2024

(87) PCT Pub. No.: WO2023/095740
PCT Pub. Date: Jun. 1, 2023

(65) Prior Publication Data
US 2025/0027539 A1  Jan. 23, 2025

(30) Foreign Application Priority Data

Nov. 25, 2021 (JP) ................. 2021-191050
Dec. 8, 2021 (JP) ................. 2021-199190
Dec. 8, 2021 (JP) ................. 2021-199196

(51) Int. Cl.
*F16C 33/78* (2006.01)
*F16C 33/46* (2006.01)
*F16J 15/324* (2016.01)

(52) U.S. Cl.
CPC .......... *F16C 33/7816* (2013.01); *F16C 33/46* (2013.01); *F16C 33/78* (2013.01); *F16J 15/324* (2013.01); *F16C 33/7853* (2013.01)

(58) Field of Classification Search
CPC ......... F16J 15/324; F16C 33/46; F16C 33/66; F16C 33/78; F16C 33/7816; F16C 33/782;
(Continued)

(56) References Cited

U.S. PATENT DOCUMENTS 2,038,010 A * 4/1936 Smith ................... F16C 33/414
384/481
3,473,856 A * 10/1969 Helms ................... F16C 33/783
384/485
(Continued)

FOREIGN PATENT DOCUMENTS

JP  7-190075   7/1995
JP  11-218140  8/1999
(Continued)

*Primary Examiner* — Nicholas L Foster
(74) *Attorney, Agent, or Firm* — Wenderoth, Lind & Ponack, L.L.P.

(57) ABSTRACT

An outer surface rubber portion is formed to cover the entire axially outer surface of a metal core. An inner surface rubber portion is formed with a circular annular opening through which the axially inner surface of the metal core is exposed on the same circumference passing on the radially outer side of minute protrusions; and circular arc-shaped openings through which the axially inner surface of the metal core is exposed on the same circumference passing on the radially inner side of the minute protrusions.

28 Claims, 32 Drawing Sheets

(58) Field of Classification Search
CPC .............. F16C 33/7823; F16C 33/7843; F16C 33/7853; F16C 33/7856; F16C 33/7869
See application file for complete search history.

(56) References Cited

U.S. PATENT DOCUMENTS

| | | | | |
|---|---|---|---|---|
| 4,770,424 | A * | 9/1988 | Otto | .................... F16C 33/7879 |
| | | | | 277/423 |
| 4,770,548 | A * | 9/1988 | Otto | ........................ F16C 19/38 |
| | | | | 277/552 |
| 5,539,844 | A | 7/1996 | Tazumi et al. | |
| 12,146,524 | B2 * | 11/2024 | Sasaki | ................... F16C 33/416 |
| 2018/0045247 | A1 | 2/2018 | Inamasu et al. | |
| 2022/0099142 | A1 | 3/2022 | Kawaguchi et al. | |
| 2023/0296132 | A1 * | 9/2023 | Sasaki | ..................... F16C 19/06 |
| | | | | 384/470 |
| 2025/0035153 | A1 * | 1/2025 | Sasaki | ................. F16C 33/3887 |

FOREIGN PATENT DOCUMENTS

| | | |
|---|---|---|
| JP | 3035766 | 4/2000 |
| JP | 2014-20481 | 2/2014 |
| JP | 2014-95451 | 5/2014 |
| JP | 2015-7465 | 1/2015 |
| JP | 2020-133770 | 8/2020 |
| WO | 2016/143786 | 9/2016 |
| WO | 2020/158564 | 8/2020 |

\* cited by examiner

SEALED BEARING

TECHNICAL FIELD

The present invention relates to a sealed bearing including a seal member disposed between its inner and outer rings.

BACKGROUND ART

As a bearing for supporting a rotary shaft of an automobile, an industrial machine, or the like, a sealed bearing is often used. A sealed bearing includes an inner ring; an outer ring arranged radially outwardly of, and coaxially with, the inner ring; a plurality of rolling elements disposed in an annular space defined between the inner ring and the outer ring; an annular cage that retains the rolling elements; and an annular seal member that closes an axial end opening of the annular space between the inner ring and the outer ring (e.g., see International Patent Publication No. 2016/143786, hereinafter WO '786).

The sealed bearing is generally designed such that the cage and the seal member are kept out of contact with each other. That is, since the cage retaining the rolling elements rotates at a revolution speed of the rolling elements (intermediate speed between the rotation speed of the inner ring and the rotation speed of the outer ring), there is a rotational speed difference between the cage and the seal member. Therefore, if the cage comes into contact with the seal member, the frictional resistance between the cage and the seal member causes excessive torque loss or abnormal heat generation. To address this issue, the sealed bearing is generally designed such that the cage and the seal member are kept out of contact with each other.

In contrast thereto, the applicant of the present application has already proposed a sealed bearing that can be used with the cage and the seal member kept in contact with each other (see Japanese Unexamined Patent Application Publication No. 2020-133770, hereinafter JP '770). The rolling bearing of JP '770 includes a plurality of minute protrusions that come into sliding contact with an axial side surface of the cage, and that are disposed on the axially inner surface of the seal member so as to be circumferentially spaced apart from each other. In the rolling bearing of JP '770, while the bearing is rotating, an oil film due to the wedge film effect is formed between the minute protrusions on the axially inner surface of the seal member and the axial side surface of the cage, and the oil film causes a fluid lubrication state between the contact surfaces of the cage and the seal member, so that the contact resistance between the cage and the seal member can be reduced to be extremely small.

The seal member used in the rolling bearing of JP '770 comprises a circular annular plate-shaped metal core axially opposed to the cage; and a rubber member vulcanization-bonded to the metal core. The rubber member includes an outer surface rubber portion bonded to the axially outer surface of the metal core; an inner surface rubber portion bonded to the axially inner surface of the metal core; an outer peripheral rubber portion extending radially outward from the radially outer end of the metal core, and fixedly fitted in a seal fixing groove formed in the inner periphery of the outer ring; and a seal lip extending radially inward from the radially inner end of the metal core. The inner surface rubber portion is formed so as to cover the entire area of the axially inner surface of the metal core, and has a plurality of circumferentially spaced apart minute protrusions that come into sliding contact with the axial side surface of the cage. On the other hand, the outer surface rubber portion is formed to cover only a portion of the axially outer surface of the metal core such that most of the axially outer surface of the metal core is exposed.

In the seal member of JP '770, the axially outer surface of the metal core is exposed from the rubber member. Therefore, there is a problem in that when the rolling bearing is used in an environment where the bearing is exposed to foreign matter such as water, foreign matter such as water adheres to the portion of the metal core exposed from the rubber member, thereby causing rust.

To address this problem, the inventors of the present application considered modifying the seal member of JP '770 such that the entire area of the axially outer surface of the metal core is covered with the rubber member. However, they found that, if the entire area of the axially outer surface of the metal core is covered with the rubber member, when the seal member is vulcanization-molded, it is difficult to stably mold the minute protrusions on portions of the rubber member bonded to the axially inner surface of the metal core.

That is, the seal member comprising the metal core and the rubber member is generally manufactured by vulcanization molding. The vulcanization molding is performed by placing an unvulcanized rubber material between an upper mold part and a lower mold part vertically opposed to each other; pressurizing the rubber material while vertically sandwiching the rubber material with the upper mold part and the lower mold part; and heating the upper mold part and the lower mold part. By pressurizing the unvulcanized rubber material while sandwiching the rubber material between the upper mold part and the lower mold part, the rubber material is molded into the shape of a cavity formed between the upper mold part and the lower mold part, and a vulcanization reaction of the rubber material is advanced by heating, whereby the rubber material loses fluidity and changes into the rubber member having elasticity. By placing the metal core into the cavity in advance, the metal core is bonded to the rubber member molded in the cavity.

When the unvulcanized rubber material is sandwiched between the upper mold part and the lower mold part, and is molded into the shape of the cavity by pressurizing, the metal core is disposed beforehand to be kept in contact with, and supported by, the lower mold part. Since the rubber material does not flow into the contact portions of the metal core and the lower mold part, after the seal member is vulcanization-molded, a portion of the surface of the metal core (portion of the metal core which was in contact with the lower mold part) is exposed from the rubber material. Therefore, when a seal member comprising a metal core and a rubber member is manufactured, it is normally difficult to cover the entire area of both the axially inner surface and the axially outer surface of the metal core with the rubber material, so that one of the axially inner surface and the axially outer surface of the metal core is to have a portion exposed from the rubber material.

Therefore, if the seal member of JP '770 is modified such that the entire area of the axially outer surface of the metal core is covered with the rubber material, it is necessary to expose a portion of the axially inner surface of the metal core from the rubber member. On the other hand, in the seal member of JP '770, a plurality of minute protrusions that come into sliding contact with the axial side surface of the cage need to be formed on the portion of the rubber member bonded to the axially inner surface of the metal core. Therefore, in view of the fact that portions of the rubber material for forming the minute protrusions, need to be ensured, it is impossible to expose most of the axially inner surface of the metal core from the rubber member as in a general seal member (for example, the seal member shown in WO '786).

To address this issue, if the seal member of JP '770 is modified such that the entire area of the axially outer surface of the metal core is covered with the rubber member, for example, a structure is considered in which a circular annular opening is formed in the inner surface rubber portion bonded to the axially inner surface of the metal core such that, through the circular annular opening, the axially inner surface of the metal core is continuously exposed around the entire periphery on the same circumference passing on the radially outer side of the minute protrusions. If the circular annular opening is formed in the inner surface rubber portion, vulcanization molding of the seal member using the upper mold part and the lower mold part can be performed with the portion of the metal core corresponding to the circular annular opening supported by the lower mold part.

However, if the above structure is adopted, since the metal core is supported by the lower mold part only at one radial portion of the metal core (only the portion corresponding to the circular annular opening of the rubber member), there is a problem in that when the unvulcanized rubber material is sandwiched and pressurized between the upper mold part and the lower mold part, the metal core is deformed by the pressurizing. Therefore, if the pressurization of the unvulcanized rubber material using the upper mold part and the lower mold part is reduced/weakened in order to prevent the deformation of the metal core, the minute protrusions of the rubber member cannot be stably molded.

It turned out that as described above, if the seal member of JP '770 is modified such that the entire surface of the axially outer surface of the metal core is covered with the rubber member, when the seal member is vulcanization-molded, it is difficult to stably mold the minute protrusions on the portion of the rubber member bonded to the axially inner surface of the metal core.

SUMMARY OF THE INVENTION

Therefore, it is an object of a first invention to provide a sealed bearing including a seal member in which minute protrusions that come into sliding contact with the axial side surface of the cage are formed on the portion of the rubber member bonded to the axially inner surface of the metal core, and the minute protrusions of the rubber member can be stably formed. Also, it is an object of a second invention to provide a sealed bearing suitable for use at a high-speed rotation. Also, it is an object of a third invention to provide a sealed bearing in which not only while the bearing is rotating at a high speed but also while the bearing is rotating at a relatively low speed, it is possible to stably cause a fluid lubrication state between a seal-side sliding surface and a cage-side sliding surface.

In order to achieve the above object of the first invention, the first invention provides a sealed bearing comprising: an inner ring; an outer ring having a seal fixing groove in an inner periphery of the outer ring, and arranged radially outwardly of, and coaxially with, the inner ring; a plurality of rolling elements disposed in an annular space defined between the inner ring and the outer ring; an annular cage retaining the rolling elements; and an annular seal member disposed in one axial end opening of the annular space, wherein the seal member comprises: a metal core having a circular annular plate shape, and axially opposed to the cage; and a rubber member vulcanization-bonded to the metal core, wherein the rubber member includes: an outer surface rubber portion bonded to an axially outer surface of the metal core; an inner surface rubber portion bonded to an axially inner surface of the metal core; an outer peripheral rubber portion extending radially outward from a radially outer end of the metal core, and fixedly fitted in the seal fixing groove; and a seal lip extending radially inward from a radially inner end of the metal core, and wherein the inner surface rubber portion has a plurality of minute e protrusions circumferentially spaced apart from each other, and kept in sliding contact with an axial side surface of the cage. The outer surface rubber portion is formed to cover an entire area of the axially outer surface of the metal core. The inner surface rubber portion has: a first opening or first openings through which the axially inner surface of the metal core is exposed on a same circumference passing on a radially outer side of the minute protrusions; and a second opening or second openings through which the axially inner surface of the metal core is exposed on a same circumference passing on a radially inner side of the minute protrusions.

With this arrangement, when the seal member is vulcanization-molded using an upper mold part and a lower mold part, the vulcanization-molding can be performed in a state where the metal core portion(s) corresponding to the first opening(s) of the rubber member and the metal core portion(s) corresponding to the second opening(s) of the rubber member are supported by the lower mold part. Since the first opening(s) of the rubber member is located on the radially outer side of the minute protrusions and the second opening(s) of the rubber member is located radially inner side of the minute protrusions, the metal core is supported on both the radially outer side of the minute protrusions and the radially inner side of the minute protrusions. Therefore, when an unvulcanized rubber material is sandwiched and pressurized between the upper mold part and the lower mold part, the metal core is not deformed easily by the pressurization, so that the pressurization to the rubber material with the upper mold part and the lower mold part can be made sufficiently strong, and the minute protrusions of the rubber member can be stably molded.

It is preferable to adopt an arrangement where the first opening is a circular annular opening through which the axially inner surface of the metal core is continuously exposed around an entire circumference thereof on the same circumference passing on the radially outer side of the minute protrusions, and the second openings are a plurality of circular arc-shaped openings through which the axially inner surface of the metal core is discontinuously exposed at circumferentially spaced apart positions on the same circumference passing on the radially inner side of the minute protrusions.

With this arrangement, since the second openings are a plurality of circular arc-shaped openings that allow the discontinuous exposure at circumferentially spaced apart positions, when the unvulcanized rubber material is sandwiched and pressurized between the upper mold part and the lower mold part, the portions between the circumferentially adjacent pairs of circular arc-shaped openings function as flow paths for the unvulcanized rubber material. Therefore, when the unvulcanized rubber material is pressurized by the upper mold part and the lower mold part, the rubber material can reliably reach the portions where the minute protrusions are to be formed, so that it is possible to obtain the seal member of stable quality.

An arrangement may be adopted in which the first openings are a plurality of circular arc-shaped openings through which the axially inner surface of the metal core is discontinuously exposed at circumferentially spaced apart positions on the same circumference passing on the radially outer side of the minute protrusions, and the second opening is a circular annular opening through which the axially inner surface of the metal core is continuously exposed around an entire circumference thereof on the same circumference passing on the radially inner side of the minute protrusions.

With this arrangement, since the first openings are a plurality of circular arc-shaped openings that allow the discontinuous exposure at circumferentially spaced apart positions, when the unvulcanized rubber material is sandwiched and pressurized between the upper mold part and the lower mold part, the portions between the circumferentially adjacent pairs of circular arc-shaped openings function as flow paths for the unvulcanized rubber material. Therefore, when the unvulcanized rubber material is pressurized by the upper mold part and the lower mold part, the rubber material can reliably reach the portions where the minute protrusions are to be formed, so that it is possible to obtain the seal member of stable quality.

An arrangement can be adopted in which the inner surface rubber portion includes a protrusion formation annular portion for protrusion formation located on a radially inner side of the first opening or the first openings and on a radially outer side of the second openings or the second opening, and formed with the minute protrusions, the inner surface rubber portion further includes a plurality of radially extending portions radially extending from the protrusion formation annular portion so as to be each located between a corresponding circumferentially adjacent pair of the circular arc-shaped openings, and the radially extending portions are circumferentially disposed at intervals of 10° or less.

With this arrangement, since, when the unvulcanized rubber material is sandwiched and pressurized between the upper mold part and the lower mold part, the portions that function as flow paths for the unvulcanized rubber material (the portions between the circumferentially adjacent pairs of circular arc-shaped openings) are circumferentially disposed at close intervals of 10° or less, the rubber material can reliably reach the portions where the minute protrusions are to be formed, and thus it is possible to obtain the seal member of stable quality.

Each of the minute protrusions preferably has a circular arc-shaped cross section orthogonal to a radial direction.

If the minute protrusions have such a cross-sectional shape, since an oil film due to the wedge film effect is stably formed between the minute protrusions on the axially inner surface of the seal member and the axial side surface of the cage while the bearing is rotating, and the oil film causes a fluid lubrication state between the contact surfaces of the cage and the seal member, the contact resistance between the cage and the seal member can be reduced to be extremely small.

In order to achieve the above object of the second invention, the second invention provides a sealed bearing comprising: an inner ring; an outer ring arranged radially outwardly of, and coaxially with, the inner ring; a plurality of rolling elements disposed in an annular space defined between the inner ring and the outer ring; an annular seal member disposed in one axial end opening of the annular space; and a cage retaining the rolling elements, wherein the cage includes: a cage circular annular portion circumferentially extending in a region axially sandwiched between a passage region through which the rolling elements pass and the seal member; and cage claws having a cantilevered structure, and each axially extending from the cage circular annular portion so as to be located between a corresponding circumferentially adjacent pair of the rolling elements. The seal member has a seal-side sliding surface axially opposed to the cage, and the cage has a cage-side sliding surface axially opposed to the seal-side sliding surface, and a plurality of minute protrusions are formed on one of the seal-side sliding surface and the cage-side sliding surface so as to be circumferentially spaced apart from each other. Each of the minute protrusions has a sliding contact distal end surface linearly extending radially in a sectional view orthogonal to a circumferential direction, and a smooth sliding contact flat surface configured to come into sliding contact with the sliding contact distal end surfaces of the minute protrusions while the bearing is rotating is formed on the other of the seal-side sliding surface and the cage-side sliding surface around an entire circumference thereof, and wherein each of the sliding contact distal end surfaces and the sliding contact flat surface are disposed such that while the bearing is stationary, the sliding contact distal end surface and the sliding contact flat surface are non-parallelly opposed to each other at an angle in a direction in which a space between the sliding contact distal end surface and the sliding contact flat surface widens from a radially inner side toward a radially outer side.

With this arrangement, when, during rotation of the bearing, the sliding contact distal end surfaces of the minute protrusions on one of the seal-side sliding surface and the cage-side sliding surface come into sliding contact with the sliding contact flat surface, which is formed on the other of the seal-side sliding surface and the cage-side sliding surface and is smooth around the entire circumference, since the sliding contact distal end surfaces of the minute protrusions have a shape linearly extending radially, lubricating oil is not pushed aside easily by the minute protrusions, and the lubricating oil is easily drawn into the sliding contact portions of the minute protrusions. Therefore, an oil film due to the wedge film effect is formed between the sliding contact distal end surfaces of the minute protrusions and the sliding contact flat surface, and the oil film causes a fluid lubrication state between the sliding contact distal end surfaces and the sliding contact flat surface, so that the contact resistance between the cage and the seal member can be reduced to be extremely small.

Also, since each sliding contact distal end surface and the sliding contact flat surface are disposed such that while the bearing is stationary, the sliding contact distal end surface and the sliding contact flat surface are non-parallelly opposed to each other at an angle in a direction in which the space between the sliding contact distal end surface and the sliding contact flat surface widens from the radially inner side toward the radially outer side, while the bearing is rotating at a high speed, it is possible to stably form an oil film between the sliding contact distal end surfaces and the sliding contact flat surface due to the wedge film effect. That is, if it is assumed that the bearing is configured such that while the bearing is stationary, each sliding contact distal end surface and the sliding contact flat surface are parallelly opposed to each other, there is a problem in that while the bearing is rotating at a high speed, the cage circular annular portion is deformed by the centrifugal force acting on the cage claws, the deformation causes the cage-side sliding surface to incline, and the sliding contact distal end surface and the sliding contact flat surface become non-parallel, so that it is difficult to form an oil film due to the wedge film effect between the sliding contact distal end surfaces and the sliding contact flat surface. To address this problem, if the sealed bearing is configured such that while the bearing is stationary, each sliding contact distal end surface and the sliding contact flat surface are non-parallelly opposed to each other at an angle in a direction in which the space between the sliding contact distal end surface and the sliding contact flat surface widens from the radially inner side toward the radially outer side, while the bearing is rotating at a high speed, the cage circular annular portion is deformed by the centrifugal force acting on the cage claws, and the deformation causes the sliding contact distal end surface and the sliding contact flat surface to parallelly approach each other, so that it is possible to stably form an oil film due to the wedge film effect between the sliding contact distal end surfaces and the sliding contact flat surface.

The angle defined by each of the sliding contact distal end surfaces and the sliding contact flat surface while the bearing is stationary can be set in a range of 0.5° or more and 6° or less.

It is preferable to adopt an arrangement in which each of the cage claws has an axial length larger than a radius of a respective one of the rolling elements, and if each of the cage claws has pocket side surfaces each circumferentially opposed to a corresponding one of the rolling elements, a portion of each of the pocket side surfaces of each of the cage claws circumferentially receiving the corresponding one of the rolling elements has a flat shape such that when the each of the cage claws moves radially outward by a centrifugal force, the each of the pocket side surfaces does not interfere with the corresponding one of the rolling elements.

With this arrangement, when, during rotation of the bearing at a high speed, the cage circular annular portion is deformed by the centrifugal force acting on the cage claws, and the cage claws move radially outward by the deformation, it is possible to prevent abnormal heat generation due to interference of the pocket side surfaces of the cage claws with the rolling elements.

Each of the pocket side surfaces of the cage claws can be a flat surface along a straight line radially extending through a bearing center.

Also, the pocket side surfaces of each of the cage claws can be flat surfaces, respectively, along parallel straight lines circumferentially opposed to each other with a straight line connecting together a bearing center and a circumferential center of the cage claw sandwiched between the parallel straight lines.

If such pocket side surfaces are adopted in each cage claw, even when the cage claw radially moves along a straight line connecting together the bearing center and the circumferential center of the cage claw, the distances between the pocket side surfaces and the corresponding rolling elements do not change. Therefore, even when, during rotation of the bearing at a high speed, the cage circular annular portion is deformed by the centrifugal force acting on the cage claws and the cage claws move radially outward by the deformation, the cage stably retains the rolling elements.

An arrangement can be adopted in which the cage circular annular portion has pocket bottom surfaces axially opposed to the rolling elements, respectively, each of the pocket bottom surfaces has a shape linearly extending radially in a sectional view orthogonal to the circumferential direction, and each of the pocket side surfaces of each of the cage claws and a corresponding one of the pocket bottom surfaces are connected to each other in a concave circular arc shape when seen in a radial direction.

With this arrangement, since each pocket side surface and the corresponding pocket bottom surface are connected to each other in a concave circular arc shape, it is possible to ensure the cross-sectional area of the root of each cage claw in the axial direction, while reducing the mass of the distal end of the cage claw in the axial direction. Therefore, it is possible to effectively reduce deflection of the cage claws due to the centrifugal force acting on the cage claws.

Build-up portions protruding axially inward so as not to come into contact with the rolling elements are preferably formed on radially inner ends of the respective pocket bottom surfaces.

With this arrangement, it is possible to effectively prevent the cage circular annular portion from being damaged by the influence of a centrifugal force. That is, when the cage circular annular portion is torsionally deformed by the centrifugal force acting on the cage claws, stress is likely to concentrate on radially inner portions of the cage circular annular portion (radially inner ends of the pocket bottom surfaces) at positions corresponding to the middles of the circumferentially adjacent pairs of cage claws. In view of this, by forming the axially inward protruding build-up portions at the radially inner ends of the pocket bottom surfaces, it is possible to effectively prevent the cage circular annular portion from being damaged by stress concentration caused by the centrifugal force.

It is preferable to adopt an arrangement in which each of the cage claws has: a radially outer surface formed with a radially outer oil groove axially extending from a distal end of the cage claw toward the cage circular annular portion; and a radially inner surface formed with a radially inner oil groove axially extending from the distal end of the cage claw toward the cage circular annular portion, and each of the cage claws has a cross section that is orthogonal to an axial direction, and that has an H-shape opening radially outward and radially inward due to the radially outer oil groove and the radially inner oil groove.

With this arrangement, since the cross-sectional shape of each cage claw is an H-shape caused by the radially outer oil groove in the radially outer surface of the cage claw, and the radially inner oil groove in the radially inner surface of the cage claw, it is possible to reduce the mass of the cage claw, while ensuring a second moment of area of the cage claw (while keeping the cage claw less likely to deform against bending moment). Therefore, it is possible to reduce or minimize torsional deformation of the cage circular annular portion and flexural deformation of the cage claws per se that are caused by the centrifugal force the cage claws receive during rotation of the bearing at a high speed.

It is preferable to adopt an arrangement in which the radially outer oil groove of each of the cage claws is formed such that a position of a groove bottom surface of the radially outer oil groove gradually changes radially outward from the distal end of the cage claw toward a root of the cage claw, and the cage circular annular portion has a flat rising surface rising radially outward from the roots of the cage claws.

With this arrangement, since each radially outer oil groove is formed such that the position of the groove bottom surface of the radially outer oil groove gradually changes radially outward from the distal end of the cage claw toward the root thereof, while the bearing is rotating, the lubricating oil in the radially outer oil groove moves from the distal end of the cage claw toward the root thereof due to the pumping effect. Then, the lubricating oil that has moved in the radially outer oil groove from the distal end of the cage claw toward the root thereof is returned to the axially inner side by the rising surface, which rises radially outward from the roots of the cage claws. This action is repeated, whereby the lubricating oil in the bearing can be efficiently circulated.

An arrangement can be adopted in which radially outer penetrating grooves axially penetrating through an outer periphery of the cage circular annular portion are formed at circumferential positions corresponding to the cage claws.

With this arrangement, lubricating oil easily moves inwardly and outwardly between the region that is axially inward of the cage circular annular portion and the region that is axially outward of the cage circular annular portion, while passing through the radially outer penetrating grooves. This facilitates circulation of lubricating oil in the interior of the bearing. Also, the radially outer penetrating grooves are formed in the cage circular annular portion at its circumferential positions corresponding to the cage claws (that is, in the cage circular annular portion at its positions at which the rigidity is ensured by the cage claws). Therefore, it is possible to effectively prevent the rigidity of the cage circular annular portion from being decreased by the formation of the radially outer penetrating grooves.

It is preferable to further adopt an arrangement in which an axial groove is formed between each circumferentially adjacent pair of the radially outer penetrating grooves, the axial groove axially extending on the outer periphery of the cage circular annular portion so as to open on an axially outer side of the cage circular annular portion, and so as not to penetrate on an axially inner side of the cage circular annular portion.

With this arrangement, lubricating oil easily moves inwardly and outwardly between the region that is axially inward of the cage circular annular portion and the region that is axially outward of the cage circular annular portion, while passing through the axial grooves. This facilitates circulation of lubricating oil in the interior of the bearing. Also, since the axial grooves are formed not to penetrate on the axially inner side of the cage circular annular portion, it is possible to effectively prevent the cage circular annular portion from being damaged by stress concentration. That is, when the cage circular annular portion is torsionally deformed by the centrifugal force acting on the cage claws, stress tends to concentrate on the axially inner side of the outer periphery of the cage circular annular portion. In view of this, by forming the axial grooves in the outer periphery of the cage circular annular portion so as not to penetrate on the axially inner side, it is possible to effectively prevent the cage circular annular portion from being damaged by stress concentration.

An axial length of the axial groove is preferably set to ⅔ or less of an axial width of the cage circular annular portion.

If the axial lengths of the axial grooves are set as described above, it is possible to effectively prevent the rigidity of the cage circular annular portion from being decreased by the formation of the axial grooves in the outer periphery of the cage circular annular portion, and it is therefore possible to effectively prevent the cage circular annular portion from being damaged by stress concentration.

An arrangement can be adopted in which radially inner penetrating grooves axially penetrating through an inner periphery of the cage circular annular portion are formed at circumferential positions corresponding to the cage claws.

With this arrangement, lubricating oil easily moves inwardly and outwardly between the region that is axially inward of the cage circular annular portion and the region that is axially outward of the cage circular annular portion, while passing through the radially inner penetrating grooves. This facilitates circulation of lubricating oil in the interior of the bearing. Also, the radially inner penetrating grooves are formed in the cage circular annular portion at its circumferential positions corresponding to the cage claws (that is, in the cage circular annular portion at its positions at which the rigidity is ensured by the cage claws). Therefore, it is possible to effectively prevent the rigidity of the cage circular annular portion from being decreased by the formation of the radially inner penetrating grooves.

It is preferable to adopt an arrangement in which the seal member has a seal-side inclined surface linearly extending to be inclined axially inward from the seal-side sliding surface toward the radially inner side in a sectional view orthogonal to the circumferential direction, the cage circular annular portion has: a cage-side inclined surface linearly extending to be inclined axially inward from the cage-side sliding surface toward the radially inner side in a sectional view orthogonal to the circumferential direction; and a chamfer linearly extending to be inclined axially inward from the cage-side sliding surface toward the radially outer side, an angle defined by the cage-side inclined surface and the seal-side inclined surface is set to 10° or less, and an angle defined by the chamfer and the seal-side sliding surface is set to more than 10° and 48° or less.

With this arrangement, the angle defined by the cage-side inclined surface and the seal-side inclined surface, which are formed on the radially inner side of the sliding contact portions of the cage-side sliding surface and the seal-side sliding surface, is smaller than the angle defined by the chamfer and the seal-side sliding surface, which are formed on the radially outer side of the sliding contact portions of the cage-side sliding surface and the seal-side sliding surface. That is, the angle, between the cage and the seal member, defined on the radially inner side with respect to the sliding contact portions of the cage-side sliding surface and the seal-side sliding surface is smaller than the angle, between the cage and the seal member, defined on the radially outer side with respect to the sliding contact portions of the cage-side sliding surface and the seal-side sliding surface. Therefore, in the region axially sandwiched between the cage and the seal member, a flow of the lubricating oil is generated from the radially inner side of the sliding contact portions of the cage-side inclined surface and the seal-side inclined surface toward the radially outer side of the sliding contact portions of the cage-side inclined surface and the seal-side inclined surface, so that lubrication of the bearing in its interior can be efficiently performed.

It is preferable to adopt an arrangement in which cutouts are formed in the distal end of each of the cage claws so as to circumferentially penetrate through respective groove shoulders on both circumferential sides of the radially outer oil groove and the radially inner oil groove.

With this arrangement, it is possible to increase the amount of the lubricating oil supplied to the rolling elements from the circumferential direction, and to improve lubrication performance of the rolling elements.

The cage can be a resin cage.

In order to achieve the above object of the third invention, the third invention provides a sealed bearing comprising: an inner ring; an outer ring arranged radially outwardly of, and coaxially with, the inner ring; a plurality of rolling elements disposed in an annular space defined between the inner ring and the outer ring; a cage retaining the rolling elements; and an annular seal member disposed in one axial end opening of the annular space. The seal member has a seal-side sliding surface axially opposed to the cage, and the cage has a cage-side sliding surface axially opposed to the seal-side sliding surface. One of the seal-side sliding surface and the cage-side sliding surface is formed with: a plurality of minute protrusions configured to come into sliding contact with the other of the seal-side sliding surface and the cage-side sliding surface; and flat surfaces each connecting together a corresponding circumferentially adjacent pair of the minute protrusions, and disposed to circumferentially alternate with the minute protrusions. Each of the minute protrusions is formed such that a cross section of the minute protrusion along a circumferential direction has a circular arc shape having a radius of 1 mm to 30 mm, or has a trapezoidal shape having oblique sides each defining an angle of 45° or less with respect to the circumferential direction, and a height of each of the minute protrusions from the flat surfaces is set in a range of 0.01 mm to 0.50 mm. A circumferential width of each of the minute protrusions is set in a range of 0.3 to 4.0 mm, and a circumferential width of each of the flat surfaces is set in a range of 0.3 to 4.0 mm.

With this arrangement, one of the seal-side sliding surface and the cage-side sliding surface is formed with a plurality of minute protrusions configured to come into sliding contact with the other of the seal-side sliding surface and the cage-side sliding surface; and flat surfaces connecting the respective circumferentially adjacent pairs of minute protrusions, and disposed to circumferentially alternate with the minute protrusions, and the minute protrusion have a cross-sectional shape along the circumferential direction that is a circular arc shape having a radius of 1 mm to 30 mm, or a trapezoidal shape having oblique sides each defining an angle of 45° or less with respect to the circumferential direction. Therefore, while the bearing is rotating, an oil film due to the wedge film effect is formed between the minute protrusions and the other of the seal-side sliding surface and the cage-side sliding surface, and the oil film causes a fluid lubrication state between the seal-side sliding surface and the cage-side sliding surface, so that the contact resistance between the cage and the seal member can be reduced to be extremely small. Also, the heights of the minute protrusions from the flat surfaces are set in the range of 0.01 mm to 0.50 mm, the circumferential widths of the minute protrusions are set in the range of 0.3 to 4.0 mm, and the circumferential widths of the flat surfaces are set in the range of 0.3 to 4.0 mm. Therefore, not only while the bearing is rotating at a high speed, but also while the bearing is rotating at a relatively low speed, it is possible to stably create a fluid lubrication state between the seal-side sliding surface and the cage-side sliding surface. As described above, since the sliding resistance between the cage and the seal member can be reduced to be extremely small in this sealed bearing, it is not necessary to ensure an axial space between the cage and the seal member, so that it is easy to set the axial width of the bearing to be small.

It is preferable to adopt an arrangement in which the seal member includes a rubber member that is vulcanization-molded, the seal-side sliding surface is disposed on a surface of the rubber member, and the minute protrusions and the flat surfaces are formed on the seal-side sliding surface.

With this arrangement, since the minute protrusions and the flat surfaces can be formed by vulcanization molding of the rubber member, the minute protrusions and the flat surfaces can be formed at low machining cost.

It is preferable to adopt an arrangement in which the seal member is formed of a resin or a mild steel, and the minute protrusions and the flat surfaces are formed on the seal-side sliding surface.

With this arrangement, since the minute protrusions and the flat surfaces can be formed by injection molding of a resin or press forming of a mild steel, the minute protrusions and the flat surfaces can be formed at low machining cost.

The seal member may be formed of a solid lubricant containing a lubricant and a resin as main components thereof.

An arrangement can be adopted in which the cage includes: a cage circular annular portion circumferentially extending in a region axially sandwiched between a passage region through which the rolling elements pass and the seal member; and cage claws having a cantilevered structure, and each axially extending from the cage circular annular portion so as to be located between a corresponding circumferentially adjacent pair of the rolling elements, and the cage-side sliding surface is disposed on a surface of the cage circular annular portion axially opposed to the seal member.

With this arrangement, it is possible to reduce radially outward inclination of the cantilever-shaped cage claws due to a centrifugal force during rotation of the bearing. Specifically, if a cage (so-called crown cage) is used which includes a cage circular annular portion; and cantilever-shaped cage claws axially extending from the cage circular annular portion, torsional deformation occurs in the cage circular annular portion due to the centrifugal force acting on the cantilever-shaped cage claws during rotation of the bearing, and the cage claws are inclined radially outward due to the torsional deformation, so that the contact between the cage claws and the rolling elements could become unstable. To address this problem, if the above arrangement is adopted, in which the cage-side sliding surface is disposed on a surface of the cage circular annular portion axially opposed to the seal member, since the cage circular annular portion is supported by the seal member due to the sliding contact between the minute protrusions and the other sliding surface, it is possible to reduce torsional deformation of the cage circular annular portion due to the centrifugal force received by the cage claws during rotation of the bearing, and to reduce radially outward inclination of the cage claws.

The cage can be a resin cage or a mild steel cage.

The sealed bearings with the arrangements according to the above first to third inventions are particularly suitable for use as bearings of an electric motor of an electric vehicle, or as bearings of an electric vehicle transmission for reducing rotation of the electric motor.

In the sealed bearing of the first invention, when the seal member is vulcanization-molded using an upper mold part and a lower mold part, the vulcanization-molding can be performed in a state where the metal core portion(s) corresponding to the first opening(s) of the rubber member and the metal core portion(s) corresponding to the second opening(s) of the rubber member are supported by the lower mold part. Since the first opening(s) of the rubber member is located on the radially outer side of the minute protrusions and the second opening(s) of the rubber member is located radially inner side of the minute protrusions, the metal core is supported on both the radially outer side of the minute protrusions and the radially inner side of the minute protrusions. Therefore, when an unvulcanized rubber material is sandwiched and pressurized between the upper mold part and the lower mold part, the metal core is not deformed easily by the pressurization, so that the pressurization to the rubber material with the upper mold part and the lower mold part can be made sufficiently strong, and the minute protrusions of the rubber member can be stably molded.

In the sealed bearing of the second invention, when, during rotation of the bearing, the sliding contact distal end surfaces of the minute protrusions on one of the seal-side sliding surface and the cage-side sliding surface come into sliding contact with the sliding contact flat surface, which is formed on the other of the seal-side sliding surface and the cage-side sliding surface and is smooth around the entire circumference, since the sliding contact distal end surfaces of the minute protrusions have a shape linearly extending radially, lubricating oil is not pushed aside easily by the minute protrusions, and the lubricating oil is easily drawn into the sliding contact portions of the minute protrusions. Therefore, an oil film due to the wedge film effect is formed between the sliding contact distal end surfaces of the minute protrusions and the sliding contact flat surface, and the oil film causes a fluid lubrication state between the sliding contact distal end surfaces and the sliding contact flat surface, so that the contact resistance between the cage and the seal member can be reduced to be extremely small.

Also, since each sliding contact distal end surface and the sliding contact flat surface are disposed such that while the bearing is stationary, the sliding contact distal end surface and the sliding contact flat surface are non-parallelly opposed to each other at an angle in a direction in which the space between the sliding contact distal end surface and the sliding contact flat surface widens from the radially inner side toward the radially outer side, while the bearing is rotating at a high speed, it is possible to stably form an oil film between the sliding contact distal end surfaces and the sliding contact flat surface due to the wedge film effect. That is, while the bearing is rotating at a high speed, the cage circular annular portion is deformed by the centrifugal force acting on the cage claws, and the deformation causes the sliding contact distal end surface and the sliding contact flat surface to parallelly approach each other, so that it is possible to stably form an oil film due to the wedge film effect between the sliding contact distal end surfaces and the sliding contact flat surface.

In the sealed bearing of the third invention, one of the seal-side sliding surface and the cage-side sliding surface is formed with a plurality of minute protrusions configured to come into sliding contact with the other of the seal-side sliding surface and the cage-side sliding surface; and flat surfaces connecting the respective circumferentially adjacent pairs of minute protrusions, and disposed to circumferentially alternate with the minute protrusions, and the minute protrusion have a cross-sectional shape along the circumferential direction that is a circular arc shape having a radius of 1 mm to 30 mm, or a trapezoidal shape having oblique sides each defining an angle of 45° or less with respect to the circumferential direction. Therefore, while the bearing is rotating, an oil film due to the wedge film effect is formed between the minute protrusions and the other of the seal-side sliding surface and the cage-side sliding surface, and the oil film causes a fluid lubrication state between the seal-side sliding surface and the cage-side sliding surface, so that the contact resistance between the cage and the seal member can be reduced to be extremely small. Also, the heights of the minute protrusions from the flat surfaces are set in the range of 0.01 mm to 0.50 mm, the circumferential widths of the minute protrusions are set in the range of 0.3 to 4.0 mm, and the circumferential widths of the flat surfaces are set in the range of 0.3 to 4.0 mm. Therefore, not only while the bearing is rotating at a high speed, but also while the bearing is rotating at a relatively low speed, it is possible to stably create a fluid lubrication state between the seal-side sliding surface and the cage-side sliding surface. As described above, since the sliding resistance between the cage and the seal member can be reduced to be extremely small in this sealed bearing, it is not necessary to ensure an axial space between the cage and the seal member, so that it is easy to set the axial width of the bearing to be small.

DETAILED DESCRIPTION OF THE INVENTION

Figure 1:
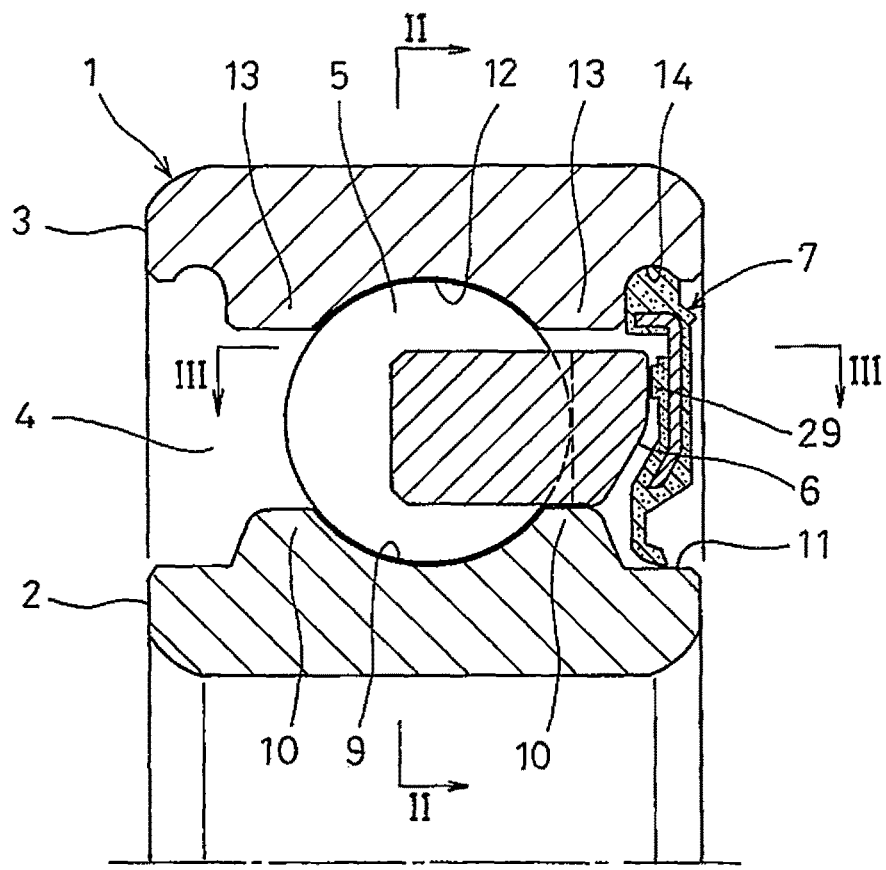
FIG. 1 is a sectional view of a sealed bearing according to a first embodiment of the first invention.
Figure 1:
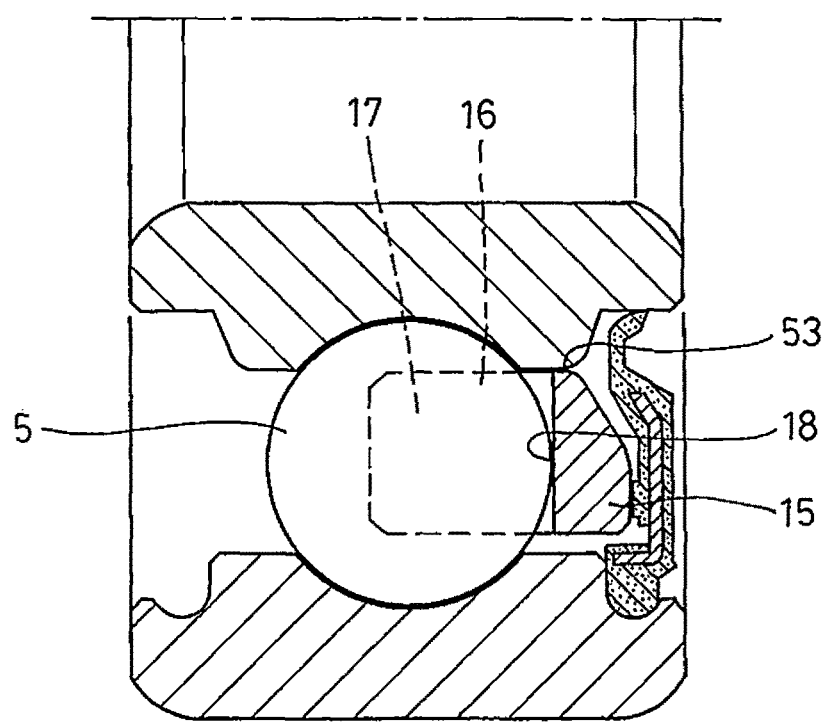

FIG. 1 illustrates a sealed bearing 1 according to a first embodiment of the first invention. The sealed bearing 1 of the first embodiment includes an inner ring 2; an outer ring 3 arranged radially outwardly of, and coaxially with, the inner ring 2; a plurality of rolling elements 5 disposed in an annular space 4 defined between the inner ring 2 and the outer ring 3 so as to be circumferentially spaced apart from each other; an annular resin cage 6 (hereinafter simply referred to as the "cage 6") that retains the circumferential intervals between the plurality of rolling elements 5; and an annular seal member 7 that closes one of the end openings of the annular space 4 on both axial sides thereof. The rolling elements 5 are balls.

The inner ring 2 has, on its outer periphery, an inner ring raceway groove 9 with which the rolling elements 5 are in rolling contact; a pair of inner ring groove shoulders 10 located axially outwardly of the inner ring raceway groove 9; and a sliding recess 11 located axially outwardly of one of the inner ring groove shoulders 10. The inner ring raceway groove 9 is a circular arc-shaped groove having a concave circular arc-shaped cross section along the surface of each of the rolling elements 5, and circumferentially extends at the axial center of the outer periphery of the inner ring 2. The pair of inner ring groove shoulders 10 are bank-shaped portions circumferentially extending on both axial sides of the inner ring raceway groove 9. The sliding recess 11 is a circumferentially extending recess formed axially outwardly of the one inner ring groove shoulder 10 so as to be adjacent to the one inner ring groove shoulder 10. The seal member 7 is in sliding contact with the inner surface of the sliding recess 11.

The outer ring 3 has, on its inner periphery, an outer ring raceway groove 12 with which the rolling elements 5 are in rolling contact; a pair of outer ring groove shoulders 13 located axially outwardly of the outer ring raceway groove 12; and a seal fixing groove 14 located axially outwardly of one of the outer ring groove shoulders 13. The outer ring raceway groove 12 is a circular arc-shaped groove having a concave circular arc-shaped cross section along the surface of each of the rolling elements 5, and circumferentially extends at the axial center of the inner periphery of the outer ring 3. The pair of outer ring groove shoulders 13 are bank-shaped portions circumferentially extending on both axial sides of the outer ring raceway groove 12. The seal fixing groove 14 is a circumferentially extending groove formed axially outwardly of the one outer ring groove shoulder 13 so as to be adjacent to the one outer ring groove shoulder 13. The seal member 7 is fixedly fitted in the seal fixing groove 14.

The rolling elements 5 are radially sandwiched between the outer ring raceway groove 12 and the inner ring raceway groove 9. The sealed bearing 1 is a deep-groove ball bearing. That is, the outer ring raceway groove 12 is a circular arc-shaped groove symmetrical with respect to the axial center of the outer ring 3, and the inner ring raceway groove 9 is also a circular arc-shaped groove symmetrical with respect to the axial center of the inner ring 2. The axial width dimension of the outer ring raceway groove 12 is larger than half of the diameter of each rolling element 5, and the axial width dimension of the inner ring raceway groove 9 is larger than half of the diameter of each rolling element 5.

The cage 6 includes a cage circular annular portion 15 circumferentially extending in a region axially sandwiched between a passage region through which the rolling elements 5 pass and the seal member 7; and a cage claw 16 axially extending from the cage circular annular portion 15 so as to be located between each circumferentially adjacent pair of the rolling elements 5. The cage circular annular portion 15 and the cage claws 16 are formed as a seamless integral member made of a resin composition. As the resin composition forming the cage circular annular portion 15 and the cage claws 16, a resin composition made of only a resin material can be used, but in this embodiment, a resin material to which a fiber-reinforced material is added is used.

As the resin material of the resin composition as its base, polyamide (PA) or super engineering plastic can be adopted. As the polyamide, polyamide 46 (PA46), polyamide 66 (PA66), polynonamethylene terephthalamide (PA9T), or the like can be used. As the super engineering plastic, polyether ether ketone (PEEK) or polyphenylene sulfide (PPS) can be adopted. As the fiber-reinforced material added to the resin material, glass fiber, carbon fiber, aramid fiber, or the like can be adopted.

Each cage claw 16 has a cantilevered structure having one axial end as a fixed end (root of the cage claw 16) fixed to the cage circular annular portion 15 and the other axial end as a free end (distal end of the cage claw 16). The axial length of the cage claw 16 is set to be larger than the radius of the rolling element 5.

Figure 2:
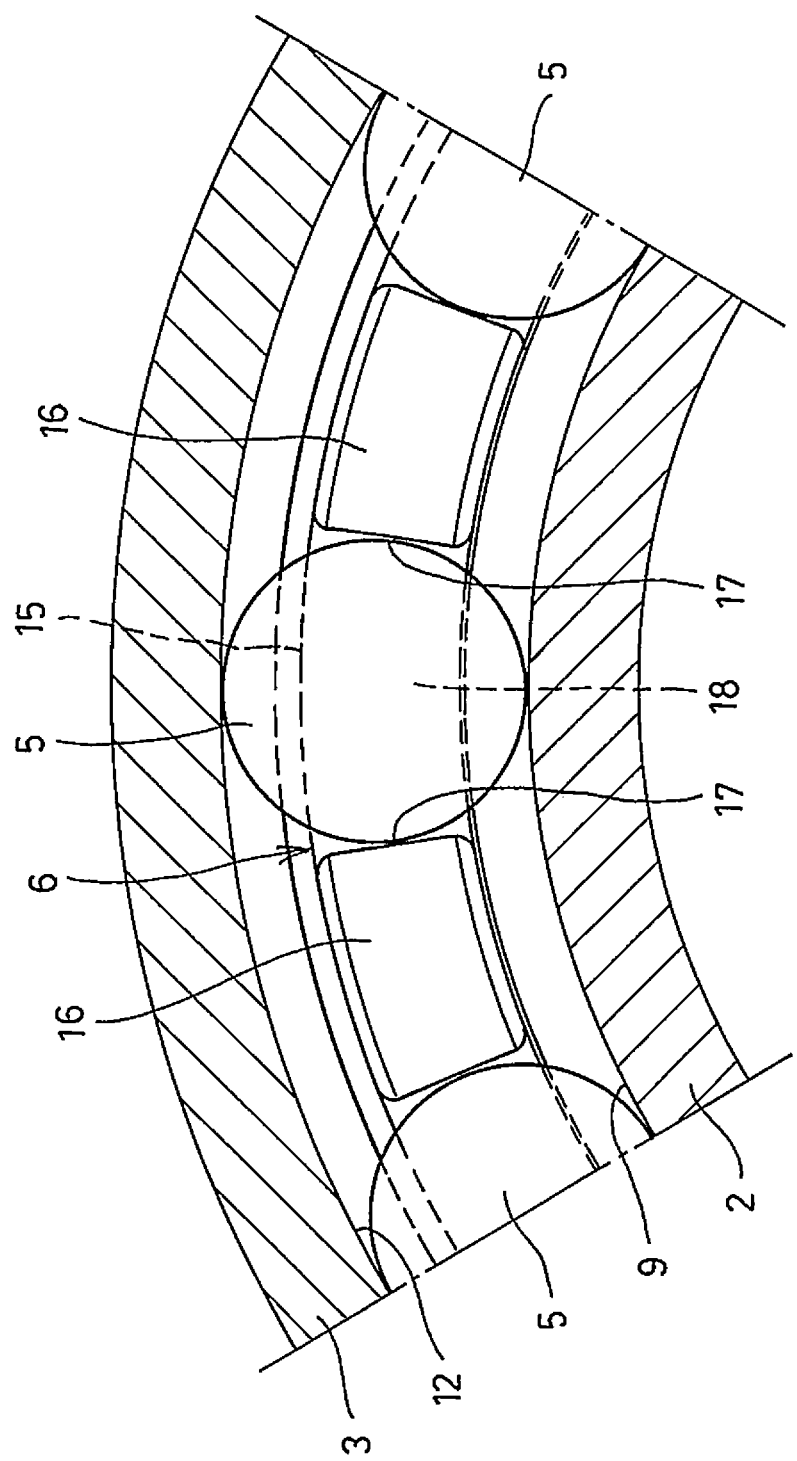
FIG. 2 is a sectional view taken along line II-II in FIG. 1.

As illustrated in FIG. 2, each cage claw 16 has pocket side surfaces 17 circumferentially opposed to the corresponding rolling elements 5, respectively. The portion of each of the pocket side surfaces 17 circumferentially receiving the corresponding rolling element 5 has a flat shape so that the pocket side surfaces 17 do not interfere with the rolling elements 5 when the cage claws 16 move radially outward by a centrifugal force.

Figure 3:
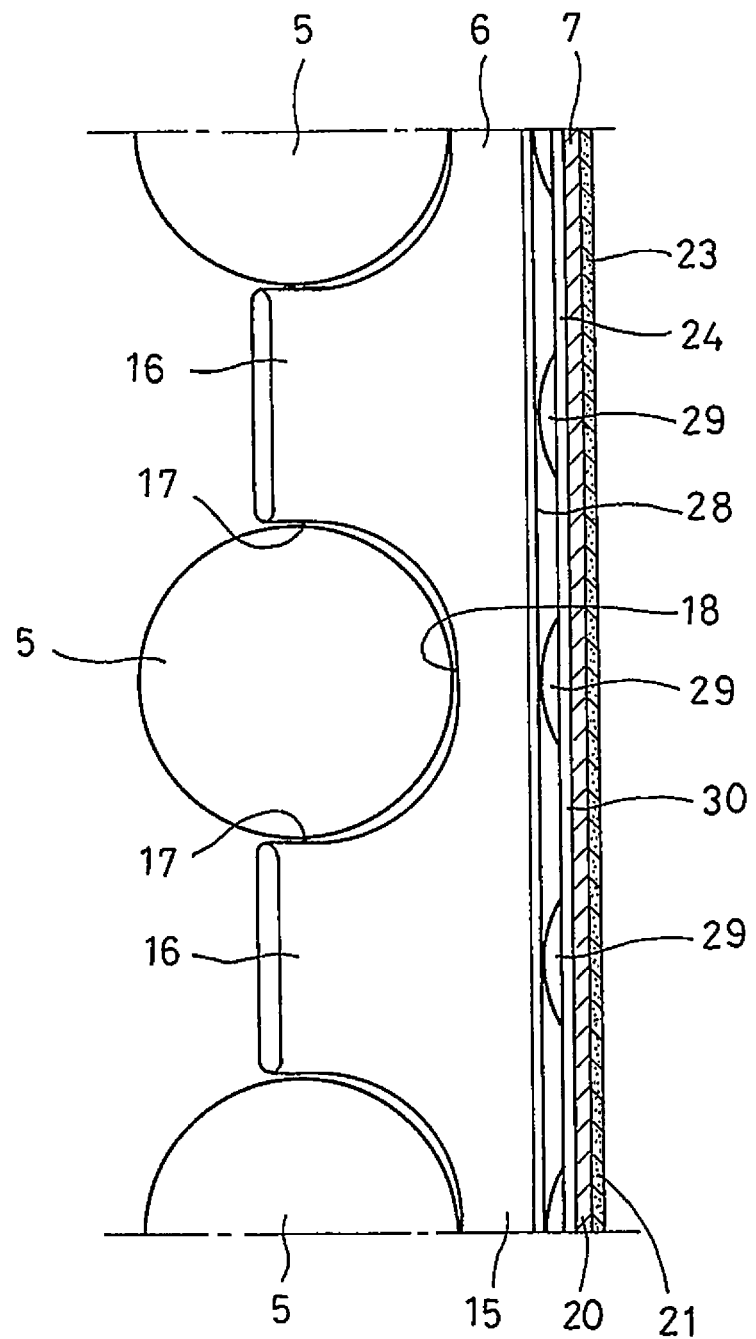
FIG. 3 is a sectional view taken along line III-III in FIG. 1.

As illustrated in FIG. 3, the portion of each pocket side surface 17 circumferentially receiving the corresponding rolling element 5 has a straight shape that is not circumferentially inclined and that axially extends straight when seen in the radial direction so that no axial component force is generated when receiving the rolling element 5. The cage circular annular portion 15 has pocket bottom surfaces 18 axially opposed to the respective rolling elements 5. Each pocket side surface 17 and the corresponding pocket bottom surface 18 are connected to each other in a concave circular arc shape when seen in the radial direction.

Figure 4:
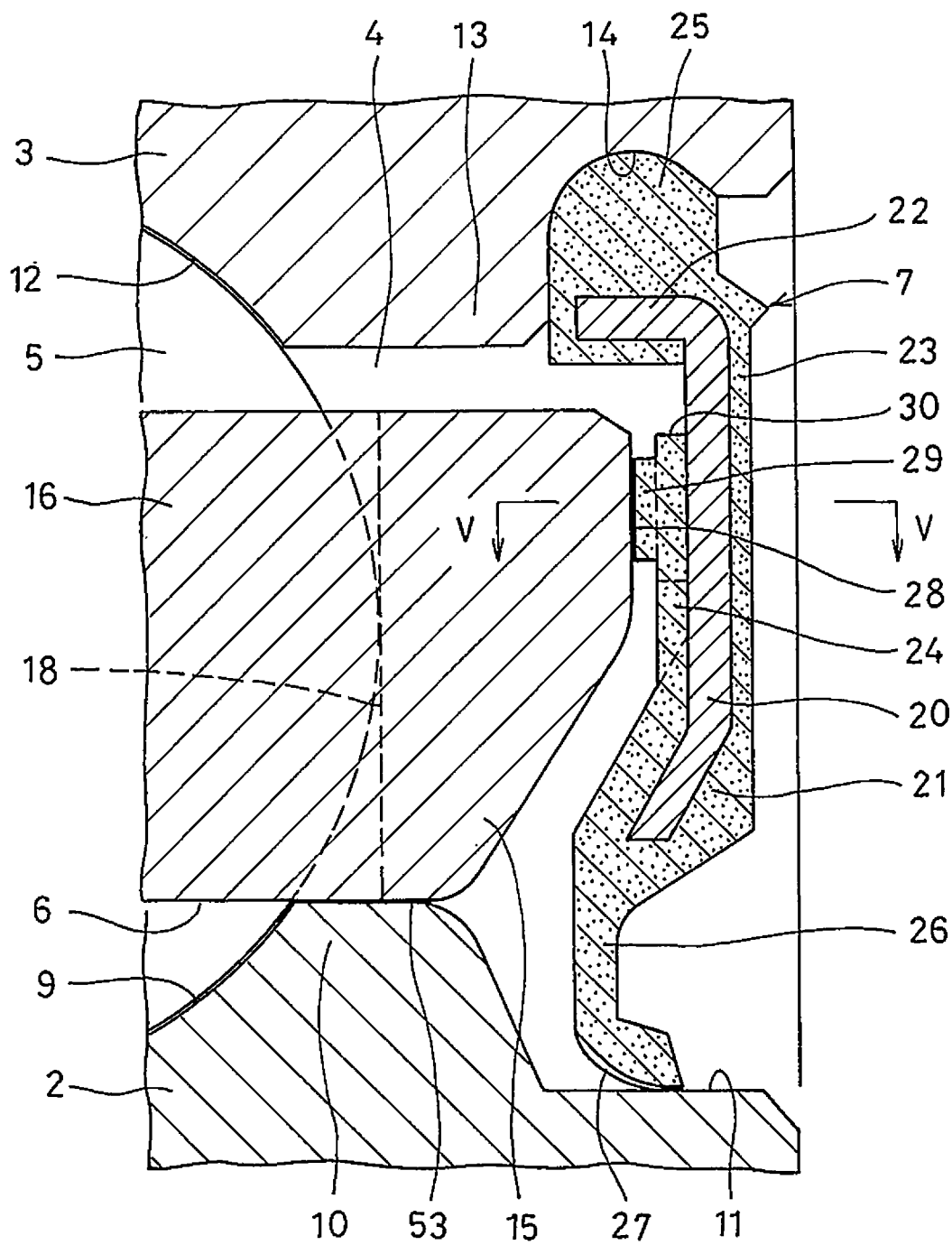
FIG. 4 is an enlarged view illustrating the seal member in FIG. 1, and the vicinity thereof.

As illustrated in FIG. 4, the inner periphery of the cage circular annular portion 15 is guided by the one inner ring groove shoulder 10 on the outer periphery of the inner ring 2. That is, the cage 6 is an inner ring-guided type cage that is radially positioned by coming into contact with the inner ring 2.

The seal member 7 comprises a circular annular plate-shaped metal core 20 axially opposed to the cage 6; and a rubber member 21 vulcanization-bonded to the metal core 20. The metal core 20 is formed by press-molding of a steel plate such as a cold-rolled steel plate or a stainless-steel plate. The metal core 20 includes, at the radially outer end thereof, a cylindrical portion 22 formed by being bent axially inward. The rubber member 21 is formed of, for example, a rubber such as nitrile rubber or acrylic rubber. The rubber member 21 is bonded to the surface of the metal core 20 by vulcanization molding of the rubber member 21 with the metal core 20 disposed in the mold (an upper mold part 34 and a lower mold part 35 in FIG. 8) for the seal member 7.

Figure 5:
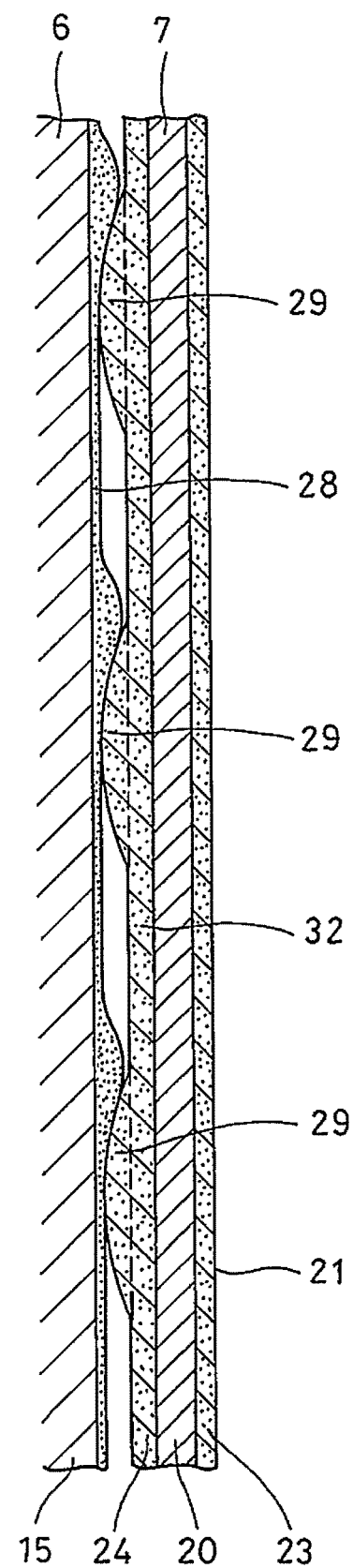
FIG. 5 is a sectional view taken along line V-V in FIG. 4.

The rubber member 21 includes an outer surface rubber portion 23 bonded to the axially outer surface of the metal core 20; an inner surface rubber portion 24 bonded to the axially inner surface of the metal core 20; an outer peripheral rubber portion 25 extending radially outward from the radially outer end of the metal core 20; and a seal lip 26 extending radially inward from the radially inner end of the metal core 20. The outer peripheral rubber portion 25 is fixedly fitted in the seal fixing groove 14 on the inner periphery of the outer ring 3. The seal lip 26 is in sliding contact with the sliding recess 11 on the outer periphery of the inner ring 2. The sliding surface of the seal lip 26 kept in sliding contact with the sliding recess 11 is formed with a plurality of protrusions 27 circumferentially spaced apart from each other, and extending in a direction orthogonal to the circumferential direction. Each protrusion 27 has a convex circular arc-shaped cross section, As illustrated in FIGS. 4 and 5, the inner surface rubber portion 24 has a plurality of minute protrusions 29 circumferentially spaced apart from each other, and kept in sliding contact with the axial side surface 28 of the cage 6. In the relevant drawing, for easy recognition of the presence of the minute protrusions 29, the axial heights of the minute protrusions 29 are exaggerated, but the axial heights of the minute protrusions 29 are extremely small and 0.5 mm or less.

As illustrated in FIG. 5, the minute protrusions 29 are formed such that the cross-sectional shape of each minute protrusion 29 orthogonal to the radial direction is an axially convex circular arc shape. The minute protrusions 29 may be formed such that the cross-sectional shape of each minute protrusion 29 orthogonal to the radial direction is an axially convex trapezoidal shape. The axial side surface 28 of the cage 6 (surface with which the minute protrusions 29 are in sliding contact) is a flat surface that is orthogonal to the axial direction and smooth around the entire circumference.

As illustrated in FIG. 4, the minute protrusions 29 are disposed at positions overlapping with the pitch circle of the rolling elements 5 (imaginary circle connecting the centers of the plurality of rolling elements 5), or disposed radially outwardly of the pitch circle of the rolling elements 5. Here, the expression "the minute protrusions 29 are disposed at positions overlapping with the pitch circle of the rolling elements 5" refers to the positional relationship where an imaginary cylindrical surface passing through the pitch circle of the rolling elements 5 passes through the positions of the minute protrusions 29, and the expression "the minute protrusions 29 are disposed radially outwardly of the pitch circle of the rolling elements 5" refers to the positional relationship where the entire minute protrusions 29 are radially outwardly of the imaginary cylindrical surface passing through the pitch circle of the rolling elements 5. In the drawing, the minute protrusions 29 are disposed radially outwardly of the pitch circle of the rolling elements 5.

As illustrated in FIGS. 4 and 5, the outer surface rubber portion 23 is formed so as to cover the entire area of the axially outer surface of the metal core 20. That is, the axially outer surface of the metal core 20 is not exposed from the rubber member 21, so that even when the sealed bearing of this embodiment is used in an environment in which the sealed bearing is exposed to foreign matter such as water, it is possible to prevent foreign matter such as water from adhering to the metal core 20, and thus to prevent the metal core 20 from being rusted.

Figure 6:
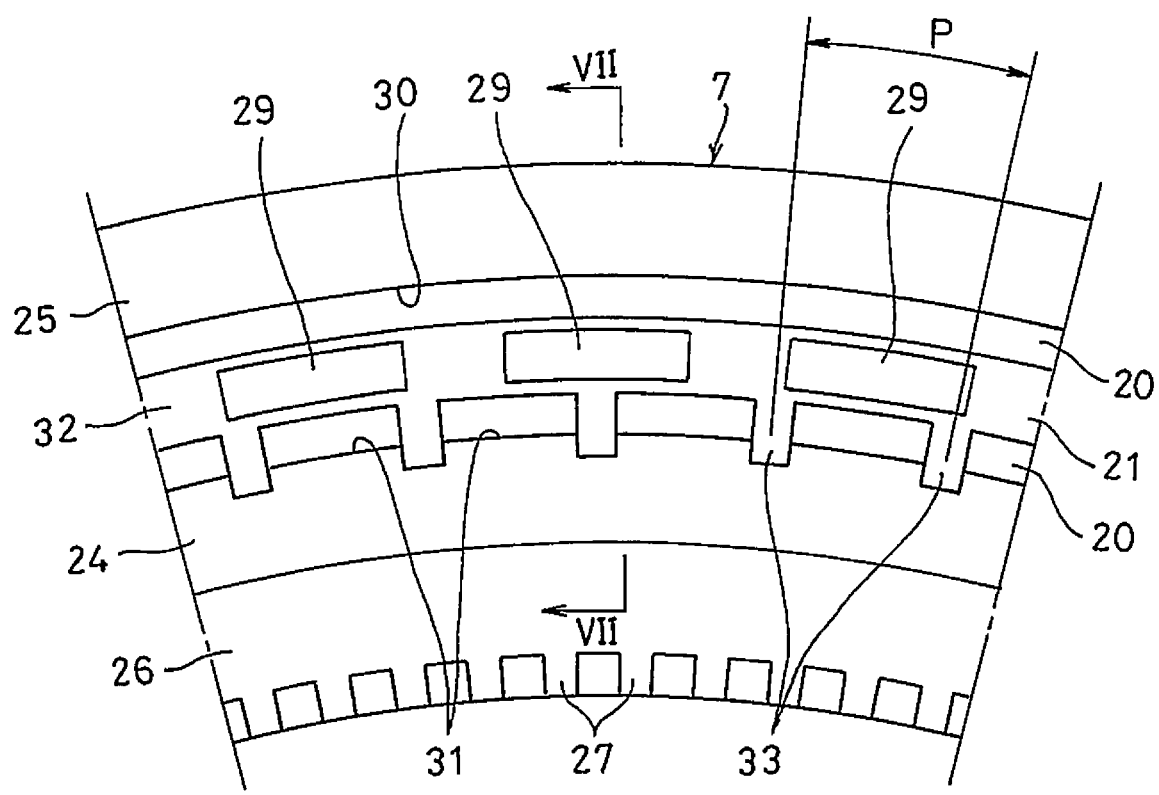
FIG. 6 is a view of the seal member illustrated in FIG. 4 when seen from the axially inner side.
Figure 7:
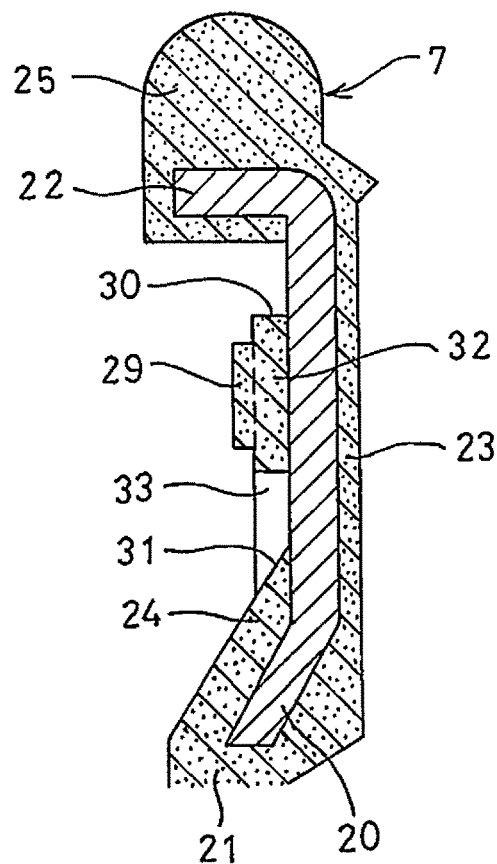
FIG. 7 is a sectional view taken along line VII-VII in FIG. 6.
Figure 13:
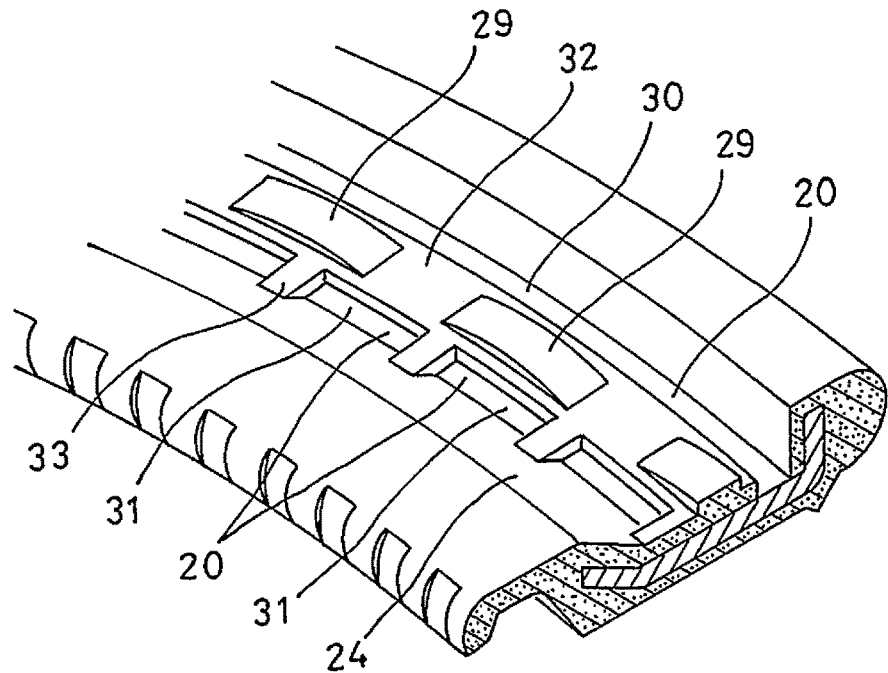
FIG. 13 is a perspective view of the seal member illustrated in FIG. 6.

As illustrated in FIGS. 6, 7, and 13, the inner surface rubber portion 24 has a circular annular opening 30 through which the axially inner surface of the metal core 20 is continuously exposed on the same circumference passing on the radially outer side of the minute protrusions 29, entirely around the same circumference; and a plurality of circular arc-shaped openings 31 through which the axially inner surface of the metal core 20 is discontinuously exposed at circumferentially spaced apart positions on the same circumference passing on the radially inner side of the minute protrusions 29.

The inner surface rubber portion 24 includes a protrusion formation circular annular portion 32 for protrusion formation on the radially inner side of the circular annular opening 30 and on the radially outer side of the circular arc-shaped openings 31. The minute protrusions 29 are circumferentially formed at equal intervals on the axially inner surface of the protrusion formation circular annular portion 32. The inner surface rubber portion 24 further includes a plurality of radially extending portions 33 that extend radially inward from the protrusion formation annular portion 32 so as to be each located between the corresponding circumferentially adjacent circular arc-shaped openings 31. The radially extending portions 33 are circumferentially disposed at equal intervals of 10° or less. That is, as illustrated in FIG. 6, the plurality of radially extending portions 33 are disposed at equal intervals such that the interval P between the circumferential center positions of each adjacent pair of the radially extending portions 33 is a predetermined angle of 10° or less.

In this sealed bearing 1, as illustrated in FIGS. 4 and 5, the plurality of minute protrusions 29 are disposed on the inner surface rubber portion 24 of the seal member 7 so as to be circumferentially spaced apart from each other, and so as to be in sliding contact with the axial side surface 28 of the cage 6. Therefore, as illustrated in FIG. 5, an oil film due to the wedge film effect is formed between the minute protrusions 29 on the inner surface rubber portion 24 and the axial side surface 28 of the cage 6 while the bearing is rotating, and the oil film causes a fluid lubrication state between the contact surfaces of the cage 6 and the seal member 7, so that the contact resistance between the cage 6 and the seal member 7 can be reduced to be extremely small. Therefore, it is possible to prevent abnormal heat generation due to the sliding resistance of the contact portions of the cage 6 and the seal member 7.

Here, there are two types of lubrication states between sliding surfaces, i.e., a boundary lubrication state and a fluid lubrication state. The boundary lubrication state refers to a state in which sliding surfaces are lubricated with an oil film constituted by several molecular layers (about 10-5 to 10-6 mm) of lubricating oil adsorbed to the sliding surfaces, and fine irregularities of the sliding surfaces are in direct contact with each other. On the other hand, the fluid lubrication state refers to a state in which an oil film (for example, about 10-3 to 10-1 mm) is formed between sliding surfaces by the wedge film effect, and due to the oil film, the sliding surfaces are not in direct contact with each other (state in which they are in indirect contact with each other via the oil film). When the wedge film effect occurs and the fluid lubrication state is created, the sliding resistance becomes substantially zero.

Figure 8:
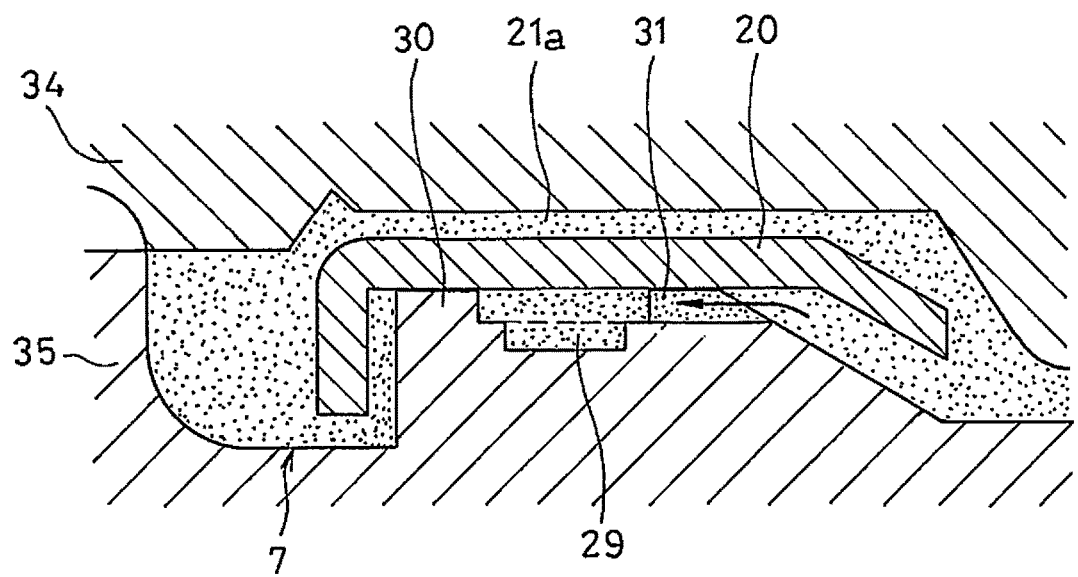
FIG. 8 is a sectional view illustrating a state in which the seal member illustrated in FIG. 7 is being vulcanization-molded using an upper mold part and a lower mold part.

In addition, for this sealed bearing 1, as illustrated in FIG. 8, when the seal member 7 is vulcanization-molded using the upper mold part 34 and the lower mold part 35, it is possible to stably form the minute protrusions 29 of the rubber member 21.

Figure 9:
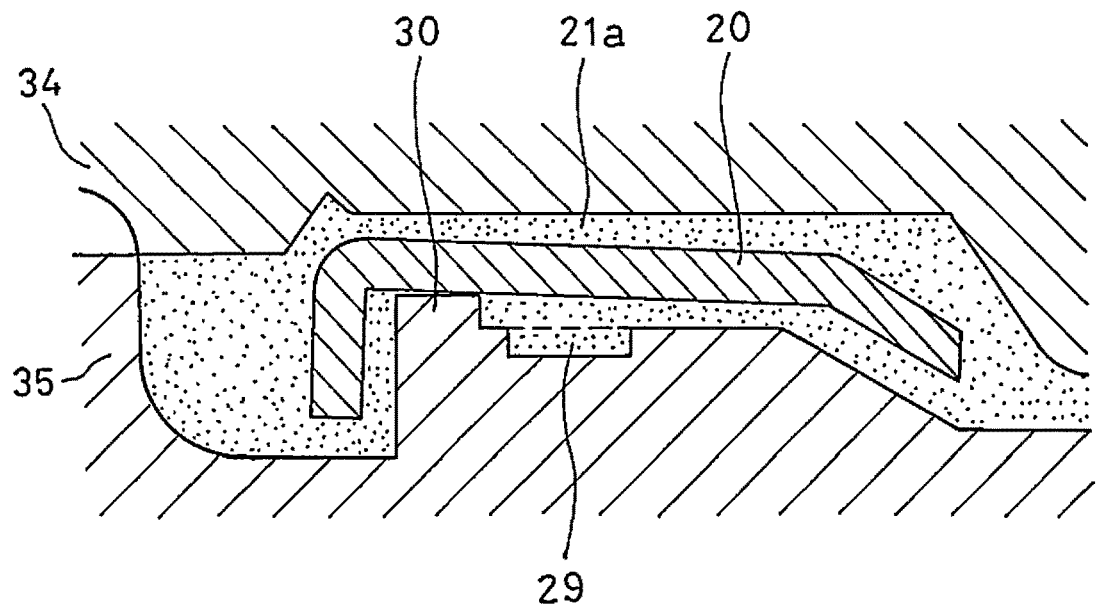
FIG. 9 is a sectional view illustrating a state in which a seal member of a Comparative Example is being vulcanization-molded using an upper mold part and a lower mold part.

For example, assuming vulcanization-molding of a seal member of a comparative example including, of the two kinds of openings illustrated in FIG. 7, i.e., the circular arc-shaped openings 31 and the circular annular opening 30, only the circular annular opening 30, when the seal member is vulcanization-molded using the upper mold part 34 and the lower mold part 35 as illustrated in FIG. 9, since the portion of the metal core 20 supported by the lower mold part 35 is only one portion in the radial direction (only the portion corresponding to the circular annular opening 30), there is a problem in that when an unvulcanized rubber material 21a is sandwiched and pressurized between the upper mold part 34 and the lower mold part 35, the metal core 20 is deformed by the pressurization as illustrated in FIG. 9. In order to prevent the deformation of the metal core 20, if the pressurization of the unvulcanized rubber material 21a by the upper mold part 34 and the lower mold part 35 is reduced, the minute protrusions 29 cannot be stably formed.

In contrast, for the sealed bearing 1 of the above embodiment, as illustrated in FIG. 8, when the seal member 7 is vulcanization-molded using the upper mold part 34 and the lower mold part 35, the vulcanization-molding can be performed in a state where the portion of the metal core 20 corresponding to the circular annular opening 30 and the portions of the metal core 20 corresponding to the circular arc-shaped openings 31 are supported by the lower mold part 35. Here, since the circular annular opening 30 is located radially outwardly of the minute protrusions 29, and the circular arc-shaped openings 31 are located radially inwardly of the minute protrusions 29, the metal core 20 is supported on both the radially outer side of the minute protrusions 29 and the radially inner side of the minute protrusions 29. Therefore, when the unvulcanized rubber material 21a is sandwiched and pressurized between the upper mold part 34 and the lower mold part 35, the metal core 20 is not deformed easily by the pressurization, so that the pressurization to the rubber material 21a by the upper mold part 34 and the lower mold part 35 can be made sufficiently strong, and the minute protrusions 29 can be stably formed. As a result, it is possible to ensure the adhesive strength of the rubber member 21 to the metal core 20, at the minute protrusions 29.

In addition, in this sealed bearing 1, as illustrated in FIG. 8, when the unvulcanized rubber material 21a is sandwiched and pressurized between the upper mold part 34 and the lower mold part 35, the portions between the circumferentially adjacent pairs of circular arc-shaped openings 31 function as flow paths for the unvulcanized rubber material 21a. Therefore, when the unvulcanized rubber material 21a is pressurized by the upper mold part 34 and the lower mold part 35, the rubber material 21a can reliably reach the portions where the minute protrusions 29 are to be formed, so that it is possible to obtain the seal member 7 of stable quality.

Further, in this sealed bearing 1, since the radially extending portions 33 (see FIG. 6) are circumferentially disposed at intervals of 10° or less, when the unvulcanized rubber material 21a is sandwiched and pressurized between the upper mold part 34 and the lower mold part 35 as illustrated in FIG. 8, the portions that function as flow paths for the unvulcanized rubber material 21a (the portions between the circumferentially adjacent pairs of circular arc-shaped openings 31) are circumferentially disposed at close intervals of 10° or less. Therefore, the rubber material 21a can reliably reach the portions where the minute protrusions 29 are to be formed, and thus it is possible to obtain the seal member 7 of stable quality.

Figure 10:
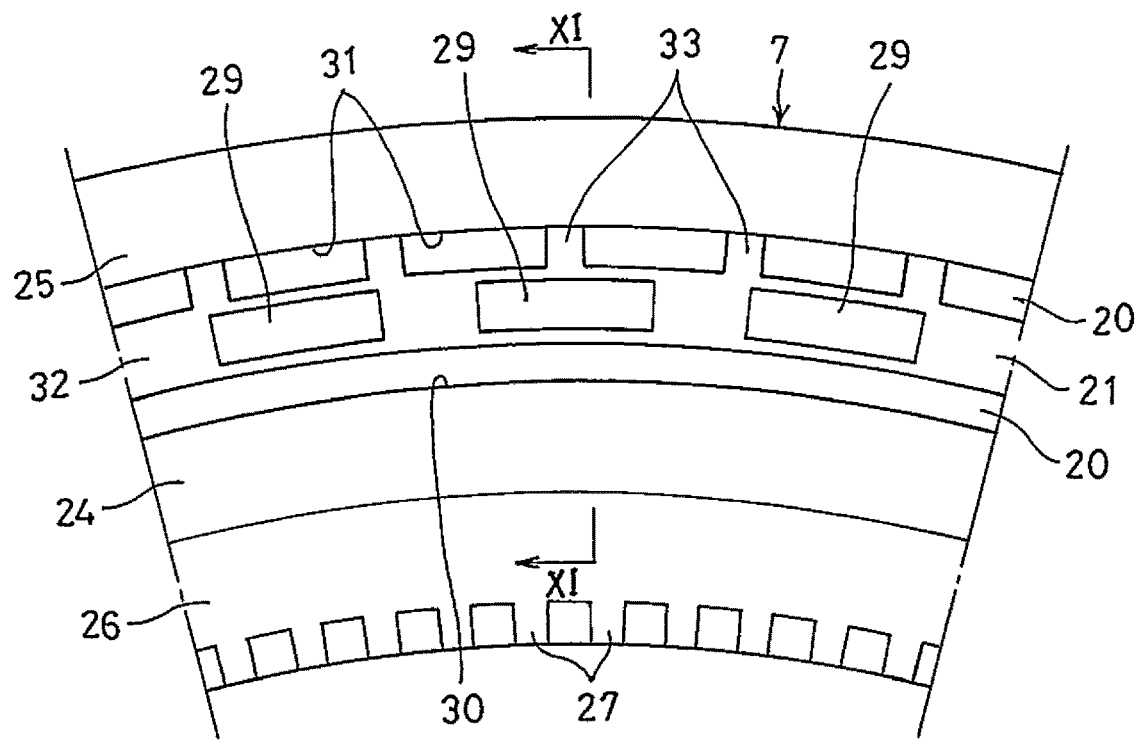
FIG. 10 is a view illustrating a second embodiment of the first invention, and corresponding to FIG. 6.
Figure 11:
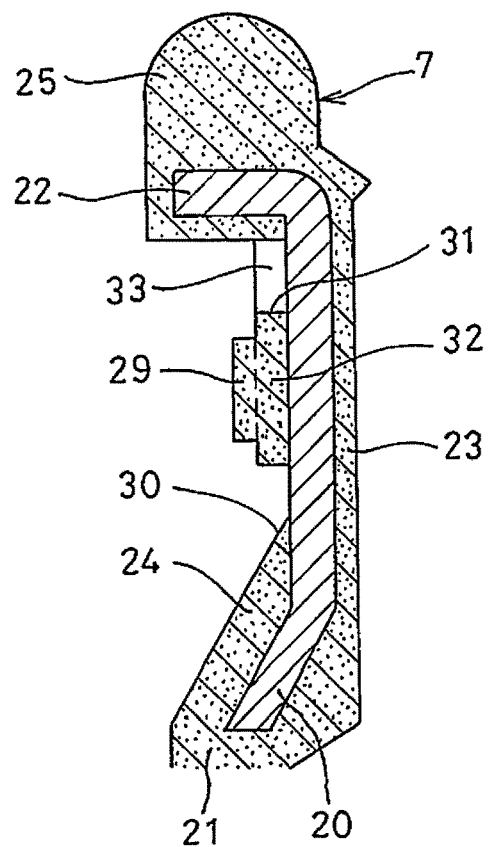
FIG. 11 is a sectional view taken along line XI-XI in FIG. 10.

FIGS. 10 and 11 illustrate a second embodiment of the first invention. In the second embodiment, the circular annular opening 30 and the circular arc-shaped openings 31 of the first embodiment are interchanged. Specifically, when the first and second embodiments are compared, the first and second embodiments are different from each other in that in the first embodiment, of the above-mentioned two kinds of openings, i.e., the circular arc-shaped openings 31 and the circular annular opening 30, the circular annular opening 30 is formed radially outwardly of the minute protrusions 29, and the circular arc-shaped openings 31 are formed radially inwardly of the minute protrusions 29, whereas in the second embodiment, the circular arc-shaped openings 31 are formed radially outwardly of the minute protrusions 29, and the circular annular opening 30 is formed radially inwardly of the minute protrusions 29, and the first and second embodiments are the same in the other configurations. Therefore, the elements of the second embodiment corresponding to those of the first embodiment are denoted by the same reference numerals, and the description thereof is omitted.

Figure 14:
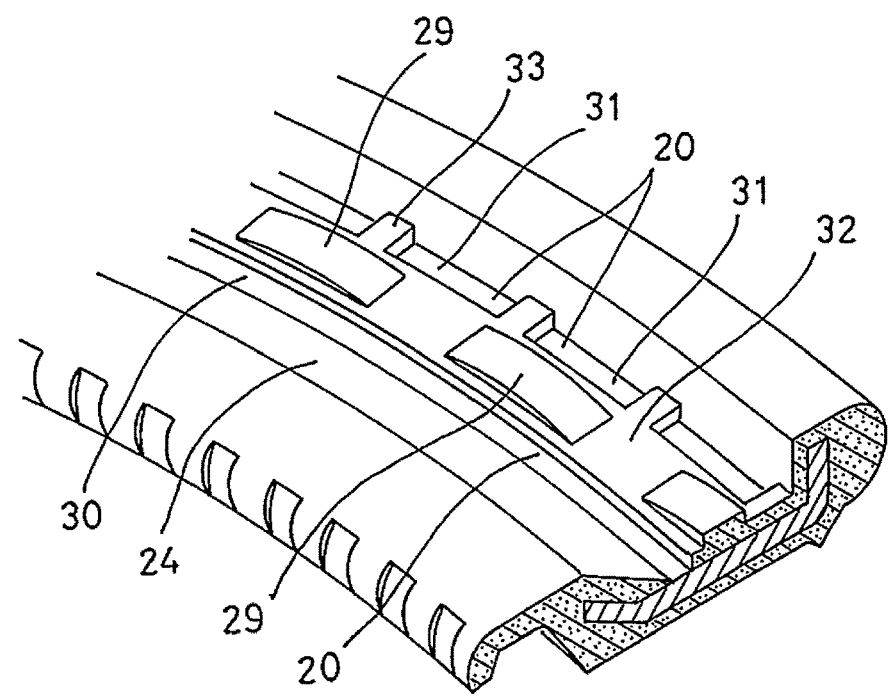
FIG. 14 is a perspective view of the seal member illustrated in FIG. 10.

As illustrated in FIGS. 10, 11, and 14, the inner surface rubber portion 24 has a plurality of circular arc-shaped openings 31 through which the axially inner surface of the metal core 20 is discontinuously exposed at circumferentially spaced apart positions on the same circumference passing on the radially outer side of the minute protrusions 29; and a circular annular opening 30 through which the axially inner surface of the metal core 20 is continuously exposed on the same circumference passing on the radially inner side of the minute protrusions 29, entirely around the same circumference.

The inner surface rubber portion 24 includes a protrusion formation annular portion 32 for protrusion formation on the radially inner side of the circular arc-shaped openings 31 and on the radially outer side of the circular annular opening 30. The minute protrusions 29 are circumferentially formed at equal intervals on the axially inner surface of the protrusion formation annular portion 32. The inner surface rubber portion 24 further includes a plurality of radially extending portions 33 that extend radially outward from the protrusion formation annular portion 32 so as to be each located between the corresponding circumferentially adjacent circular arc-shaped openings 31. The radially extending portions 33 are circumferentially disposed at equal intervals of 10° or less.

Figure 12:
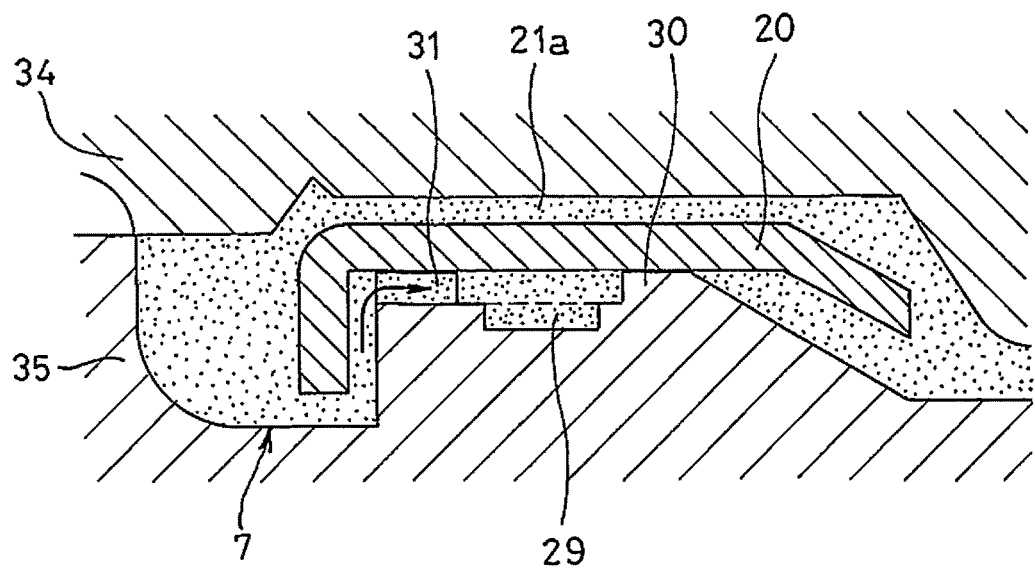
FIG. 12 is a sectional view illustrating a state in which the seal member illustrated in FIG. 10 is being vulcanization-molded using an upper mold part and a lower mold part.

In this sealed bearing 1, too, as in the first embodiment, as illustrated in FIG. 12, when the seal member 7 is vulcanization-molded using the upper mold part 34 and the lower mold part 35, the vulcanization-molding can be performed in a state where the portion of the metal core 20 corresponding to the circular annular opening 30 and the portions of the metal core 20 corresponding to the circular arc-shaped openings 31 are supported by the lower mold part 35. Here, since the circular arc-shaped openings 31 are located radially outwardly of the minute protrusions 29, and the circular annular opening 30 is located radially inwardly of the minute protrusions 29, the metal core 20 is supported on both the radially outer side of the minute protrusions 29 and the radially inner side of the minute protrusions 29. Therefore, when the unvulcanized rubber material 21a is sandwiched and pressurized between the upper mold part 34 and the lower mold part 35, the metal core 20 is not deformed easily by the pressurization, so that the pressurization to the rubber material 21a by the upper mold part 34 and the lower mold part 35 can be made sufficiently strong, and the minute protrusions 29 of the rubber member 21 can be stably formed. As a result, it is possible to ensure the adhesive strength of the rubber member 21 to the metal core 20, at the minute protrusions 29.

In addition, in this sealed bearing 1, as illustrated in FIG. 12, when the unvulcanized rubber material 21a is sandwiched and pressurized between the upper mold part 34 and the lower mold part 35, the portions between the circumferentially adjacent pairs of circular arc-shaped openings 31 function as flow paths for the unvulcanized rubber material 21a. Therefore, when the unvulcanized rubber material 21a is pressurized by the upper mold part 34 and the lower mold part 35, the rubber material 21a can reliably reach the portions where the minute protrusions 29 are to be formed, so that it is possible to obtain the seal member 7 of stable quality. The other actions and effects are also the same as those of the first embodiment.

While, in the above embodiment, the description has been given taking, as an example, a ball bearing in which balls are used as the rolling elements 5, the present invention can also be applied to a roller bearing in which rollers are used as the rolling elements 5.

Also, while, in the above embodiment, the description has been given taking, as an example of the seal member 7, a contact seal in which the seal lip 26 of the rubber member 21 is in sliding contact with the outer periphery of the inner ring 2, the present invention can also be applied to a non-contact seal in which the seal lip 26 of the rubber member 21 defines a minute labyrinth gap between the seal lip 26 and the outer periphery of the inner ring 2.

Figure 15:
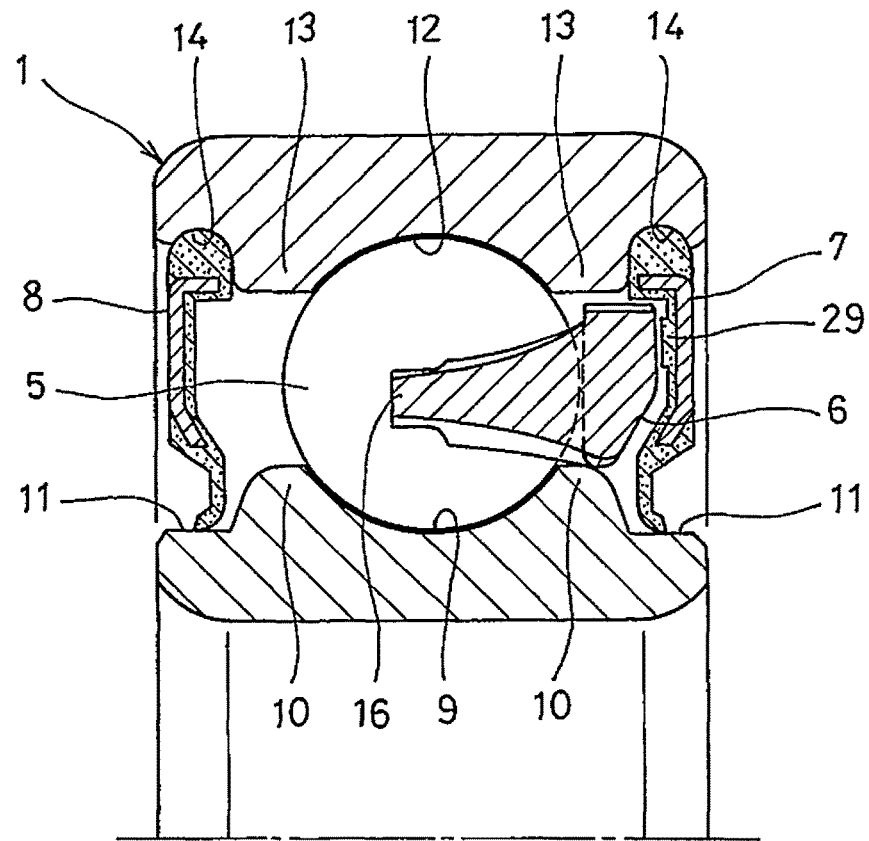
FIG. 15 is a sectional view of a sealed bearing according to an embodiment of the second invention.
Figure 15:
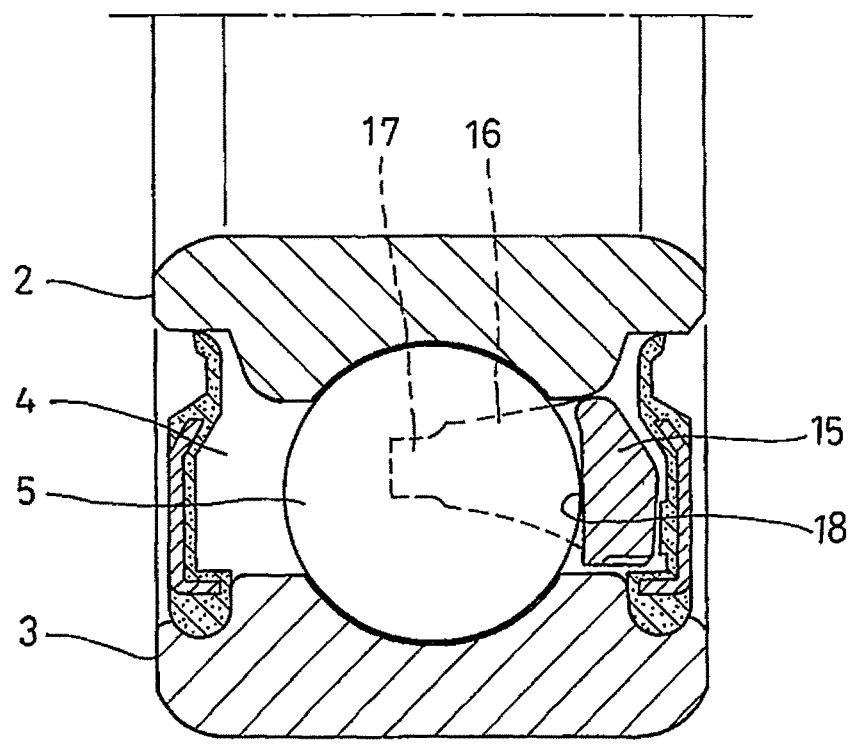

FIG. 15 illustrates a sealed bearing 1 according to an embodiment of the second invention. Hereinafter, the elements of this embodiment corresponding to those of the embodiments of the first invention are denoted by the same reference numerals, and the description thereof is omitted. In each embodiment of the first to third inventions, the elements denoted by the same reference numerals are basically the same in structure.

The sealed bearing 1 includes an inner ring 2; an outer ring 3 arranged radially outwardly of, and coaxially with, the inner ring 2; a plurality of rolling elements 5 disposed in an annular space 4 defined between the inner ring 2 and the outer ring 3 so as to be circumferentially spaced apart from each other; a cage 6 that retains the circumferential intervals between the plurality of rolling elements 5; an annular seal member 7 that closes one (end opening on the right side in the drawing) of the end openings of the annular space 4 on both axial sides thereof; and an annular seal member 8 that closes the other end opening (end opening on the left side in the drawing). A lubricant such as grease (not shown) is sealed in the annular space 4.

The inner ring 2 has, on its outer periphery, an inner ring raceway groove 9 with which the rolling elements 5 are in rolling contact; a pair of inner ring groove shoulders 10 located axially outwardly of the inner ring raceway groove 9; and a pair of sliding recesses 11 located axially outwardly of the respective inner ring groove shoulders 10. The seal members 7 and 8 are in sliding contact with the inner surfaces of the pair of sliding recesses 11, respectively.

The outer ring 3 has, on its inner periphery, an outer ring raceway groove 12 with which the rolling elements 5 are in rolling contact; a pair of outer ring groove shoulders 13 located axially outwardly of the outer ring raceway groove 12; and a pair of seal fixing grooves 14 located axially outwardly of the respective outer ring groove shoulders 13. The seal members 7 and 8 are fixedly fitted in the respective seal fixing grooves 14.

Figure 18:
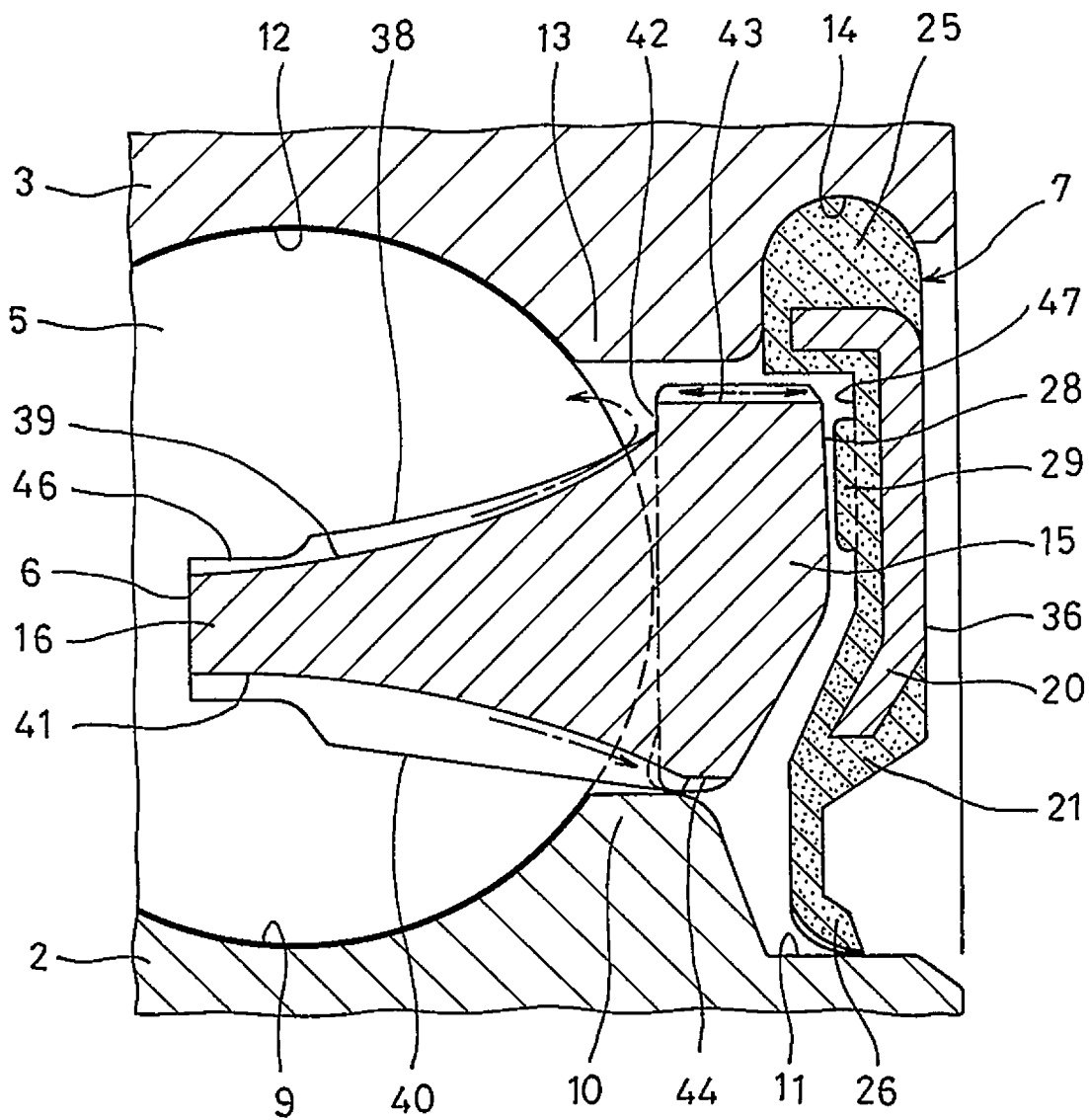
FIG. 18 is a sectional view taken along line XVIII-XVIII in FIG. 17.

As illustrated in FIG. 18, the seal member 7 is an annular member comprising an annular metal core 20 and a rubber member 21 (for example, nitrile rubber, acrylic rubber, or the like) fixed to the metal core 20. The rubber member 21 is fixed to the metal core 20 by vulcanization insert molding. That is, the rubber member 21 is vulcanization-molded with the metal core 20 disposed in a mold for vulcanization molding of the rubber member 21, whereby the rubber member 21 is fixedly bonded to the surface of the metal core 20.

The seal member 7 includes a fitting portion (outer peripheral rubber portion) 25 fitted in one of the seal fixing grooves 14; a circular annular plate portion 36 extending radially inward from the fitting portion 25; and a seal lip 26 in sliding contact with the inner surface of one of the sliding recesses 11. The fitting portion 25 is disposed at the radially outer end of the seal member 7. The seal lip 26 is disposed at the radially inner end of the seal member 7. The surface portion of the inner surface of the one sliding recess 11 in sliding contact with the seal lip 26 is a cylindrical surface having a constant outer diameter along the axial direction.

Each cage claw 16 has a tapered shape tapered such that the radial thickness gradually decreases from the side close to the cage circular annular portion 15 toward the side remote from the cage circular annular portion 15 (gradually decreases from the root toward the distal end).

Figure 16:
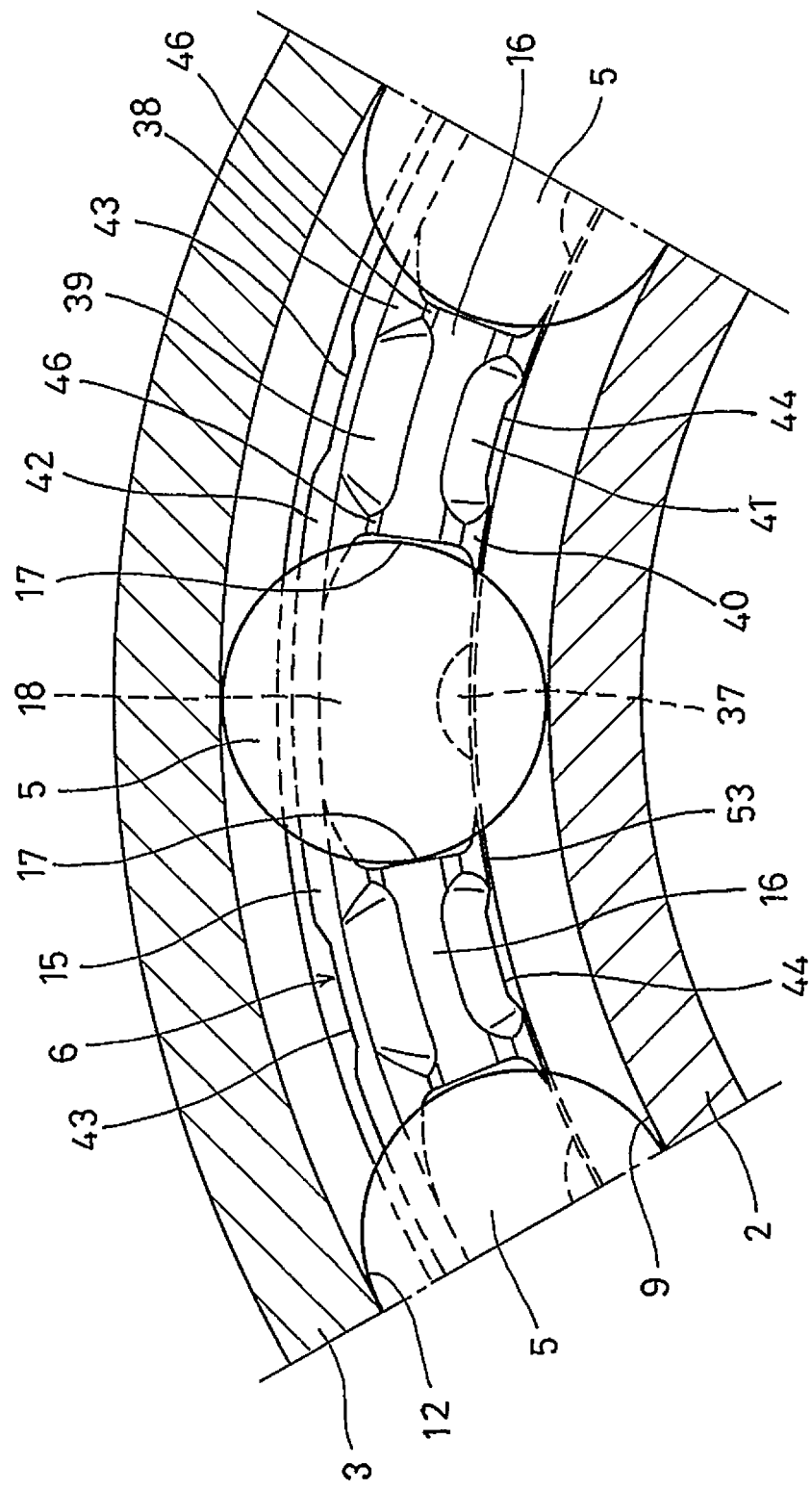
FIG. 16 is a sectional view of the sealed bearing in FIG. 15 taken along its cross section orthogonal to the axial direction.
Figure 23:
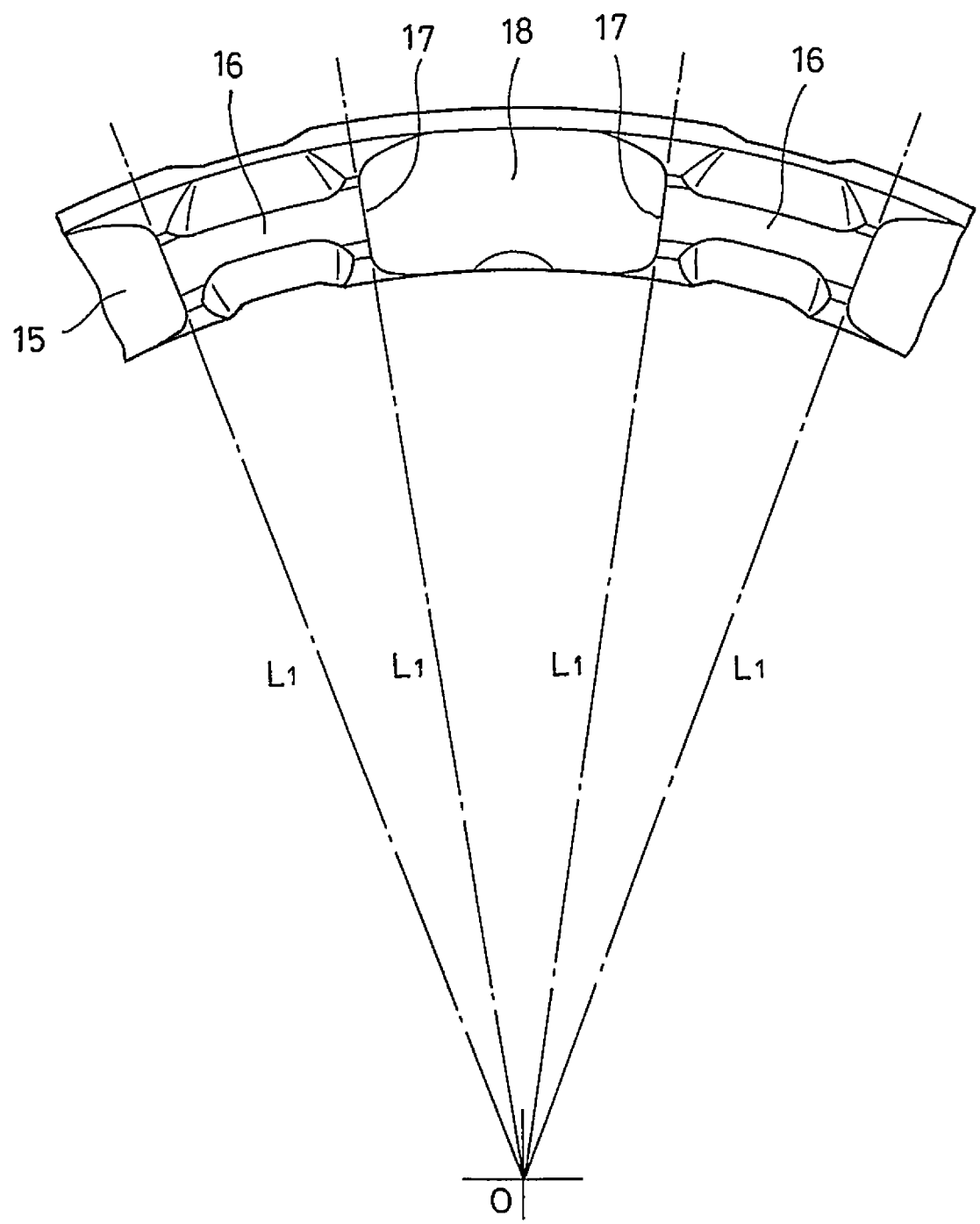
FIG. 23 is a view illustrating the relationship between pocket side surfaces illustrated in FIG. 16 and a bearing center (center of a cage annular portion).

As illustrated in FIG. 16, each cage claw 16 has pocket side surfaces 17 circumferentially opposed to the corresponding rolling elements 5, respectively. The portion of each of the pocket side surfaces 17 circumferentially receiving the corresponding rolling element 5 has a flat shape so that the pocket side surfaces 17 do not interfere with the rolling elements 5 when the cage claws 16 move radially outward by a centrifugal force. As illustrated in FIG. 23, each pocket side surface 17 is a flat surface along a straight line $L_1$ radially extending through a bearing center O when seen in the axial direction (in other words, a flat surface radially extending such that the bearing center O is located on an extension line of the pocket side surface 17).

Figure 17:
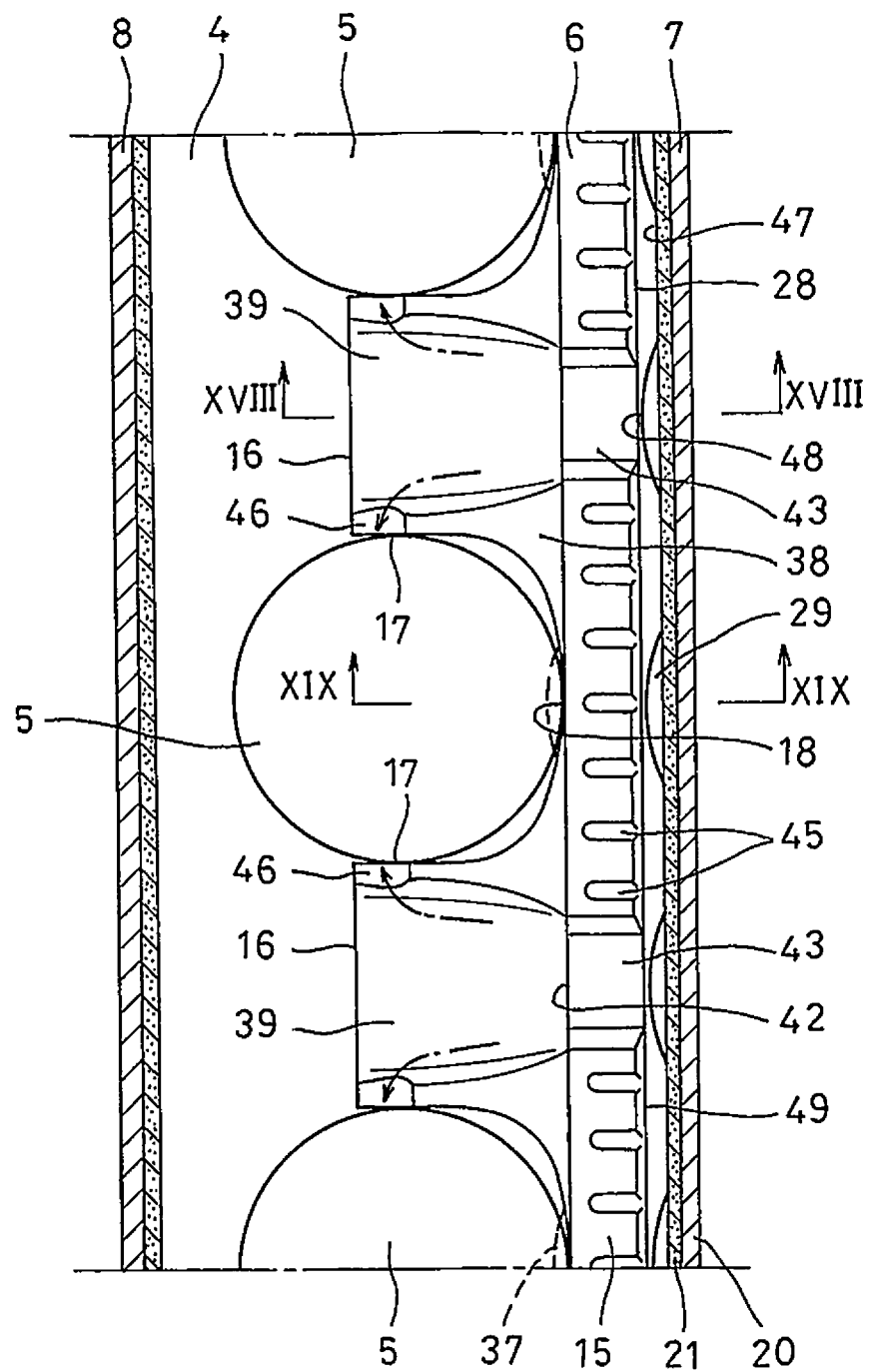
FIG. 17 is a sectional view of the sealed bearing in FIG. 15 taken along the circumferential direction, when seen from the radially outer side.

As illustrated in FIG. 17, the portion of each of the pocket side surfaces 17 circumferentially receiving the corresponding rolling element 5 has a straight shape that is not circumferentially inclined and that axially extends straight when seen in the radial direction so that no axial component force is generated when receiving the rolling element 5. The cage circular annular portion 15 has pocket bottom surfaces 18 axially opposed to the respective rolling elements 5. Each pocket side surface 17 and the corresponding pocket bottom surface 18 are connected to each other in a concave circular arc shape when seen in the radial direction.

Figure 19:
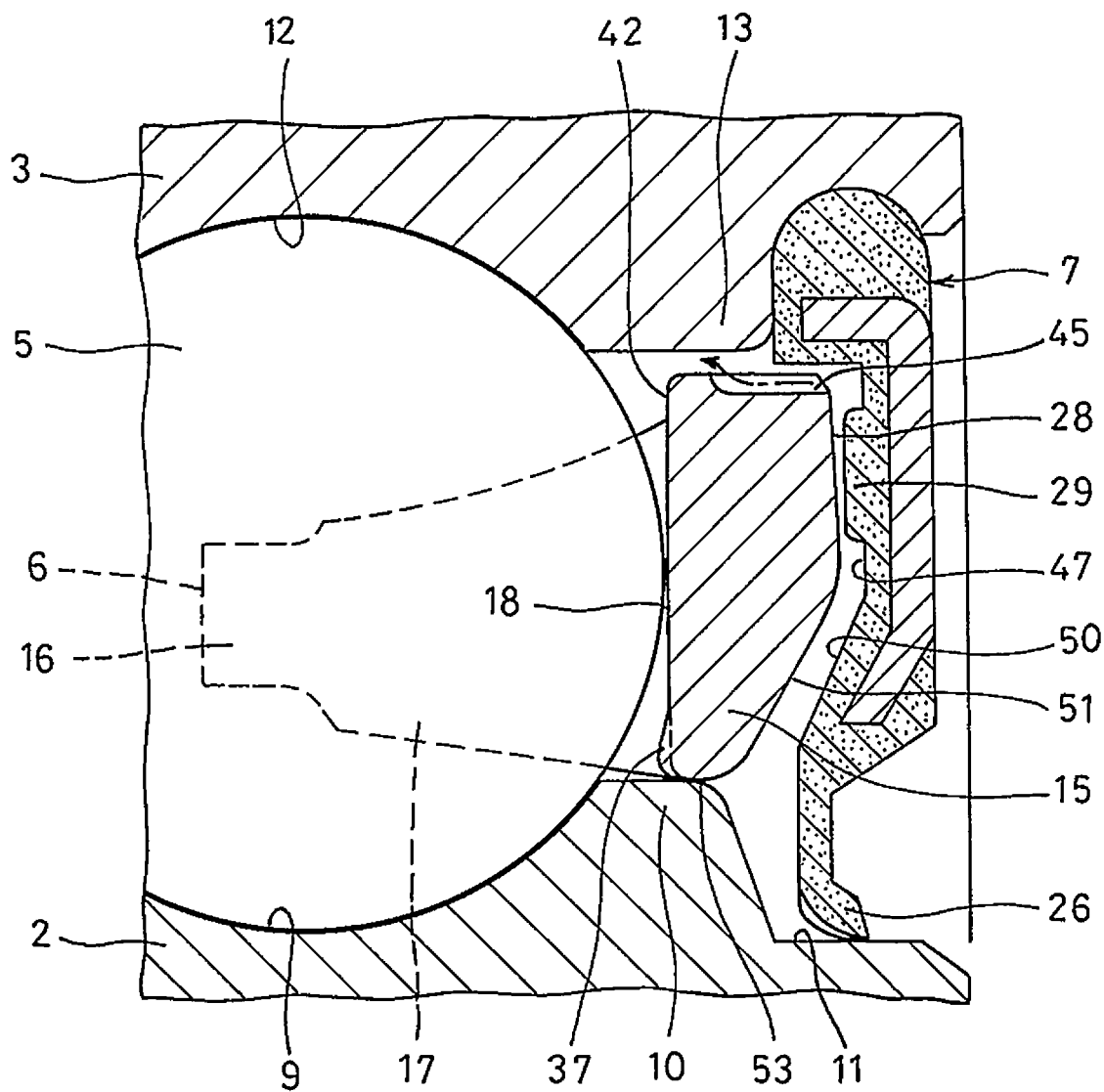
FIG. 19 is a sectional view taken along line XIX-XIX in FIG. 17.

As illustrated in FIG. 19, each pocket bottom surface 18 has a shape linearly extending radially in the sectional view orthogonal to the circumferential direction. A build-up portion 37 protruding axially inward is integrally formed at the radially inner end of the pocket bottom surface 18. The build-up portion 37 has a shape protruding radially inward within a range in which the build-up portion 37 is not in contact with the corresponding the rolling element 5.

The cage 6 is an inner ring-guided type cage that is radially positioned by coming into contact with the inner ring 2. The cage circular annular portion 15 has, on its inner periphery, a cage guided surface 53 that is guided by the one inner ring groove shoulder 10 on the outer periphery of the inner ring 2. The cage guided surface 53 is a circular annular surface that is supported in sliding contact with the one inner ring groove shoulder 10.

As illustrated in FIG. 18, each cage claw 16 has, in its radially outer surface 38, a radially outer oil groove 39 axially extending from the distal end of the cage claw 16 toward the cage circular annular portion 15. In addition, the cage claw 16 has, in its radially inner surface 40, a radially inner oil groove 41 axially extending from the distal end of the cage claw 16 toward the cage circular annular portion 15. The cross-sectional shape of the cage claw 16 that is orthogonal to the axial direction is an H-shape opening radially outward and radially inward due to the radially outer oil groove 39 and the radially inner oil groove 41.

Figure 20:
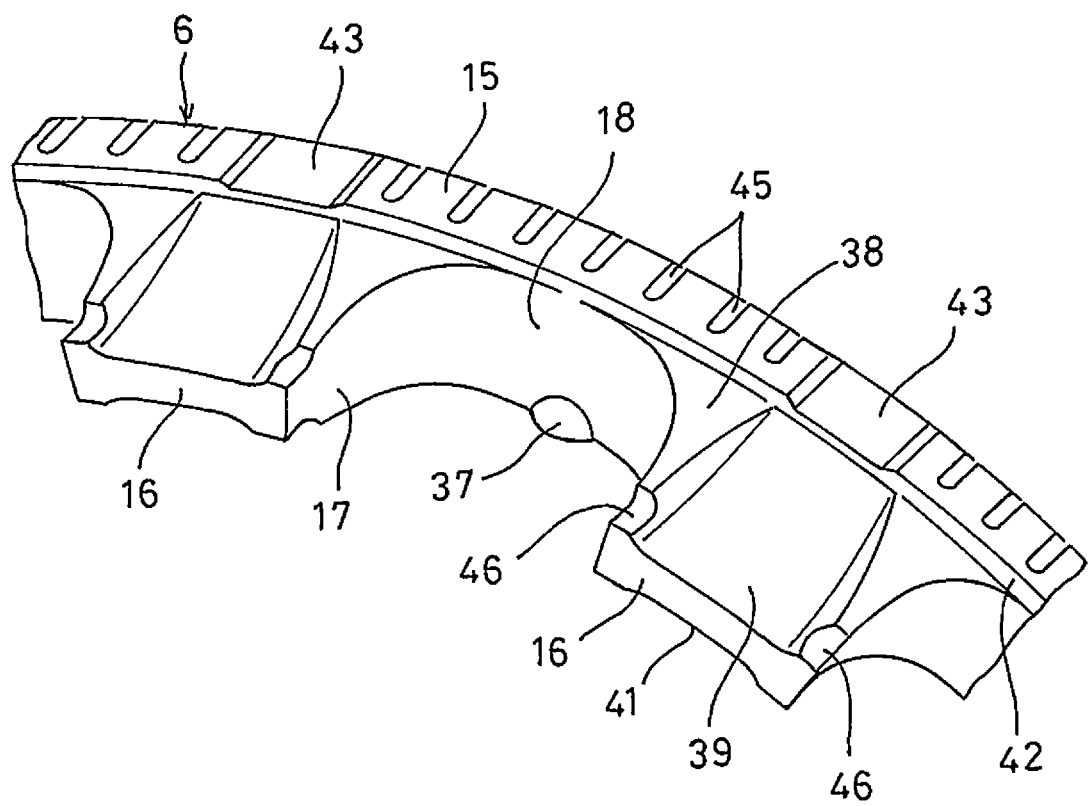
FIG. 20 is a perspective view of the cage in FIG. 15 when seen from the side of its cage claws.

The radially outer oil groove 39 is formed such that the position of the groove bottom surface of the radially outer oil groove 39 gradually changes radially outward from the distal end of the cage claw 16 toward the root thereof. In addition, the radially inner oil groove 41 is formed such that the position of the groove bottom surface of the radially inner oil groove 41 gradually changes radially inward from the distal end of the cage claw 16 toward the root thereof. The cage circular annular portion 15 has a flat rising surface 42 rising radially outward from the roots of the cage claws 16. The rising surface 42 is a flat surface orthogonal to the axial direction, and intersects, with a step, with the ends of the inner surfaces of the radially outer oil grooves 39 at the roots of the cage claws 16. As illustrated in FIG. 20, the rising surface 42 also intersects, with a step, with the ends of the portions of the radially outer surfaces 38 that are not formed with the radially outer oil grooves 39, at the roots of the cage claws 16.

As illustrated in FIGS. 16 and 18, the outer periphery of the cage circular annular portion 15 is formed with radially outer penetrating grooves 43 axially penetrating through the outer periphery of the cage circular annular portion 15 at circumferential positions corresponding to the cage claws 16. Similarly, the inner periphery of the cage circular annular portion 15 is also formed with radially inner penetrating grooves 44 axially penetrating through the inner periphery of the cage circular annular portion 15 at circumferential positions corresponding to the cage claws 16. The radially inner penetrating grooves 44 communicate with the radially inner oil grooves 41 of the cage claws 16.

As illustrated in FIGS. 19 and 20, the outer periphery of the cage circular annular portion 15 is formed with axial grooves 45 axially extending on the outer periphery of the cage circular annular portion 15, and located between each circumferentially adjacent pair of the radially outer penetrating grooves 43. The axial grooves 45 are formed to open on the axially outer side of the cage circular annular portion 15, and not to penetrate on the axially inner side of the cage circular annular portion 15. That is, the axial grooves 45 are formed only in the portion of the outer periphery of the cage circular annular portion 15 from its axially intermediate portion to its axially outer end, and are not formed at the axially inner end of the outer periphery of the cage circular annular portion 15. The axial length of each axial groove 45 is set to ⅔ or less of the axial width of the cage circular annular portion 15.

As illustrated in FIGS. 17 and 18, cutouts 46 are formed in the distal end of each cage claw 16 so as to circumferentially penetrate through the respective groove shoulders of the cage on both circumferential sides of the radially outer and radially inner oil grooves 39 and 41. By forming the cutouts 46, it is possible to increase the amount of the lubricating oil supplied to the rolling elements 5 from the circumferential direction, and to improve lubrication performance of the rolling elements 5.

As illustrated in FIG. 18, the seal member 7 has a seal-side sliding surface 47 axially opposed to the cage 6. The seal-side sliding surface 47 is an annular surface formed around the entire circumference on the axially inner side of the circular annular plate portion 36 of the seal member 7. The seal-side sliding surface 47 is formed not on the surface of the metal core 20, but on the surface of the rubber member 21. The cage 6 has a cage-side sliding surface (axial side surface) 28 axially opposed to the seal-side sliding surface 47. The cage-side sliding surface 28 is an annular surface formed around the entire circumference on the axially outer side of the cage circular annular portion 15.

As illustrated in FIG. 17, the seal-side sliding surface 47 is formed with a plurality of minute protrusions (axial protrusions) 29 disposed at regular intervals in the circumferential direction. In the drawing, for easy recognition of the presence of the minute protrusions 29, the axial heights of the minute protrusions 29 are exaggerated, but the axial heights of the minute protrusions 29 are extremely small and 0.5 mm or less.

Figure 21A:
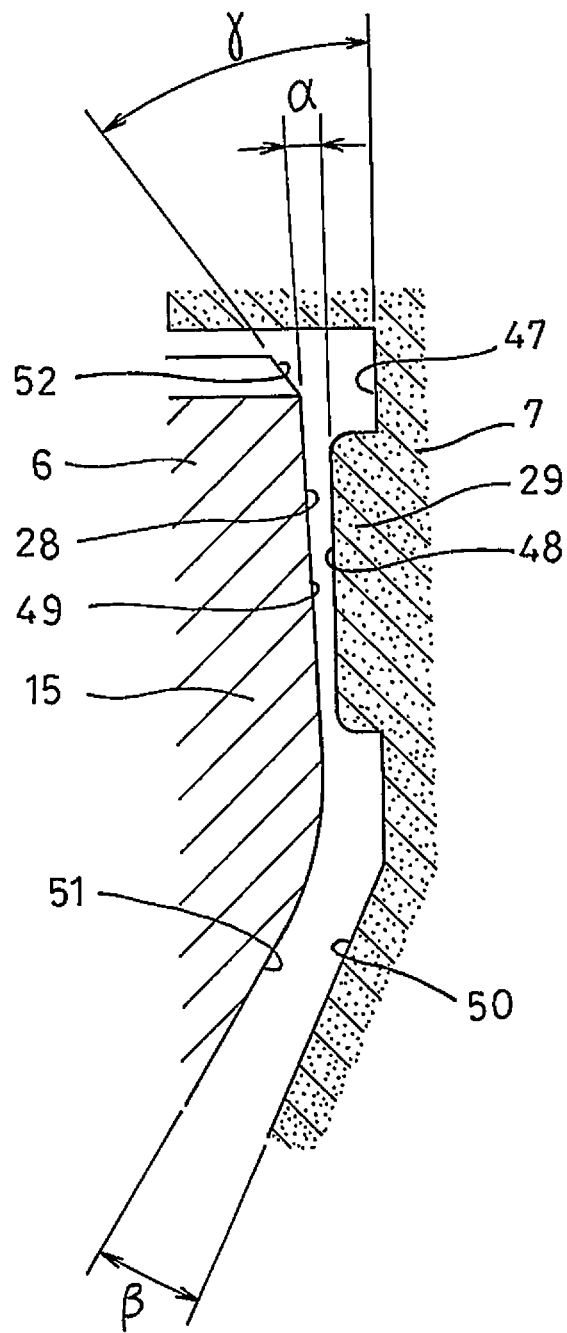
FIG. 21A is an enlarged view illustrating a cage-side sliding surface and a seal-side sliding surface in FIG. 18, and the vicinity thereof.
Figure 22:
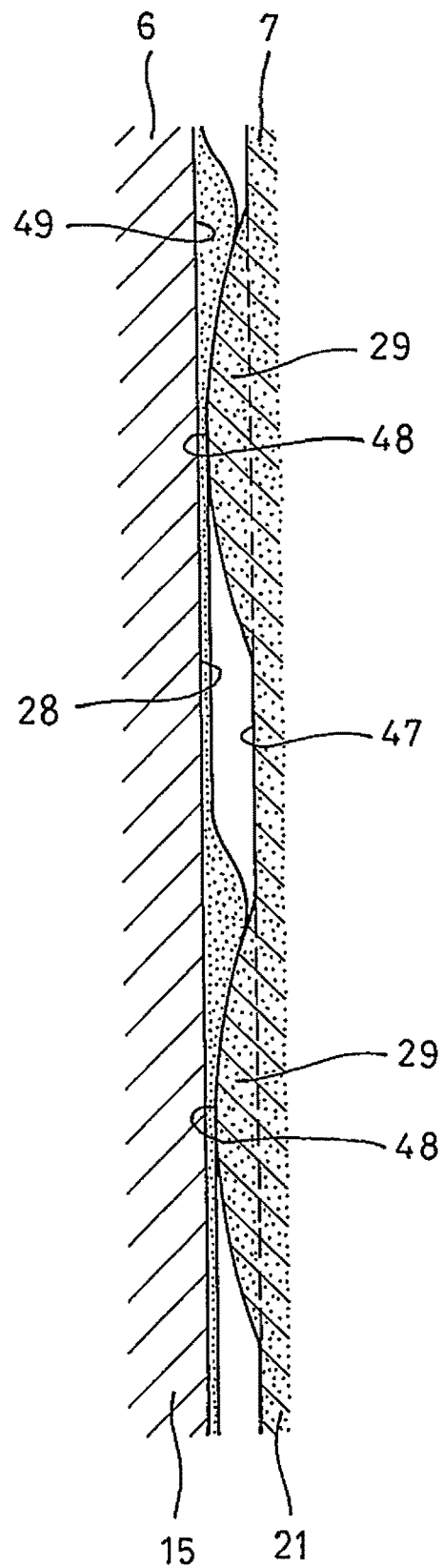
FIG. 22 is a sectional view taken along line XXII-XXII in FIG. 21B.

As illustrated in FIG. 21A, each minute protrusion 29 has a sliding contact distal end surface 48 linearly extending radially in the sectional view orthogonal to the circumferential direction. That is, the minute protrusion 29 is shaped to have a top having the same height, and continuously extending in the radial direction, and this top forms the sliding contact distal end surface 48. As illustrated in FIG. 22, the minute protrusion 29 is formed such that the cross-sectional shape of the minute protrusion 29 orthogonal to the radial direction is an axially convex circular arc shape. The minute protrusion 29 may be formed such that the cross-sectional shape of the minute protrusion 29 orthogonal to the radial direction is an axially convex trapezoidal shape.

On the other hand, as illustrated in FIGS. 21A and 22, a smooth sliding contact flat surface 49 is formed on the cage-side sliding surface 28 around the entire circumference thereof. As illustrated in FIG. 21A, each sliding contact distal end surface 48 and the sliding contact flat surface 49 are disposed such that while the bearing is stationary, the surfaces 48 and 49 are non-parallelly opposed to each other at an angle α in a direction in which the space between the surfaces 48 and 49 widens from the radially inner side toward the radially outer side. Here, the angle α defined by the sliding contact tip surface 48 and the sliding contact flat surface 49 when the bearing is stationary is set in the range of 0.5° or more and 6° or less (preferably 1° or more and 5° or less).

As illustrated in FIG. 18, the minute protrusions 29 are disposed at positions overlapping with the pitch circle of the rolling elements 5 (imaginary circle connecting the centers of the plurality of rolling elements 5), or disposed radially outwardly of the pitch circle of the rolling elements 5.

As illustrated in FIG. 21A, the seal member 7 has a seal-side inclined surface 50 extending linearly so as to be inclined axially inward toward the radially inner side from the seal-side sliding surface 47 in the sectional view orthogonal to the circumferential direction. The cage circular annular portion 15 has a cage-side inclined surface 51 extending linearly so as to be inclined axially inward from the cage-side sliding surface 28 toward the radially inner side in the sectional view orthogonal to the circumferential direction; and a chamfer 52 extending linearly so as to be inclined axially inward from the cage-side sliding surface 28 toward the radially outer side.

The cage-side inclined surface 51 and the seal-side inclined surface 50 are axially opposed to each other at an angle β in a direction in which the space between the surfaces 51 and 50 widens from the radially outer side toward the radially inner side. The angle β defined by the cage-side inclined surface 51 and the seal-side inclined surface 50 is set to 10° or less. The chamfer 52 and the seal-side sliding surface 47 are axially opposed to each other at an angle γ such that the axial space between the chamfer 52 and the seal-side sliding surface 47 gradually widens from the radially inner side toward the radially outer side. The angle γ defined by the chamfer 52 and the seal-side sliding surface 47 is set to more than 10° and 48° or less.

Figure 21B:
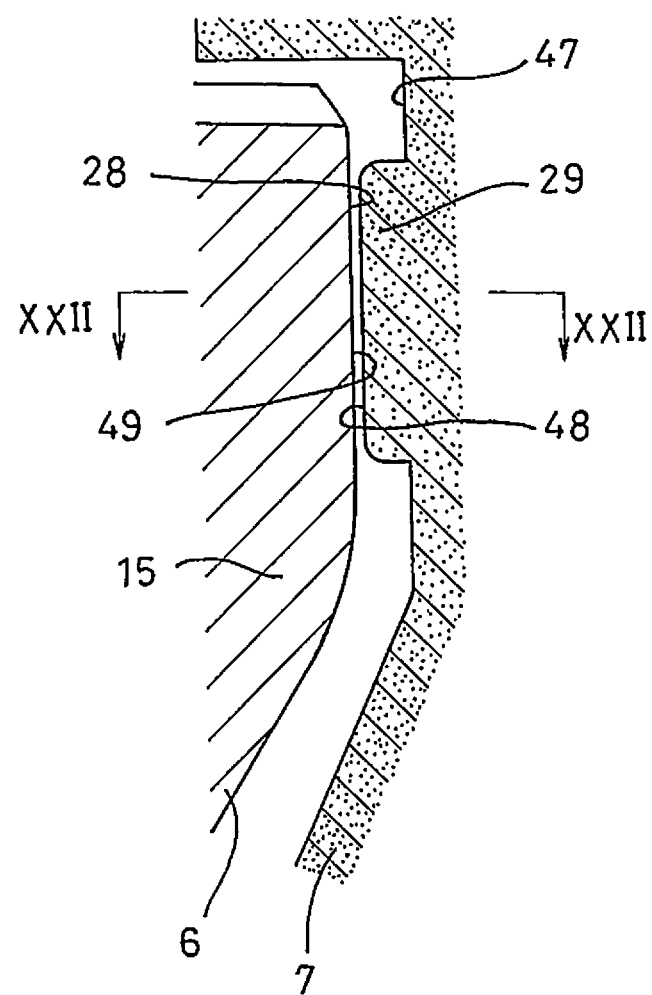
FIG. 21B is an enlarged view illustrating the cage-side sliding surface and the seal-side sliding surface and the vicinity thereof during high-speed rotation of the sealed bearing in FIG. 18.

As illustrated in FIGS. 21B and 22, in the sealed bearing 1 of this embodiment, when, during rotation of the bearing, the sliding contact distal end surfaces 48 of the minute protrusions 29 on the seal-side sliding surface 47 come into sliding contact with the sliding contact flat surface 49, which is formed on the cage-side sliding surface 28 and is smooth around the entire circumference, since the sliding contact distal end surfaces 48 of the minute protrusions 29 have a shape linearly extending radially (shape having the same height continuously in the radial direction) as illustrated in FIG. 21B, lubricating oil is not pushed aside easily by the minute protrusions 29 during rotation of the bearing, and the lubricating oil is easily drawn into the sliding contact portions of the minute protrusions 29. Therefore, as illustrated in FIG. 22, an oil film due to the wedge film effect is formed between the sliding contact distal end surfaces 48 of the minute protrusions 29 and the sliding contact flat surface 49, and the oil film causes a fluid lubrication state between the sliding contact distal end surfaces 48 and the sliding contact flat surface 49, so that the contact resistance between the cage 6 and the seal member 7 can be reduced to be extremely small. Therefore, it is possible to prevent abnormal heat generation due to the sliding resistance of the contact portions of the cage 6 and the seal member 7.

In addition, in this sealed bearing 1, since each sliding contact distal end surface 48 and the sliding contact flat surface 49 are disposed such that while the bearing is stationary, the surfaces 48 and 49 are non-parallelly opposed to each other at an angle α in a direction in which the space between the surfaces 48 and 49 widens from the radially inner side toward the radially outer side as illustrated in FIG. 21A, while the bearing is rotating at a high speed, it is possible to stably form an oil film between the sliding contact distal end surfaces 48 and the sliding contact flat surface 49 due to the wedge film effect.

That is, if it is assumed that the bearing is configured such that while the bearing is stationary, each sliding contact distal end surface 48 and the sliding contact flat surface 49 illustrated in FIG. 21A are parallelly opposed to each other, there is the following problem: While the bearing is rotating at a high speed, the cage circular annular portion 15 is deformed by the centrifugal force acting on the cage claws 16 illustrated in FIG. 18, the deformation causes the cage-side sliding surface 28 to incline, and the sliding contact distal end surface 48 and the sliding contact flat surface 49 become non-parallel. Therefore, the sliding contact distal end surface 48 comes into edge abutment with the sliding contact flat surface 49, so that it is difficult to form an oil film due to the wedge film effect between the sliding contact distal end surfaces 48 and the sliding contact flat surface 49. To overcome this problem, the sealed bearing 1 of the above embodiment is configured such that while the bearing is stationary, each sliding contact distal end surface 48 and the sliding contact flat surface 49 are non-parallelly opposed to each other at the angle α in a direction in which the space between the surfaces 48 and 49 widens from the radially inner side toward the radially outer side as illustrated in FIG. 21A. Therefore, while the bearing is rotating at a high speed, the cage circular annular portion 15 is deformed by the centrifugal force acting on the cage claws 16 illustrated in FIG. 18, and the deformation causes the sliding contact distal end surface 48 and the sliding contact flat surface 49 to parallelly approach each other as illustrated in FIG. 21B, so that it is possible to stably form an oil film due to the wedge film effect between the sliding contact distal end surfaces 48 and the sliding contact flat surface 49.

In addition, as illustrated in FIGS. 16 and 23, in this sealed bearing 1, each pocket side surface 17 is a flat surface along a straight line $L_1$ radially extending through the bearing center O. Therefore, when, during rotation of the bearing at a high speed, the cage circular annular portion 15 is deformed by the centrifugal force acting on the cage claws 16, and the cage claws 16 move radially outward by the deformation, it is possible to prevent abnormal heat generation due to interference of the pocket side surfaces 17 of the cage claws 16 with the rolling elements 5.

Figure 24:
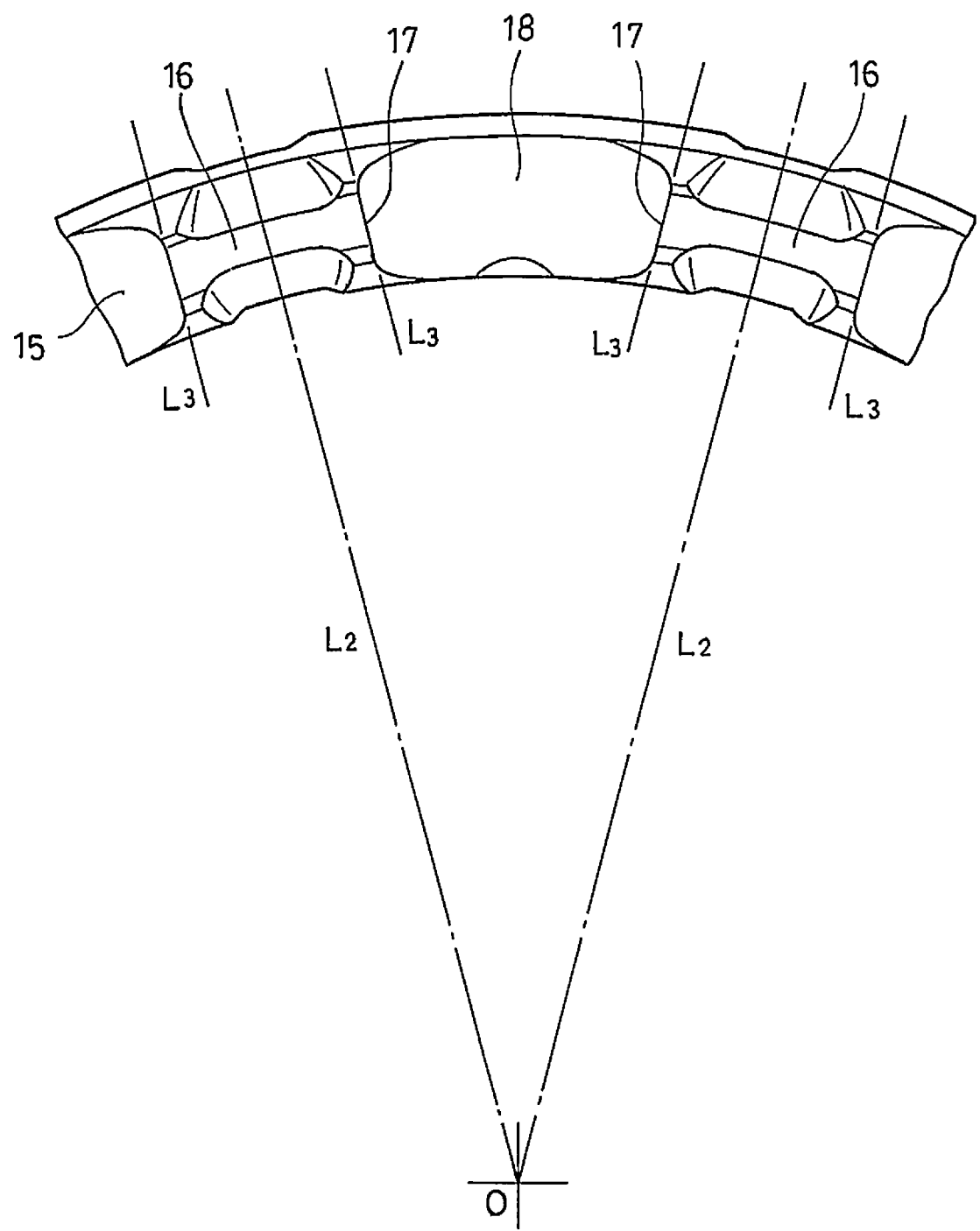
FIG. 24 is a view illustrating a variation of the pocket side surfaces illustrated in FIG. 16, and corresponding to FIG. 23.

As illustrated in FIG. 24, the pocket side surfaces 17 of each cage claw 16 may be flat surfaces along respective parallel straight lines $L_3$ circumferentially opposed to each other with a straight line $L_2$ connecting together the bearing center O and the circumferential center of the cage claw 16 sandwiched therebetween. Even with this arrangement, when the cage circular annular portion 15 is deformed by the centrifugal force acting on the cage claws 16, and the cage claws 16 move radially outward by the deformation, it is possible to prevent abnormal heat generation due to interference of the pocket side surfaces 17 of the cage claws 16 with the rolling elements 5 (see FIG. 16).

If the pocket side surfaces 17 illustrated in FIG. 24 are adopted in each cage claw 16, when the cage claw 16 radially moves along a straight line $L_2$ connecting together the bearing center O and the circumferential center of the cage claw 16, the distances between the pocket side surfaces 17 and the corresponding rolling elements 5 (see FIG. 16) do not change. Therefore, even when, during rotation of the bearing at a high speed, the cage circular annular portion 15 is deformed by the centrifugal force acting on the cage claws 16 and the cage claws 16 move radially outward by the deformation, the cage 6 stably retains the rolling elements 5.

Also, in the sealed bearing 1 of the above embodiment, since, as illustrated in FIG. 17, each pocket side surface 17 and the corresponding pocket bottom surface 18 are connected to each other in a concave circular arc shape, it is possible to ensure the cross-sectional area of the root of each cage claw 16 in the axial direction, while reducing the mass of the distal end of the cage claw 16 in the axial direction. Therefore, it is possible to effectively reduce deflection of the cage claws 16 due to the centrifugal force acting on the cage claws 16.

Also, in this sealed bearing 1, since the build-up portions 37 are each formed at the radially inner end of the corresponding pocket bottom surface 18 as illustrated in FIGS. 19 and 20, it is possible to effectively prevent the cage circular annular portion 15 from being damaged by the influence of a centrifugal force. That is, when the cage circular annular portion 15 is torsionally deformed by the centrifugal force acting on the cage claws 16, stress is likely to concentrate on radially inner portions of the cage circular annular portion 15 (radially inner ends of the pocket bottom surfaces 18) at positions corresponding to the middles of the circumferentially adjacent pairs of cage claws 16. In view of this, by forming the axially inward protruding build-up portions 37 at the radially inner ends of the pocket bottom surfaces 18 as in the above embodiment, it is possible to effectively prevent the cage circular annular portion 15 from being damaged by stress concentration caused by the centrifugal force.

Also, in this sealed bearing 1, as illustrated in FIG. 18, the cross-sectional shape of each cage claw 16 is an H-shape caused by the radially outer oil groove 39 in the radially outer surface 38 of the cage claw 16, and the radially inner oil groove 41 in the radially inner surface 40 of the cage claw 16, so that it is possible to reduce the mass of the cage claw 16, while ensuring a second moment of area of the cage claw 16 (while keeping the cage claw 16 less likely to deform against bending moment). Therefore, it is possible to reduce or minimize torsional deformation of the cage circular annular portion 15 and flexural deformation of the cage claws 16 per se that are caused by the centrifugal force the cage claws 16 receive during rotation of the bearing at a high speed.

Also, in this sealed bearing 1, as illustrated in FIG. 18, each radially outer oil groove 39 is formed such that the position of the groove bottom surface of the radially outer oil groove 39 gradually changes radially outward from the distal end of the cage claw 16 toward the root thereof. Therefore, while the bearing is rotating, the lubricating oil in the radially outer oil groove 39 moves from the distal end of the cage claw 16 toward the root thereof due to the pumping effect. Then, the lubricating oil that has moved in the radially outer oil groove 39 from the distal end of the cage claw 16 toward the root thereof is returned to the axially inner side by the rising surface 42, which rises radially outward from the roots of the cage claws 16. This action is repeated, whereby the lubricating oil in the bearing can be efficiently circulated.

Also, as illustrated in FIG. 18, this sealed bearing 1 includes radially outer penetrating grooves 43 axially penetrating through the outer periphery of the cage circular annular portion 15; and radially inner penetrating grooves 44 axially penetrating through the inner periphery of the cage circular annular portion 15. Therefore, lubricating oil easily moves inwardly and outwardly between the region that is axially inward of the cage circular annular portion 15 and the region that is axially outward of the cage circular annular portion 15, while passing through the radially outer penetrating grooves 43 and the radially inner penetrating grooves 44. This facilitates circulation of lubricating oil in the interior of the bearing.

Also, as illustrated FIGS. 16 and 20, the radially outer penetrating grooves 43 and the radially inner penetrating grooves 44 are formed in the cage circular annular portion 15 at its circumferential positions corresponding to the cage claws 16 (that is, in the cage circular annular portion 15 at its positions at which the rigidity is ensured by the cage claws 16). Therefore, it is possible to effectively prevent the rigidity of the cage circular annular portion 15 from being decreased by the formation of the radially outer penetrating grooves 43 and the radially inner penetrating grooves 44.

Also, since this sealed bearing 1 is formed with the axial grooves 45 in the outer periphery of the cage circular annular portion 15 as illustrated in FIG. 19, lubricating oil easily moves inwardly and outwardly between the region that is axially inward of the cage circular annular portion 15 and the region that is axially outward of the cage circular annular portion 15, while passing through the axial grooves 45. This facilitates circulation of lubricating oil in the interior of the bearing.

Also, since the axial grooves 45 are formed not to penetrate on the axially inner side of the cage circular annular portion 15 as illustrated in FIG. 20, it is possible to effectively prevent the cage circular annular portion 15 from being damaged by stress concentration. That is, when the cage circular annular portion 15 is torsionally deformed by the centrifugal force acting on the cage claws 16, stress tends to concentrate on the axially inner side of the outer periphery of the cage circular annular portion 15. In view of this, by forming the axial grooves 45 in the outer periphery of the cage circular annular portion 15 so as not to penetrate on the axially inner side, it is possible to effectively prevent the cage circular annular portion 15 from being damaged by stress concentration.

Also, in this sealed bearing 1, since the axial lengths of the axial grooves 45 illustrated in FIG. 19 are each set to ⅔ or less of the axial width of the cage circular annular portion 15, it is possible to effectively prevent the rigidity of the cage circular annular portion 15 from being decreased by the formation of the axial grooves 45 in the outer periphery of the cage circular annular portion 15, and it is therefore possible to effectively prevent the cage circular annular portion 15 from being damaged by stress concentration.

Also, in this sealed bearing 1, as illustrated in FIG. 21A, the angle β defined by the cage-side inclined surface 51 and the seal-side inclined surface 50, which are formed on the radially inner side of the sliding contact portions of the cage-side sliding surface 28 and the seal-side sliding surface 47, is smaller than the angle γ defined by the chamfer 52 and the seal-side sliding surface 47, which are formed on the radially outer side of the sliding contact portions of the cage-side sliding surface 28 and the seal-side sliding surface 47. That is, the angle β, between the cage 6 and the seal member 7, defined on the radially inner side with respect to the sliding contact portions of the cage-side sliding surface 28 and the seal-side sliding surface 47 is smaller than the angle γ, between the cage 6 and the seal member 7, defined on the radially outer side with respect to the sliding contact portions of the cage-side sliding surface 28 and the seal-side sliding surface 47. Therefore, in the region axially sandwiched between the cage 6 and the seal member 7, a flow of the lubricating oil is generated from the radially inner side of the sliding contact portions of the cage-side inclined surface 51 and the seal-side inclined surface 50 toward the radially outer side of the sliding contact portions of the cage-side inclined surface 51 and the seal-side inclined surface 50, so that lubrication of the bearing in its interior can be efficiently performed.

In the above embodiment, the description has been given taking, as an example, an arrangement in which the minute protrusions 29, each having the sliding contact distal end surface 48, are formed on the seal-side sliding surface 47, and the sliding contact flat surface 49, with which the sliding contact distal end surfaces 48 come into sliding contact, is formed on the cage-side sliding surface 28. However, the arrangement of the seal-side sliding surface 47 and the cage-side sliding surface 28 may be reversed. Specifically, the minute protrusions 29, each having the sliding contact distal end surface 48, may be formed on the cage-side sliding surface 28, and the sliding contact flat surface 49, with which the sliding contact distal end surfaces 48 come into sliding contact, may be formed on the seal-side sliding surface 47.

While, in the above embodiment, the description has been given taking, as an example of the cage 6, a resin cage formed of only a resin composition, it is possible to adopt a resin cage in which when the cage circular annular portion 15 and the cage claws 16 are molded with a resin composition, an annular metal core made of metal is insert-molded in the cage circular annular portion 15. Also, it is possible to adopt a mild steel cage in which the cage circular annular portion 15 and the cage claws 16 are integrally formed of mild steel.

Figure 25:
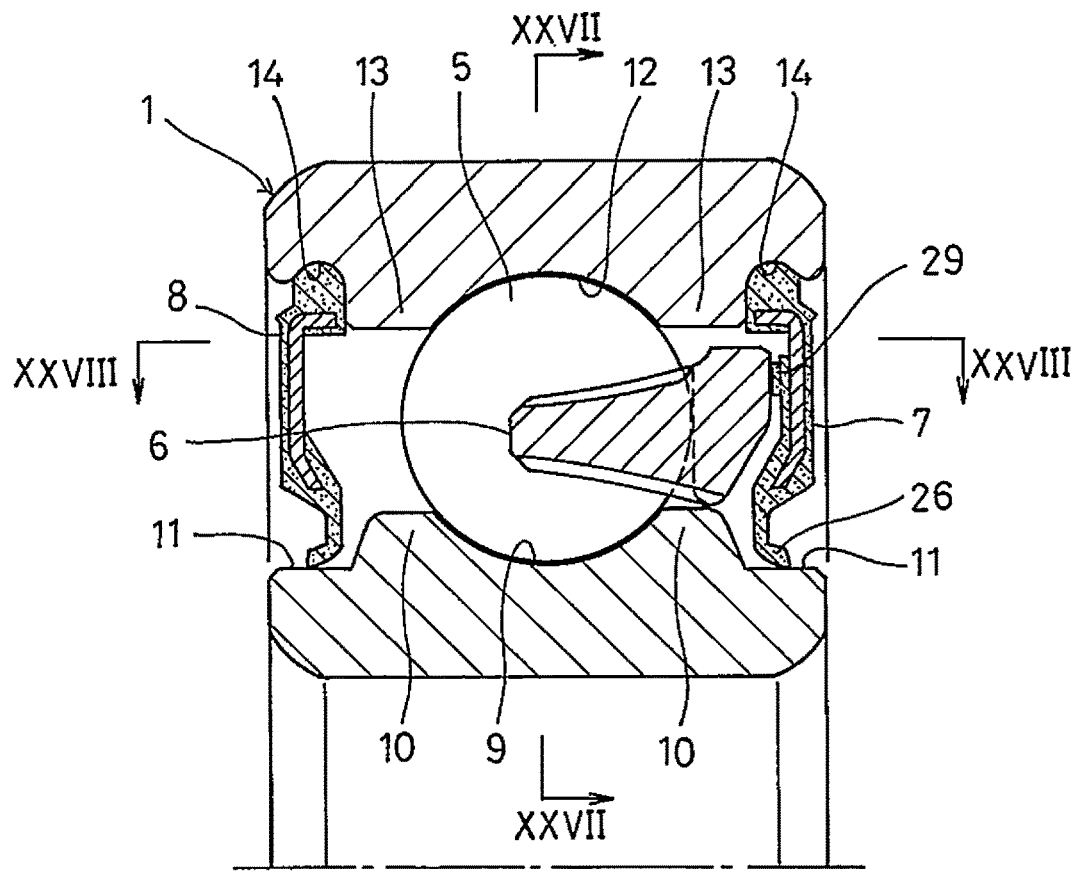
FIG. 25 is a sectional view of a sealed bearing according to a first embodiment of the third invention.
Figure 25:
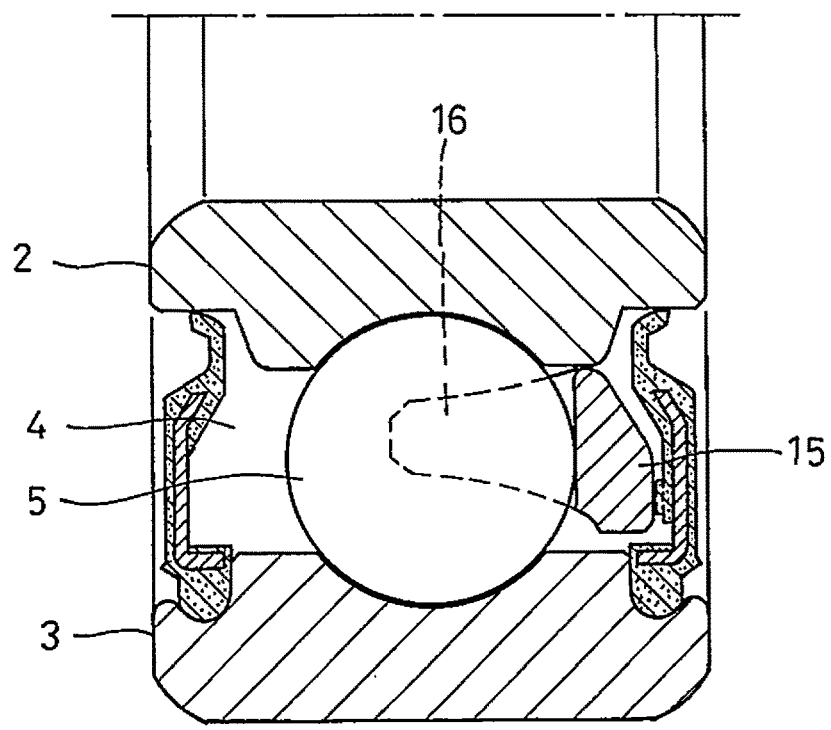

FIG. 25 illustrates a sealed bearing 1 according to a first embodiment of the third invention. Hereinafter, the elements of this embodiment corresponding to those of the embodiments of the first and second inventions are denoted by the same reference numerals, and the description thereof is omitted.

Figure 27:
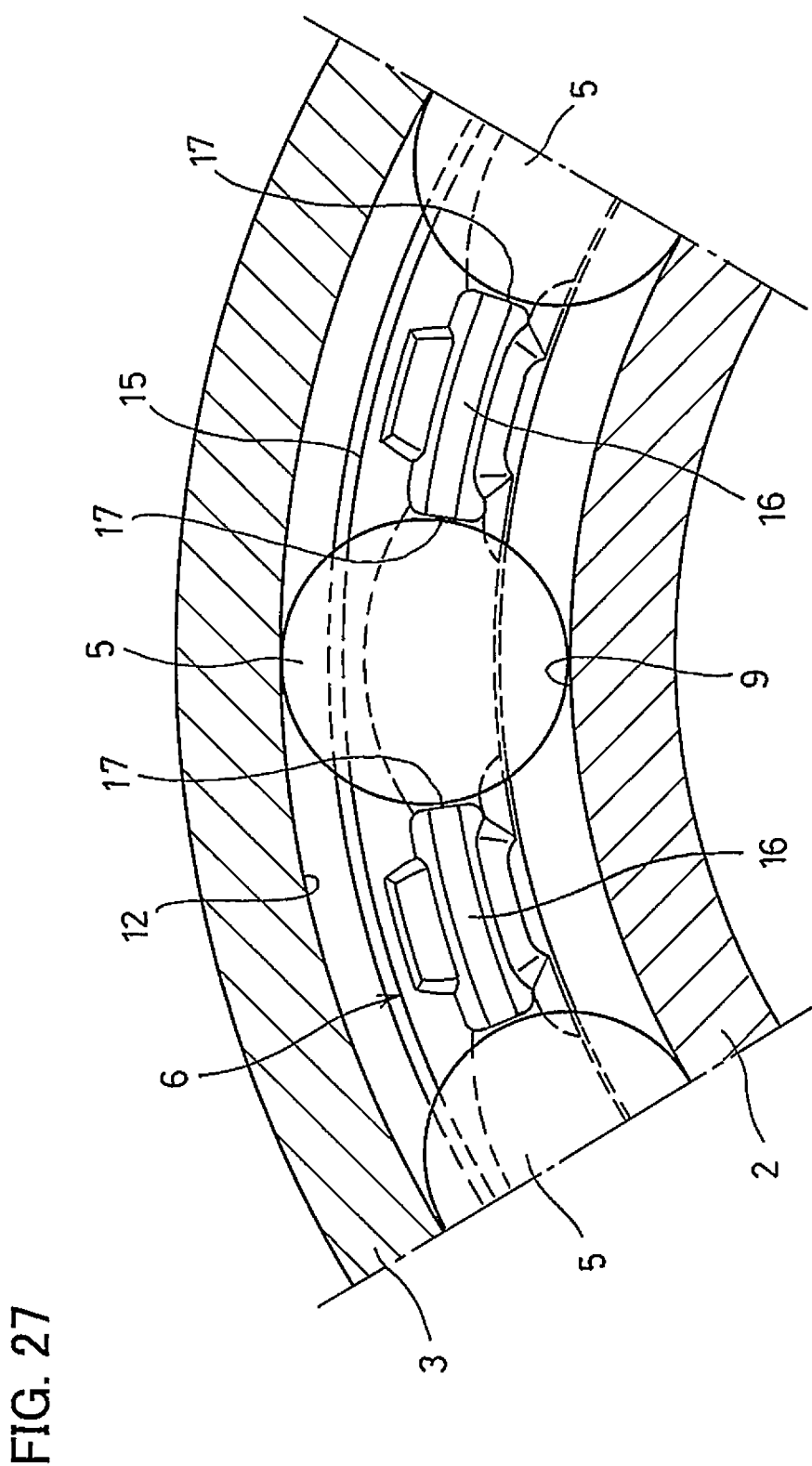
FIG. 27 is a sectional view taken along line XXVII-XXVII in FIG. 25.

As illustrated in FIG. 27, each cage claw 16 has circumferentially opposed surfaces (pocket side surfaces) 17 that are circumferentially opposed to the corresponding rolling elements 5, respectively. The portion of each circumferentially opposed surface 17 circumferentially receiving the corresponding rolling element 5 has a flat shape s so that the circumferentially opposed surfaces 17 do not interfere with the rolling elements 5 when the cage claws 16 move radially outward by a centrifugal force. In the drawing, each circumferentially opposed surface 17 of each cage claw 16 is a flat surface extending such that the circumferential width of the cage claw 16 gradually decreases from the radially outer side toward the radially inner side when seen in the axial direction (for example, a flat surface extending such that the center of the cage circular annular portion 15 is located on extension lines of the circumferentially opposed surfaces 17).

Figure 28:
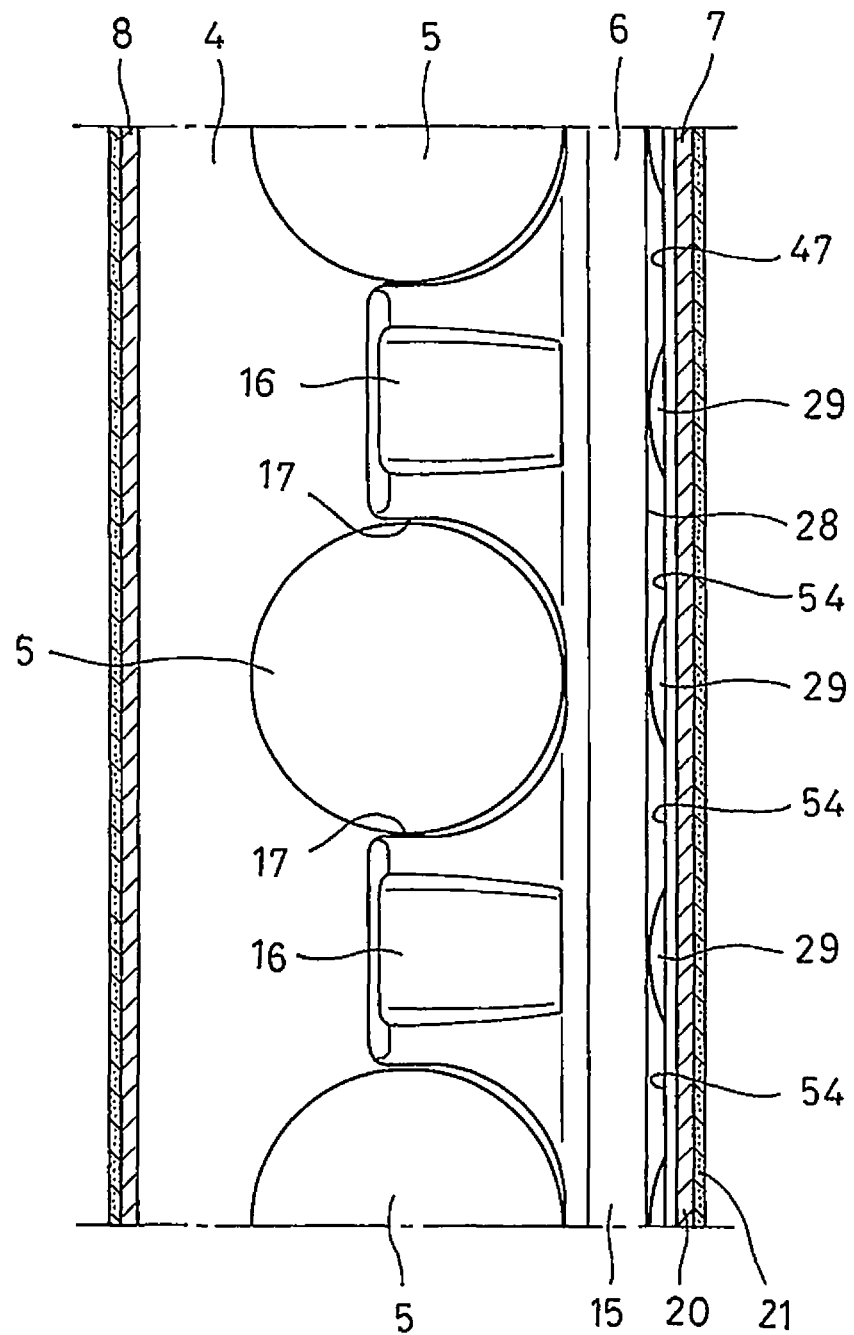
FIG. 28 is a sectional view taken along line XXVIII-XXVIII in FIG. 25.

As illustrated in FIG. 28, the portion of each circumferentially opposed surface 17 circumferentially receiving the corresponding rolling element 5 has a straight shape that is not circumferentially inclined and that axially extends straight when seen in the radial direction so that no axial component force is generated when receiving the rolling element 5.

Figure 29:
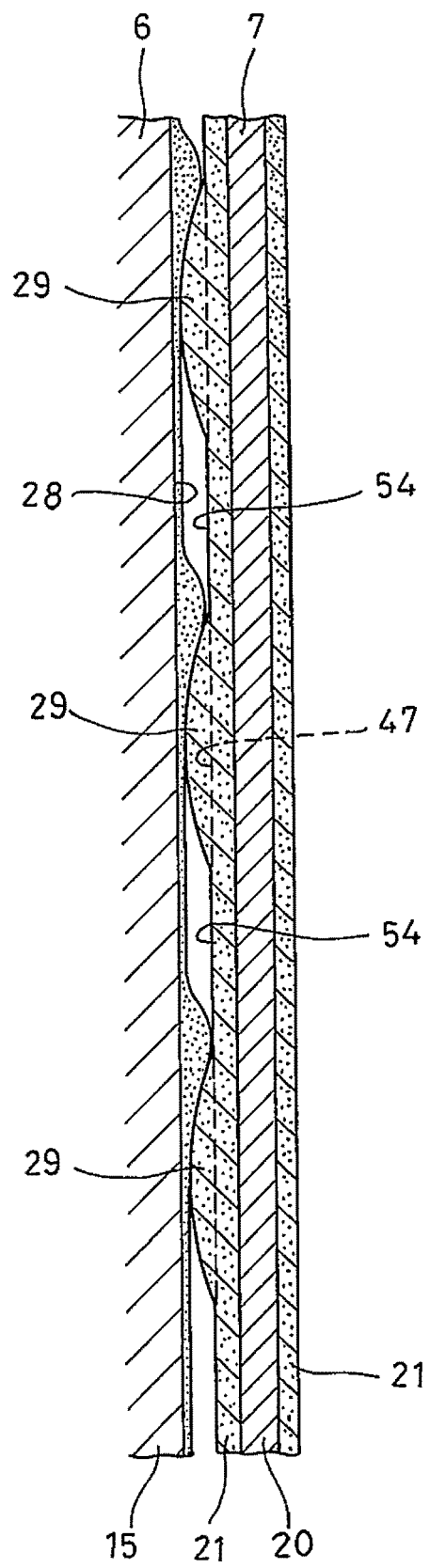
FIG. 29 is a sectional view taken along line XXIX-XXIX in FIG. 26.

As illustrated in FIG. 29, the seal-side sliding surface 47 has a plurality of minute protrusions 29 that is in sliding contact with the cage-side sliding surface 28 via an oil film; and flat surfaces 54 connecting the respective circumferentially adjacent pairs of minute protrusions 29, and formed to circumferentially alternate with the minute protrusions 29. The minute protrusions 29 are disposed at an equal pitch around the entire circumference. The minute protrusions 29 axially protrude with respect to the flat surfaces 54, and all have the same shape. The minute protrusions 29 have a cross-sectional shape along the circumferential direction that is a convex circular arc shape having a radius of 1 mm to 30 mm (preferably 20 mm to 30 mm). On the other hand, the cage-side sliding surface 28 is a circular annular flat surface orthogonal to the axial direction.

Figure 30:
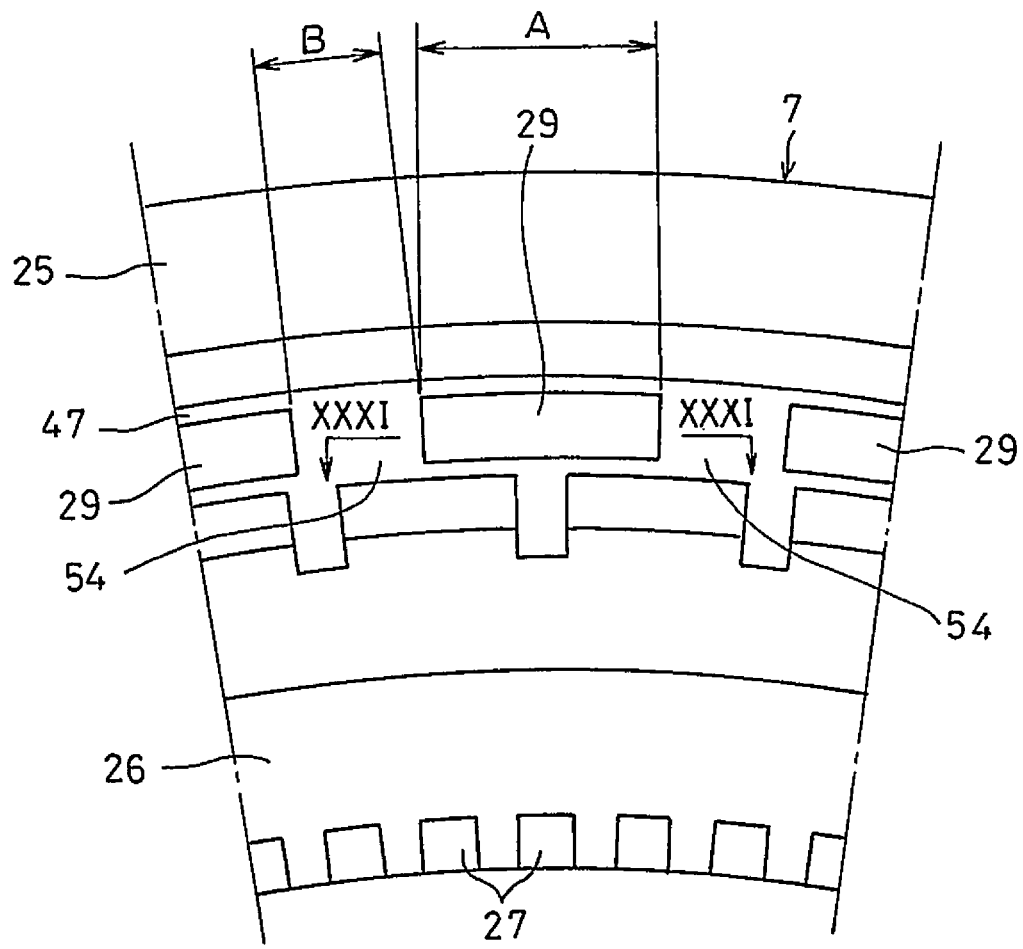
FIG. 30 is a view of the seal member illustrated in FIG. 26 when seen from the axially inner side.

As illustrated in FIG. 30, the circumferential width A of each minute protrusion 29 is set in a range of 0.3 to 4.0 mm (preferably 1.4 to 3.7 mm). The circumferential width B of each flat surface 54 is set in a range of 0.3 to 4.0 mm (preferably 1.4 to 3.7 mm).

Figure 31:
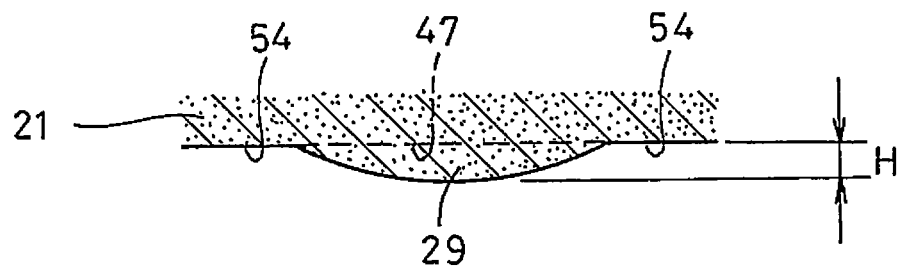
FIG. 31 is a sectional view taken along line XXXI-XXXI in FIG. 30.

As illustrated in FIG. 31, the height H of each minute protrusion 29 from the corresponding flat surfaces 54 is set in a range of 0.01 mm to 0.50 mm (preferably 0.01 to 0.20 mm, more preferably 0.01 to 0.10 mm). In the drawing, for easy recognition of the presence of the minute protrusion 29, the height H of the minute protrusion 29 is exaggerated. If the heights H of the minute protrusions 29 from the flat surfaces 54 are set to 0.20 mm or less, the position of the seal fixing groove 14 in the inner periphery of the outer ring 3 does not need to be axially displaced, and thus management of components is easy, compared to the case of manufacturing the sealed bearing 1 that is not provided with the minute protrusions 29.

Figure 26:
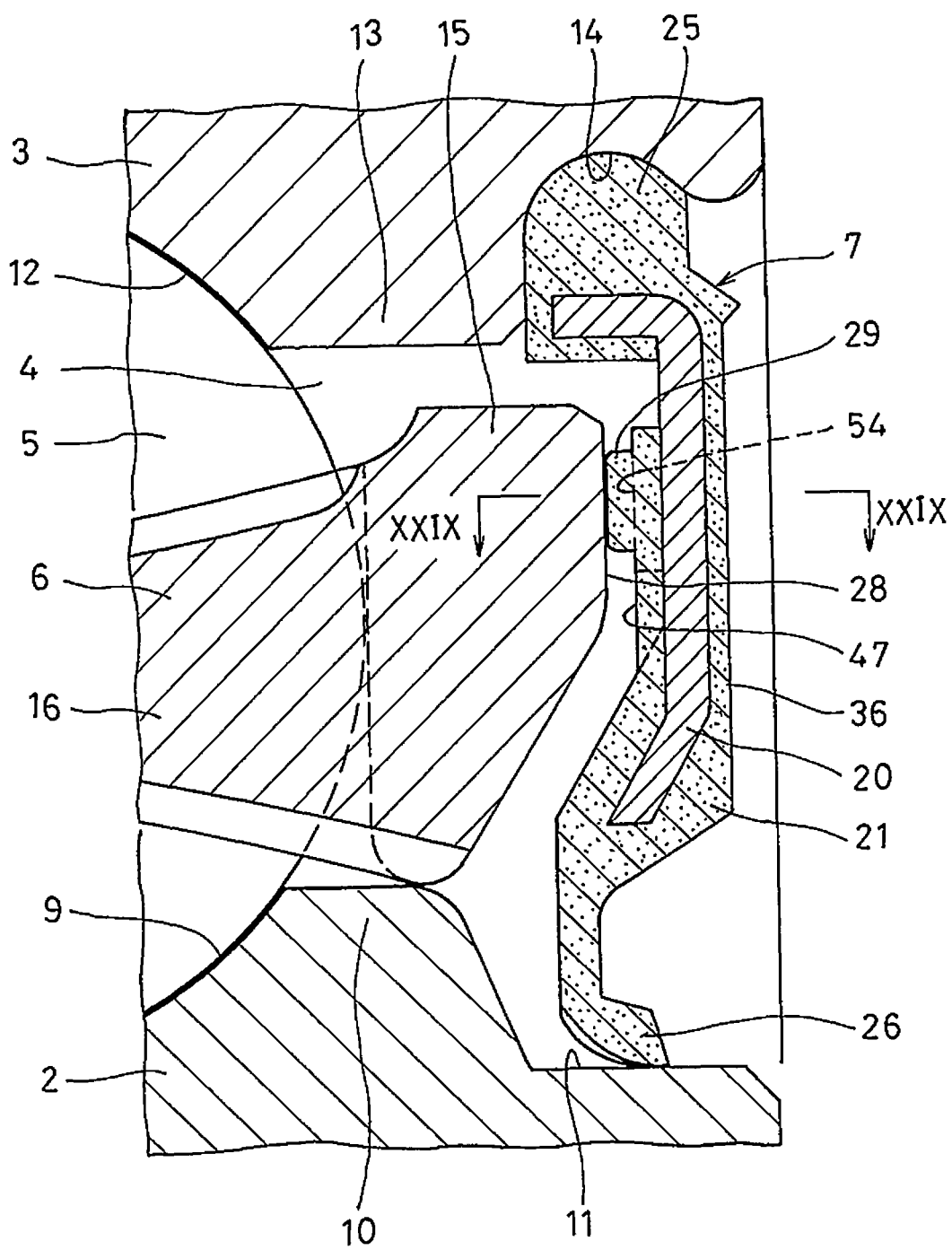
FIG. 26 is an enlarged sectional view illustrating a seal member of the sealed bearing in FIG. 25, and the vicinity thereof.

As illustrated in FIG. 26, the minute protrusions 29 are disposed at positions overlapping with the pitch circle of the rolling elements 5 (imaginary circle connecting the centers of the plurality of rolling elements 5), or disposed radially outwardly of the pitch circle of the rolling elements 5.

Figure 33:
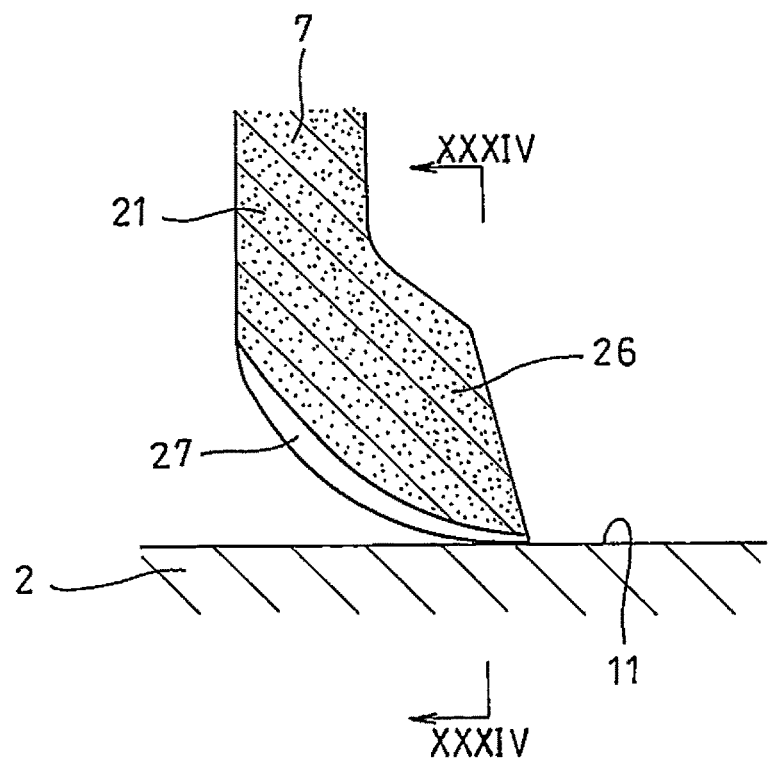
FIG. 33 is an enlarged view illustrating a seal lip of a seal member in FIG. 25, and the vicinity thereof.
Figure 34:
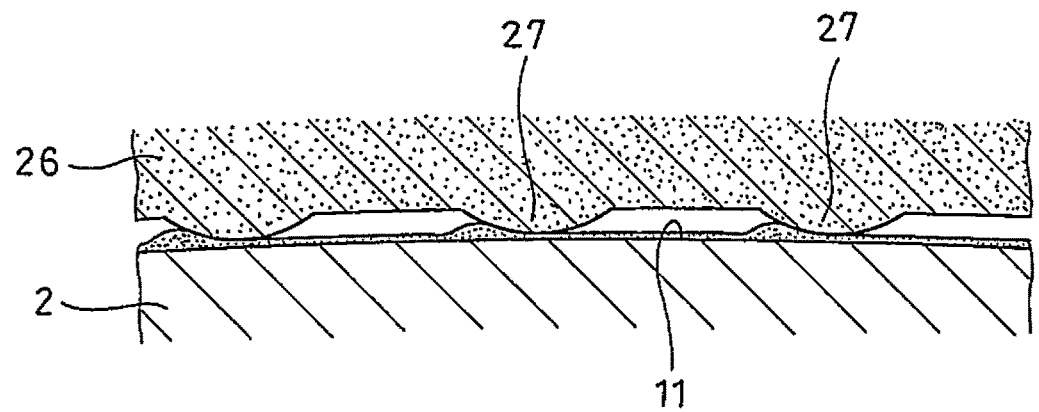
FIG. 34 is a sectional view taken along line XXXIV-XXXIV in FIG. 33.

As illustrated in FIGS. 33 and 34, the radially inner end of the seal lip 26 is provided with a plurality of protrusions 27 kept in sliding contact with the one sliding recess 11 on the outer periphery of the inner ring 2, and circumferentially spaced apart from each other. The protrusions 27 extend in a direction orthogonal to the circumferential direction. As illustrated in FIG. 34, the protrusions 27 have a convex circular arc-shaped cross section.

In the above sealed bearing 1, as illustrated in FIG. 29, the plurality of minute protrusions 29, which are in sliding contact with the cage-side sliding surface 28, and the flat surfaces 54, which connect the respective circumferentially adjacent pairs of minute protrusions 29 are formed on the seal-side sliding surface 47 so as to circumferentially alternate with each other, and the minute protrusion 29 has a cross-sectional shape along the circumferential direction that is a circular arc shape having a radius of 1 mm to 30 mm (preferably 20 mm to 30 mm). Therefore, while the bearing is rotating, an oil film due to the wedge film effect is formed between the minute protrusions 29 and the cage-side sliding surface 28, and the oil film causes a fluid lubrication state between the seal-side sliding surface 47 and the cage-side sliding surface 28, so that the contact resistance between the cage 6 and the seal member 7 can be reduced to be extremely small.

Also, in this sealed bearing 1, the heights H of the minute protrusions 29 from the flat surfaces 54 (see FIG. 31) are set in the range of 0.01 mm to 0.50 mm (preferably 0.01 to 0.20 mm, more preferably 0.01 to 0.10 mm), the circumferential widths A of the minute protrusions 29 (see FIG. 30) are set in the range of 0.3 to 4.0 mm (preferably 1.4 to 3.7 mm), and the circumferential widths B of the flat surfaces 54 (see FIG. 30) are set in the range of 0.3 to 4.0 mm (preferably 1.4 to 3.7 mm). Therefore, not only while the bearing is rotating at a high speed, but also while the bearing is rotating at a relatively low speed, it is possible to stably create a fluid lubrication state between the seal-side sliding surface 47 and the cage-side sliding surface 28. As described above, since the sliding resistance between the cage 6 and the seal member 7 can be reduced to be extremely small in this sealed bearing 1, it is not necessary to ensure an axial space between the cage 6 and the seal member 7, so that it is easy to set the axial width of the bearing to be small.

Also, in this sealed bearing 1, it is possible to reduce radially outward inclination of the cantilever-shaped cage claws 16 due to a centrifugal force during rotation of the bearing. Specifically, as illustrated in FIG. 25, if a resin cage 6 (so-called crown cage) is used which includes a cage circular annular portion 15; and cantilever-shaped cage claws 16 axially extending from the cage circular annular portion 15, torsional deformation occurs in the cage circular annular portion 15 due to the centrifugal force acting on the cantilever-shaped cage claws 16 during rotation of the bearing, and the cage claws 16 are inclined radially outward due to the torsional deformation, so that the contact between the cage claws 16 and the rolling elements 5 could become unstable. In contrast thereto, in the sealed bearing 1 of this embodiment, since the cage circular annular portion 15 is supported by the seal member 7 due to the sliding contact between the minute protrusions 29 and the cage-side sliding surface 28 as illustrated in FIG. 26, it is possible to reduce torsional deformation of the cage circular annular portion 15 due to the centrifugal force received by the cage claws 16 during rotation of the bearing, and to reduce radially outward inclination of the cage claws 16.

Also, in this sealed bearing 1, since the minute protrusions 29 and the flat surfaces 54 can be formed by vulcanization molding of the rubber member 21, the minute protrusions 29 and the flat surfaces 54 can be formed at low machining cost.

Figure 32:
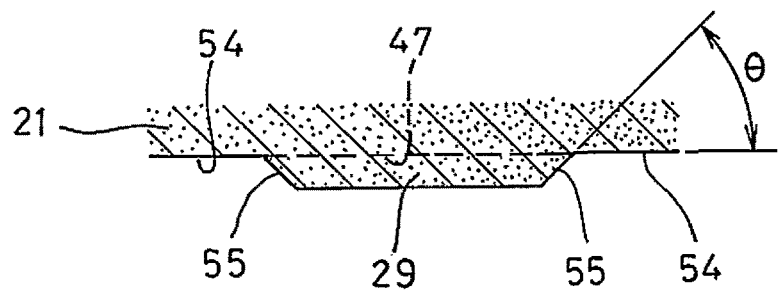
FIG. 32 is a sectional view illustrating another example of a minute protrusion illustrated in FIG. 31.

While, in the above embodiment, as the minute protrusions 29, minute protrusions are used which has a circular arc cross-sectional shape along the circumferential direction as illustrated in FIG. 31, it is possible to adopt minute protrusions whose cross-sectional shape along the circumferential direction is an isosceles trapezoidal shape having a pair of symmetrical oblique sides 55 each defining an angle θ of 45° or less with respect to the circumferential direction as illustrated in FIG. 32. With such minute protrusions, too, the same actions and effects as in the above embodiments can be obtained.

Figure 35:
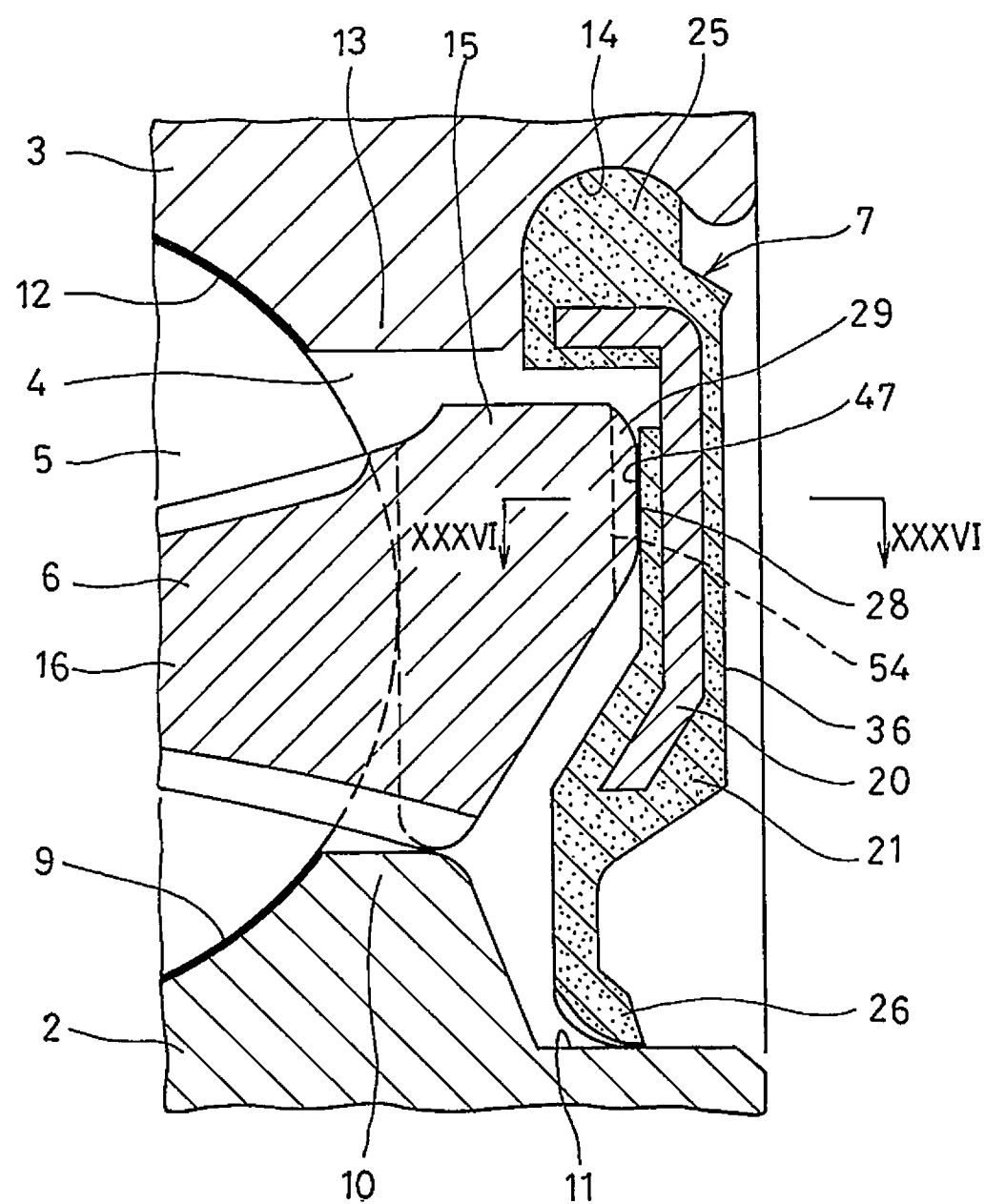
FIG. 35 is a view of a sealed bearing according to a second embodiment of the third invention, the view corresponding to FIG. 26.
Figure 36:
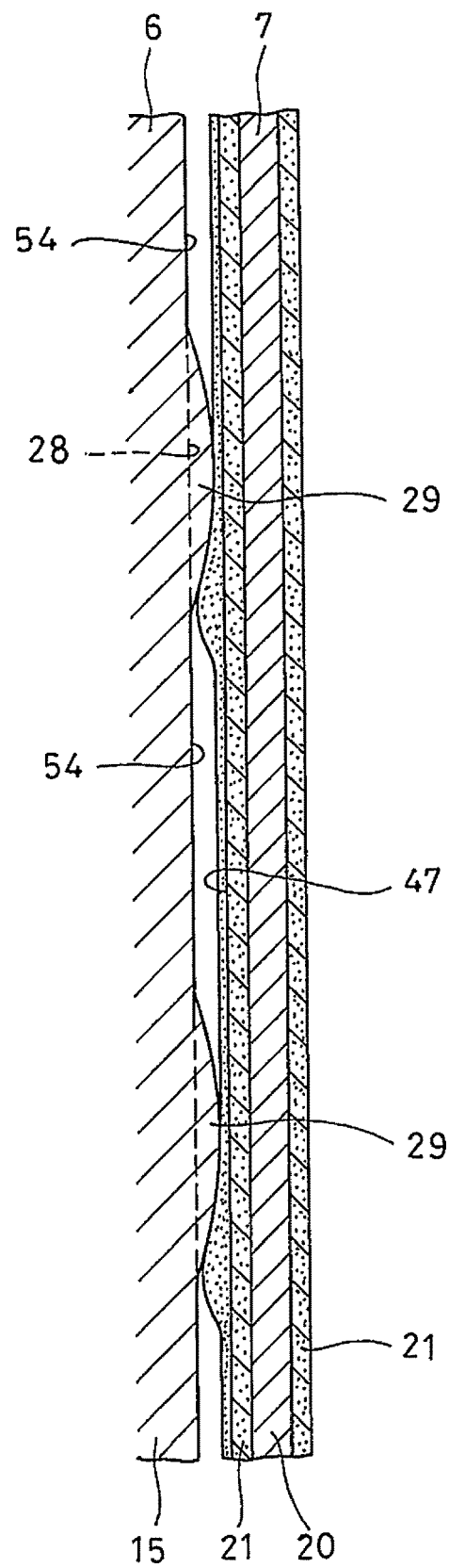
FIG. 36 is a sectional view taken along line XXXVI-XXXVI in FIG. 35.
Figure 37:
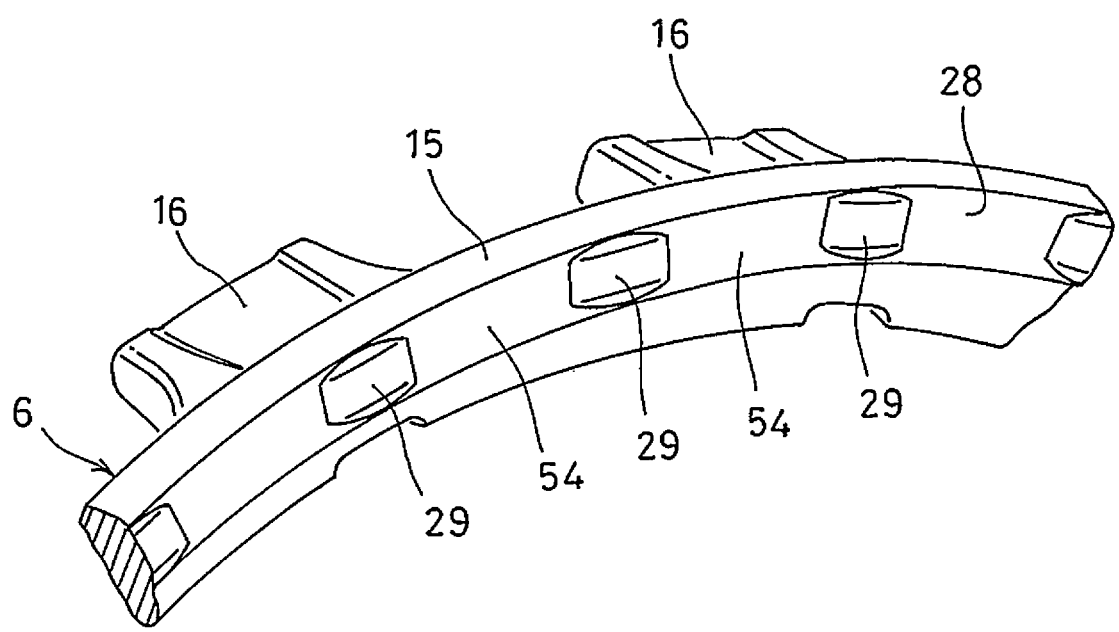
FIG. 37 is a perspective view of a cage illustrated in FIG. 35 when seen from the axially outer side.

FIGS. 35 to 37 illustrate a sealed bearing 1 according to a second embodiment of the third invention. The first and second embodiments are different from each other only in that in the first embodiment, the minute protrusions 29 are disposed on, of the seal-side sliding surface 47 and the cage-side sliding surface 28, the seal-side sliding surface 47, whereas in the second embodiment, the minute protrusions 29 are disposed on the cage-side sliding surface 28, and the first and second embodiments are the same in the other configurations. Therefore, the elements of the second embodiment corresponding to those of the first embodiment are denoted by the same reference numerals, and the description thereof is omitted.

As illustrated in FIG. 36, the cage-side sliding surface 28 has a plurality of minute protrusions 29 kept in sliding contact with the seal-side sliding surface 47 via an oil film, and flat surfaces 54 connecting the respective circumferentially adjacent pairs of minute protrusions 29, and formed to alternate with the minute protrusions 29. On the other hand, the seal-side sliding surface 47 is a circular annular flat surface orthogonal to the axial direction.

This sealed bearing 1 has the same actions and effects as in the first embodiment.

In each of the above embodiments, while the description has been given taking, as an example of the seal member 7, a seal member including a metal core 20 and a rubber member 21, the seal member 7 may be formed of resin. In this case, since the minute protrusions 29 and the flat surfaces 54 can be formed by resin injection molding, the minute protrusions 29 and the flat surfaces 54 can be formed at low machining cost. Also, the seal member 7 may be formed of mild steel (shield made of mild steel). In this case, too, since the minute protrusions 29 and the flat surfaces 54 can be formed by press forming of mild steel, the minute protrusions 29 and the flat surfaces 54 can be formed at low machining cost.

Also, the seal member 7 may be formed of a solid lubricant containing, as its main components, a lubricant (heat-solidified grease or the like); and a resin (polyethylene or the like).

While, in the above embodiment, the description has been given taking, as an example of the cage 6, a resin cage formed of only a resin composition, it is possible to also adopt a resin cage in which when the cage circular annular portion 15 and the cage claws 16 are molded with a resin composition, an annular metal core made of metal is insert-molded in the cage circular annular portion 15. Also, it is possible to adopt a mild steel cage in which the cage circular annular portion 15 and the cage claws 16 are integrally formed of mild steel.

Figure 38:
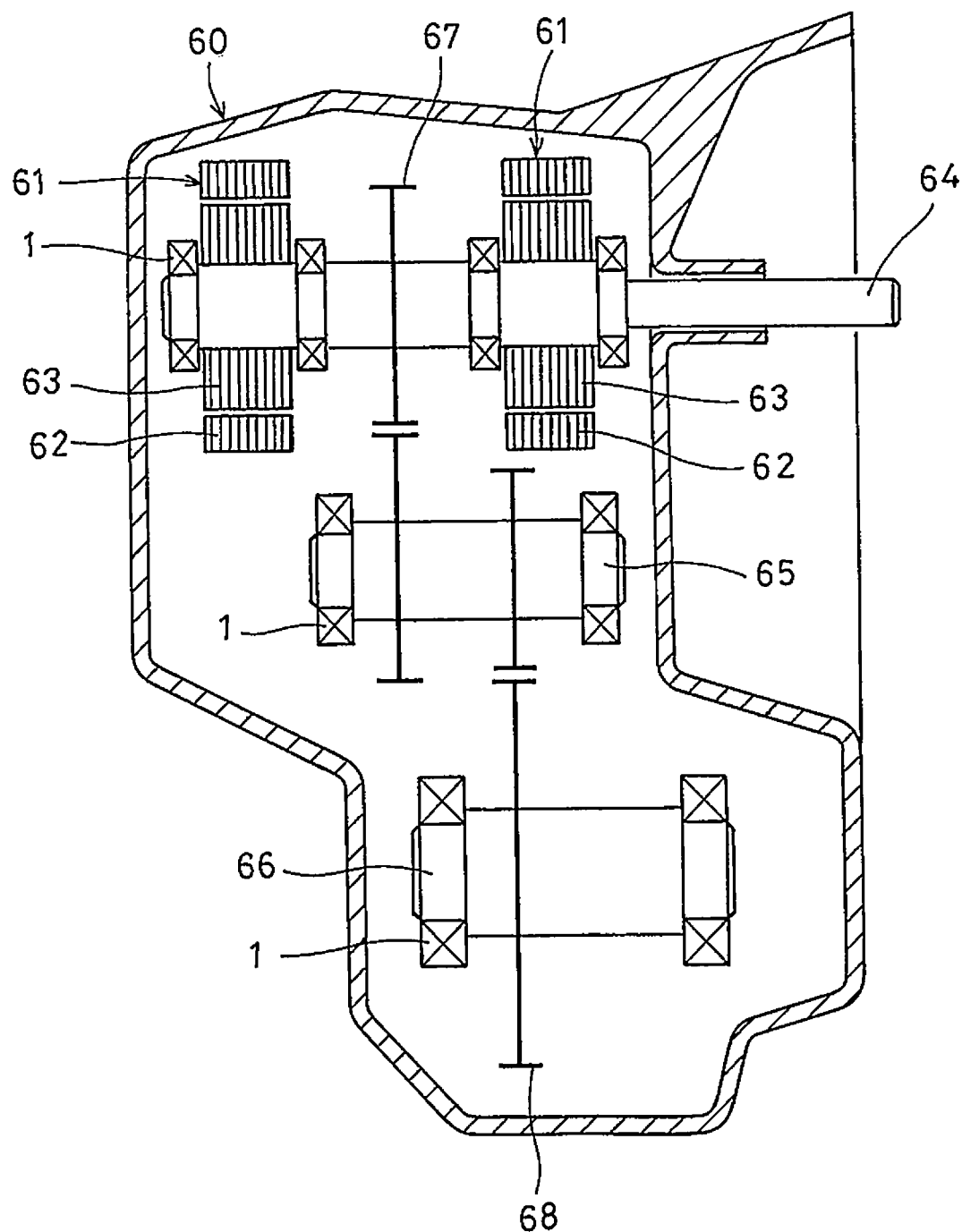
FIG. 38 is a schematic diagram of an electric vehicle transmission in which the sealed bearings in FIGS. 1, 15, and 25 are disposed.

As illustrated in FIG. 38, sealed bearings 1 as described in the embodiments of the above first to third inventions can be used as bearings of an electric vehicle transmission 60 that reduces rotation of electric motors of an electric vehicle such as a battery type electric vehicle (EV) or a hybrid electric vehicle (HEV). The bearings of the electric vehicle transmission 60 rotate at the number of rotations in a low-speed to high-speed wide rotation range while the vehicle is traveling, and are used under the conditions that while the bearings are rotating at the highest speed, the dmn value (pitch circle diameter (mm)×the number of rotations (min-1) of the rolling elements 5) exceeds 2 million.

The transmission 60 illustrated in FIG. 38 includes stators 62 of electric motors 61; rotors 63 of the electric motors 61; a rotary shaft 64 coupled to the rotors 63; sealed bearings 1 rotatably supporting the rotary shaft 64; a second rotary shaft 65 and a third rotary shaft 66 that are disposed parallel to the rotary shaft 64; a first gear train 67 that transmits rotation of the rotary shaft 64 to the second rotary shaft 65; and a second gear train 68 that transmits rotation of the second rotary shaft 65 to the third rotary shaft 66. The stators 62 are annular stationary members, and the rotors 63 as rotary members are disposed inside the respective stators 62. When the stators 62 are energized, the rotors 63 rotate by the electromagnetic forces acting between the stators 62 and the rotors 63, and the rotation of the rotors 63 is input to the rotary shaft 64.

The above-described embodiments are mere examples in every respect, and the present invention is not limited thereto. The scope of the present invention is indicated not by the above description but by the claims, and should be understood to include all modifications within the meaning and scope equivalent to the scope of the claims.

DESCRIPTION OF REFERENCE NUMERALS

1: sealed bearing
2: inner ring
3: outer ring
4: annular space
5: rolling element (ball)
6: resin cage 7: seal member
13: seal fixing groove
15: cage circular annular portion
16: cage claw
17: pocket side surface
18: pocket bottom surface
20: metal core
21: rubber member
23: outer surface rubber portion
24: inner surface rubber portion
25: outer peripheral rubber portion
26: seal lip
28: axial side surface (cage-side sliding surface)
29: minute protrusion
30: circular annular opening
31: circular arc-shaped opening
32: protrusion formation annular portion for protrusion formation
33: radially extending portion
37: build-up portion
38: radially outer surface
39: radially outer oil groove
40: radially inner surface
41: radially inner oil groove
42: rising surface
43: radially outer penetrating groove
44: radially inner penetrating groove
45: axial groove
46: cutout
47: seal-side sliding surface
48: sliding contact distal end surface
49: sliding contact flat surface
50: seal-side inclined surface
51: cage-side inclined surface
52: chamfer
54: flat surface
55: oblique side
60: electric vehicle transmission
61: electric motor
α, β, γ: angle
$L_1$, $L_2$, $L_3$: straight line
O: bearing center
A: circumferential width of the minute protrusion
B: circumferential width of the flat surface
H: height of the minute protrusion from the flat surface
θ: angle of the oblique side

The invention claimed is:

1. A sealed bearing comprising:
an inner ring;
an outer ring having a seal fixing groove in an inner periphery of the outer ring, the outer ring being arranged radially outwardly of, and coaxially with, the inner ring;
a plurality of rolling elements disposed in an annular space defined between the inner ring and the outer ring;
an annular cage retaining the rolling elements; and
an annular seal member disposed at a first axial end opening of the annular space,
wherein the seal member comprises:
a metal core having a circular annular plate shape, and axially opposed to the cage; and
a rubber member vulcanization-bonded to the metal core, wherein the rubber member includes:
an outer surface rubber portion bonded to an axially outer surface of the metal core;
an inner surface rubber portion bonded to an axially inner surface of the metal core;
an outer peripheral rubber portion extending radially outward from a radially outer end of the metal core, and the outer peripheral rubber portion being fitted in the seal fixing groove; and
a seal lip extending radially inward from a radially inner end of the metal core, and
wherein the inner surface rubber portion has a plurality of minute protrusions circumferentially spaced apart from each other, and kept in sliding contact with an axial side surface of the cage,
wherein the outer surface rubber portion covers an entire area of the axially outer surface of the metal core,
wherein the inner surface rubber portion has:
one or more first openings through which the axially inner surface of the metal core is exposed on a same circumference passing on a radially outer side of the minute protrusions; and
one or more second openings through which the axially inner surface of the metal core is exposed on a same circumference passing on a radially inner side of the minute protrusions.

2. The sealed bearing according to claim 1, wherein the one or more first openings comprise a circular annular opening through which the axially inner surface of the metal core is continuously exposed around an entire circumference thereof on the same circumference passing on the radially outer side of the minute protrusions, and
wherein the one or more second openings comprise a plurality of circular arc-shaped openings through which the axially inner surface of the metal core is discontinuously exposed at circumferentially spaced apart positions on the same circumference passing on the radially inner side of the minute protrusions.

3. The sealed bearing according to claim 1, wherein the one or more first openings comprise a plurality of circular arc-shaped openings through which the axially inner surface of the metal core is discontinuously exposed at circumferentially spaced apart positions on the same circumference passing on the radially outer side of the minute protrusions, and
wherein the one or more second openings comprise a circular annular opening through which the axially inner surface of the metal core is continuously exposed around an entire circumference thereof on the same circumference passing on the radially inner side of the minute protrusions.

4. The sealed bearing according to claim 2, wherein the inner surface rubber portion includes a protrusion formation annular portion for protrusion formation located on a radially inner side of the one or more first openings and on a radially outer side of the one or more second openings, and has the minute protrusions thereon,
wherein the inner surface rubber portion further includes a plurality of radially extending portions radially extending from the protrusion formation annular portion so as to be each located between a corresponding circumferentially adjacent pair of the circular arc-shaped openings, and
wherein the radially extending portions are circumferentially disposed at intervals of 10° or less.

5. The sealed bearing according to claim 1, wherein each of the minute protrusions has a circular arc-shaped cross section orthogonal to a radial direction.

6. The sealed bearing according to claim 1, wherein the sealed bearing is used as a bearing of an electric motor of an electric vehicle, or as a bearing of an electric vehicle transmission for reducing rotation of the electric motor.

7. A sealed bearing comprising:
an inner ring;
an outer ring arranged radially outwardly of, and coaxially with, the inner ring;
a plurality of rolling elements disposed in an annular space defined between the inner ring and the outer ring;
an annular seal member disposed in one axial end opening of the annular space; and
a cage retaining the rolling elements,
wherein the cage includes:
a cage circular annular portion circumferentially extending in a region axially sandwiched between a passage region through which the rolling elements pass and the seal member; and
cage claws having a cantilevered structure, and each of the cage claws axially extending from the cage circular annular portion so as to be located between a corresponding circumferentially adjacent pair of the rolling elements,
wherein the seal member has a seal-side sliding surface axially opposed to the cage,
wherein the cage has a cage-side sliding surface axially opposed to the seal-side sliding surface,
wherein a plurality of minute protrusions are on one of the seal-side sliding surface and the cage-side sliding surface so as to be circumferentially spaced apart from each other,
wherein each of the minute protrusions has a sliding contact distal end surface linearly extending radially in a sectional view orthogonal to a circumferential direction,
wherein a smooth sliding contact flat surface configured to come into sliding contact with the sliding contact distal end surfaces of the minute protrusions while the bearing is rotating is on the other of the seal-side sliding surface and the cage-side sliding surface around an entire circumference thereof, and
wherein each of the sliding contact distal end surfaces and the sliding contact flat surface are disposed such that while the bearing is stationary, the sliding contact distal end surface and the sliding contact flat surface are opposed to each other in a non-parallel manner at an angle in a direction in which a space between the sliding contact distal end surface and the sliding contact flat surface widens from a radially inner side toward a radially outer side.

8. The sealed bearing according to claim 7, wherein the angle defined by each of the sliding contact distal end surfaces and the sliding contact flat surface while the bearing is stationary is set in a range of 0.5° or more and 6° or less.

9. The sealed bearing according to claim 7, wherein each of the cage claws has an axial length larger than a radius of a respective one of the rolling elements, and has pocket side surfaces each circumferentially opposed to a corresponding one of the rolling elements, and
wherein a portion of each of the pocket side surfaces of each of the cage claws circumferentially receiving the corresponding one of the rolling elements has a flat shape such that when the each of the cage claws moves radially outward by a centrifugal force, the each of the pocket side surfaces does not interfere with the corresponding one of the rolling elements.

10. The sealed bearing according to claim 9, wherein each of the pocket side surfaces of the cage claws is a flat surface along a straight line radially extending through a bearing center.

11. The sealed bearing according to claim 9, wherein the pocket side surfaces of each of the cage claws are flat surfaces, respectively, along parallel straight lines circumferentially opposed to each other with a straight line connecting together a bearing center and a circumferential center of the cage claw sandwiched between the parallel straight lines.

12. The sealed bearing according to claim 9, wherein the cage circular annular portion has pocket bottom surfaces axially opposed to the rolling elements, respectively,
wherein each of the pocket bottom surfaces has a shape linearly extending radially in a sectional view orthogonal to the circumferential direction, and
wherein each of the pocket side surfaces of each of the cage claws and a corresponding one of the pocket bottom surfaces are connected to each other in a concave circular arc shape when seen in a radial direction.

13. The sealed bearing according to claim 12, wherein build-up portions protruding axially inward so as not to come into contact with the rolling elements are on radially inner ends of the respective pocket bottom surfaces.

14. The sealed bearing according to claim 7, wherein each of the cage claws has:
a radially outer surface with a radially outer oil groove axially extending from a distal end of the cage claw toward the cage circular annular portion; and
a radially inner surface with a radially inner oil groove axially extending from the distal end of the cage claw toward the cage circular annular portion, and
wherein each of the cage claws has a cross section orthogonal to an axial direction, and that has an H-shape opening radially outward and radially inward due to the radially outer oil groove and the radially inner oil groove.

15. The sealed bearing according to claim 14, wherein the radially outer oil groove of each of the cage claws is configured such that a position of a groove bottom surface of the radially outer oil groove gradually changes radially outward from the distal end of the cage claw toward a root of the cage claw, and
wherein the cage circular annular portion has a flat rising surface rising radially outward from the roots of the cage claws.

16. The sealed bearing according to claim 7, wherein radially outer penetrating grooves axially penetrating through an outer periphery of the cage circular annular portion are located at circumferential positions corresponding to the cage claws.

17. The sealed bearing according to claim 16, wherein an axial groove is between each circumferentially adjacent pair of the radially outer penetrating grooves, the axial groove axially extending on the outer periphery of the cage circular annular portion so as to open on an axially outer side of the cage circular annular portion, and so as not to penetrate on an axially inner side of the cage circular annular portion.

18. The sealed bearing according to claim 17, wherein an axial length of the axial groove is set to ⅔ or less of an axial width of the cage circular annular portion.

19. The sealed bearing according to claim 7, wherein radially inner penetrating grooves axially penetrating through an inner periphery of the cage circular annular portion are at circumferential positions corresponding to the cage claws.

20. The sealed bearing according to claim 7, wherein the seal member has a seal-side inclined surface linearly extending to be inclined axially inward from the seal-side sliding surface toward the radially inner side in a sectional view orthogonal to the circumferential direction,
wherein the cage circular annular portion has:
a cage-side inclined surface linearly extending to be inclined axially inward from the cage-side sliding surface toward the radially inner side in a sectional view orthogonal to the circumferential direction; and
a chamfer linearly extending to be inclined axially inward from the cage-side sliding surface toward the radially outer side,
wherein an angle defined by the cage-side inclined surface and the seal-side inclined surface is set to 10° or less, and
wherein an angle defined by the chamfer and the seal-side sliding surface is set to more than 10° and 48° or less.

21. The sealed bearing according to claim 14, wherein cutouts are in the distal end of each of the cage claws so as to circumferentially penetrate through respective groove shoulders on both circumferential sides of the radially outer oil groove and the radially inner oil groove.

22. The sealed bearing according to claim 7, wherein the cage is a resin cage.

23. A sealed bearing comprising:
an inner ring;
an outer ring arranged radially outwardly of, and coaxially with, the inner ring;
a plurality of rolling elements disposed in an annular space between the inner ring and the outer ring;
a cage retaining the rolling elements; and
an annular seal member disposed in a first axial end side of the annular space,
wherein the seal member has a seal-side sliding surface axially opposed to the cage,
wherein the cage has a cage-side sliding surface axially opposed to the seal-side sliding surface,
wherein one of the seal-side sliding surface and the cage-side sliding surface has:
a plurality of minute protrusions configured to come into sliding contact with the other of the seal-side sliding surface and the cage-side sliding surface; and
flat surfaces each connecting together a corresponding circumferentially adjacent pair of the minute protrusions, and disposed to circumferentially alternate with the minute protrusions,
wherein each of the minute protrusions is configured such that a cross section of the minute protrusion along a circumferential direction has a circular arc shape having a radius of 1 mm to 30 mm, or has a trapezoidal shape having oblique sides each defining an angle of 45° or less with respect to the circumferential direction,
wherein a height of each of the minute protrusions from the flat surfaces is set in a range of 0.01 mm to 0.50 mm,
wherein a circumferential width of each of the minute protrusions is set in a range of 0.3 mm to 4.0 mm, and
wherein a circumferential width of each of the flat surfaces is set in a range of 0.3 mm to 4.0 mm.

24. The sealed bearing according to claim 23, wherein the seal member includes a rubber member that is vulcanization-molded,
wherein the seal-side sliding surface is on a surface of the rubber member, and
wherein the minute protrusions and the flat surfaces are on the seal-side sliding surface.

25. The sealed bearing according to claim 23, wherein the seal member comprises a resin or a mild steel, and
wherein the minute protrusions and the flat surfaces are on the seal-side sliding surface.

26. The sealed bearing according to claim 23, wherein the seal member comprises a solid lubricant containing a lubricant and a resin as main components thereof.

27. The sealed bearing according to claim 23, wherein the cage includes:
a cage circular annular portion circumferentially extending in a region axially sandwiched between a passage region through which the rolling elements pass and the seal member; and
cage claws having a cantilevered structure, and each of the cage claws axially extending from the cage circular annular portion so as to be located between a corresponding circumferentially adjacent pair of the rolling elements, and
wherein the cage-side sliding surface is disposed on a surface of the cage circular annular portion axially opposed to the seal member.

28. The sealed bearing according to claim 23, wherein the cage is a resin cage or a mild steel cage.

* * * * *